United States Patent [19]

Takagi et al.

[11] Patent Number: 5,999,691
[45] Date of Patent: Dec. 7, 1999

[54] TELEVISION RECEIVER, RECORDING AND REPRODUCTION DEVICE, DATA RECORDING METHOD, AND DATA REPRODUCING METHOD

[75] Inventors: Masamitsu Takagi, Ibaraki; Yasushi Yoshida, Tsuzuki-gun; Masaaki Fujita, Takatsuki; Eiichiro Naito, Amagasaki, all of Japan

[73] Assignee: Matsushita Electric Industrial Co., Ltd., Japan

[21] Appl. No.: 08/796,587

[22] Filed: Feb. 6, 1997

[30] Foreign Application Priority Data

Feb. 8, 1996 [JP] Japan .................................. 8-022862
Jun. 7, 1996 [JP] Japan .................................. 8-145921

[51] Int. Cl.⁶ .................................................. H04N 5/76
[52] U.S. Cl. ................................................ 386/46; 386/68
[58] Field of Search .................................. 386/46, 1, 45, 386/52, 68, 70, 72, 82, 92, 95, 125, 106, 126, 112; 348/714, 718; H04N 5/781, 5/783

[56] References Cited

U.S. PATENT DOCUMENTS

| | | | |
|---|---|---|---|
| 3,761,604 | 9/1973 | Ozawa et al. | 386/45 |
| 4,015,289 | 3/1977 | Kinjo et al. | 386/52 |
| 5,134,499 | 7/1992 | Sata et al. | 386/126 |
| 5,371,551 | 12/1994 | Logan et al. | 386/112 |
| 5,555,463 | 9/1996 | Staron | 386/109 |
| 5,706,388 | 1/1998 | Isaka | 386/125 |

FOREIGN PATENT DOCUMENTS 6-233234  8/1994  Japan .

*Primary Examiner*—Huy Nguyen
*Attorney, Agent, or Firm*—Parkhurst & Wendel, L.L.P.

[57] ABSTRACT

A television receiver comprises a tuner for receiving a television video signal; data storage device including a data storage unit for storing the video signal received by the tuner, for its storage capacity, a writing pointer for time-sequentially writing the video signal into the data storage unit, and a reading pointer for reading the stored video signal; select circuit for selecting and outputting one of the reproduced video signal output from the data storage means device and the video signal received by the tuner; and control circuit for controlling the data storage device and the select circuit in response to an external input signal.

6 Claims, 74 Drawing Sheets

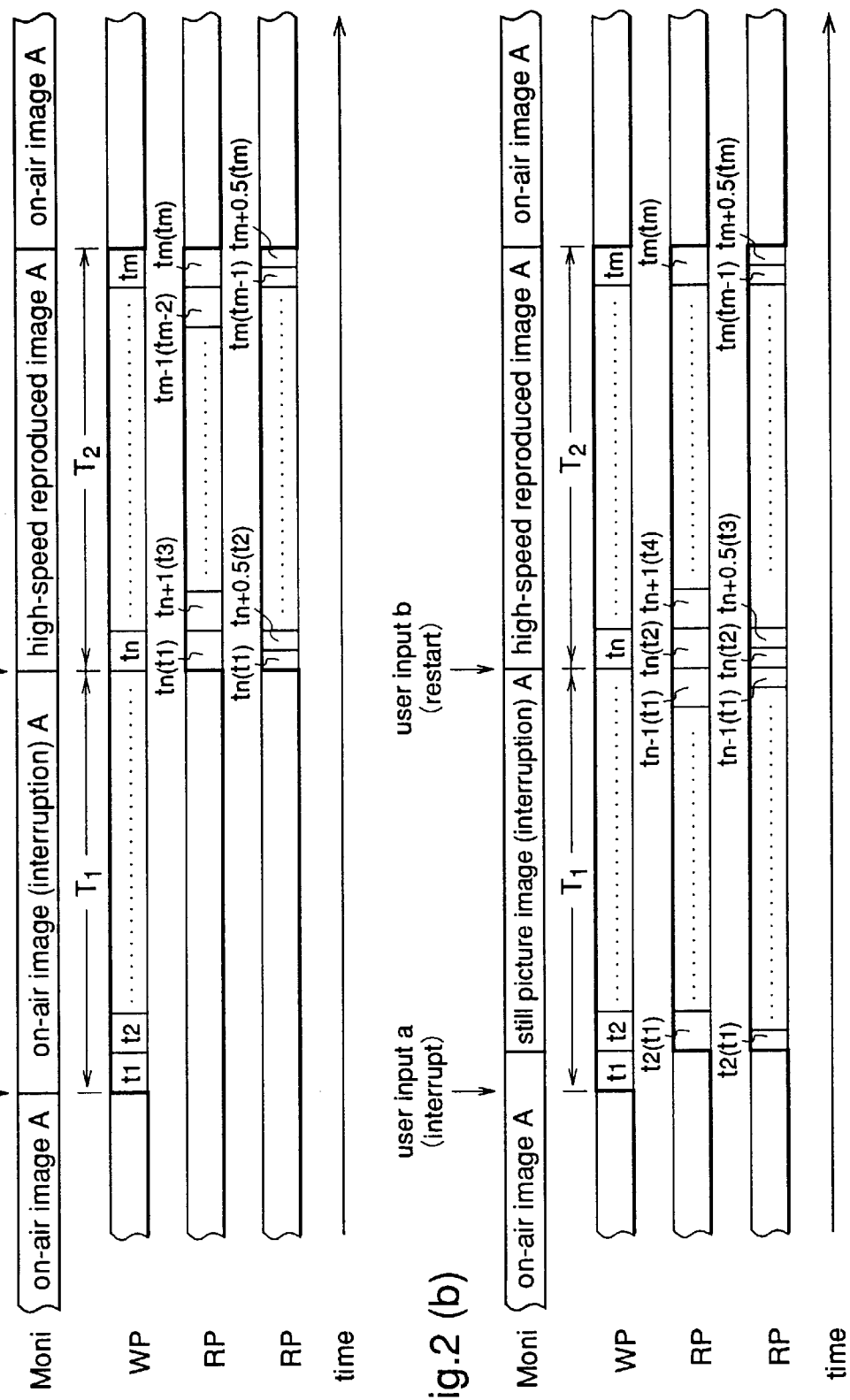

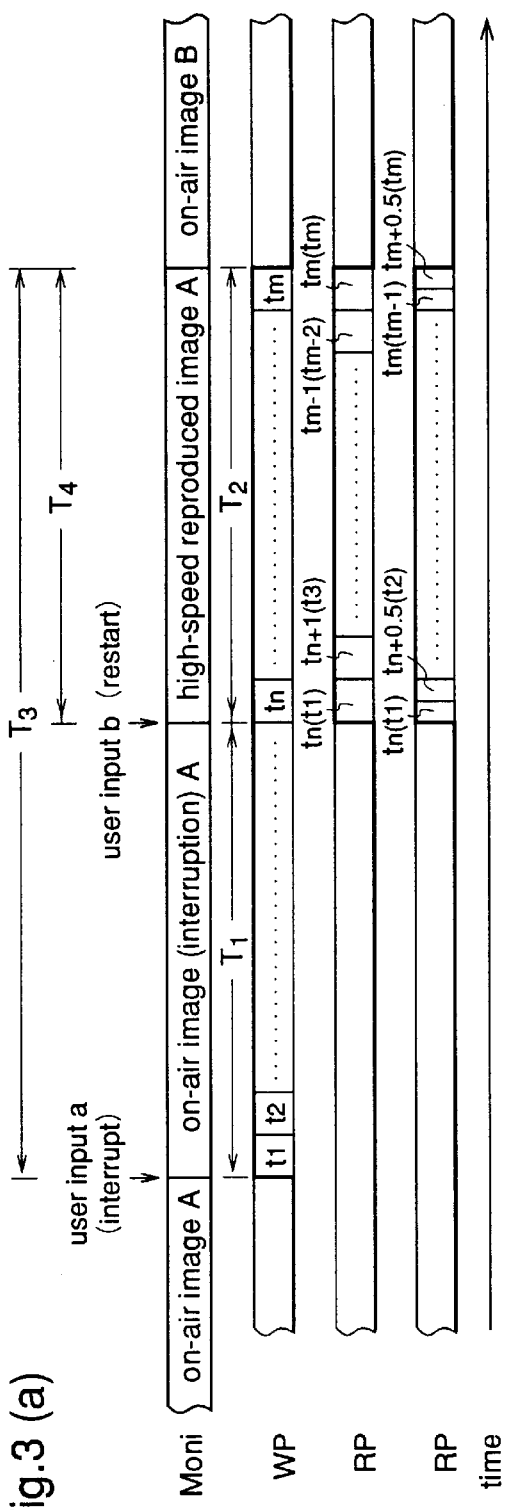
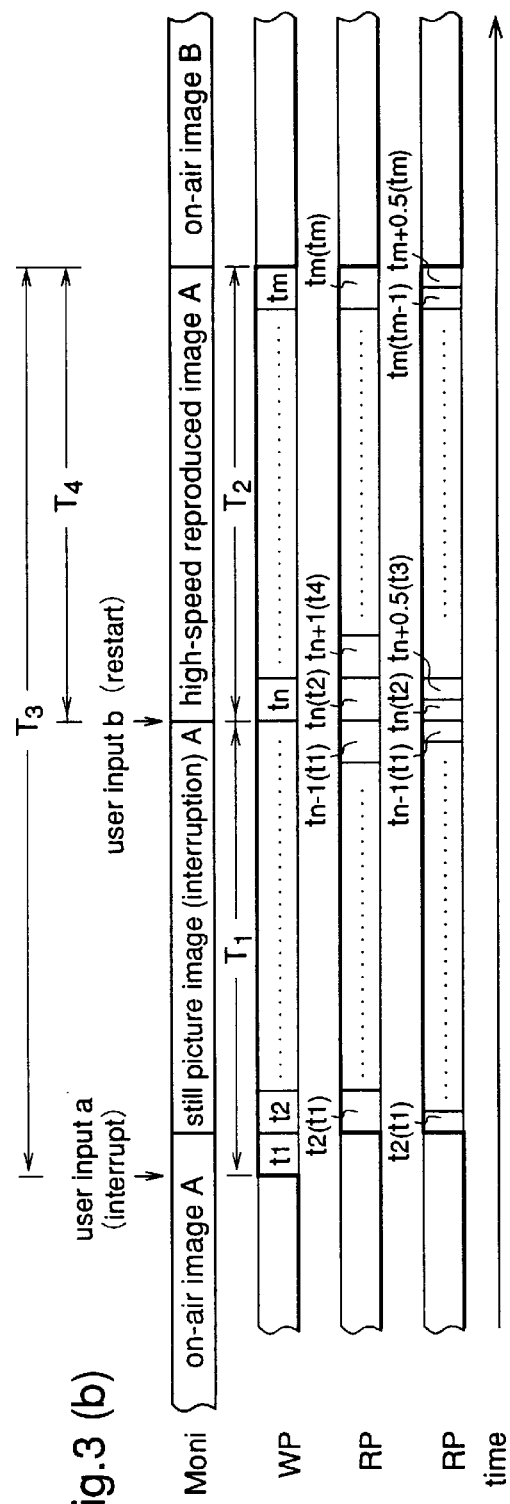

TELEVISION RECEIVER, RECORDING AND REPRODUCTION DEVICE, DATA RECORDING METHOD, AND DATA REPRODUCING METHOD

FIELD OF THE INVENTION

The present invention relates to a television receiver in which various recording and reproduction functions, such as a playback function, are implemented by a mass storage RAM means. The invention also relates to a recording and reproduction device included in such a television receiver as a mass storage RAM means, an improved method for recording data, and an improved method for reproducing data.

BACKGROUND OF THE INVENTION

In recent years, television receivers having playback functions have been put to practical use. Generally, a playback function is implemented by an image memory in a television receiver, and a portion of a program currently being broadcasted is recorded in the memory as a moving picture according to instructions from a user (viewer) who is watching the program, so that the user can reproduce the past broadcast signals retroactively at any time.

Using a television receiver with such a playback function, the user can immediately record any commercial, quiz program, or cooking program, so this function is very effective to utilize the broadcasting information. Meanwhile, another television receiver has a function to display a plurality of programs on a screen at the same time.

Since random access memory (RAM) means capable of mass storage recording in required as a recording medium of a recording and reproduction device included in a television receiver with a playback function, an ordinary semiconductor memory is not suitable because of its high bit price that results in high cost. Hence, it is thought that a hard disk drive unit, which can be regarded as a kind of RAM means, is employed. However, a conventional hard disk drive unit for data processing is usually provided with a single head for both recording and reproduction (hereinafter, referred to as recording/reproduction head) for a single recording surface.

In a recording and reproduction device having a playback function implemented by a conventional hard disk drive unit, when the user watches a program during the actual time without using the playback function, the recording/reproduction head of the hard disk drive unit is used simply for recording the broadcasting signal, so that it performs an ordinary recording operation. The ordinary recording operation is, for a one-side recording hard disk drive unit, to successively record signals on tracks while moving the recording/reproduction head from the outer circumference of the hard disk toward the inner circumference of the hard disk.

On the other hand, when the user uses the playback function while watching a program during the actual time, the recording/reproduction head repeats, alternatingly, the broadcasting signal recording operation and the reproducing operation for playback in a short period of time.

As described above, the conventional recording and reproduction device realizes the playback function by alternatingly repeating the recording and the reproduction using a single recording/reproduction head.

However, when the recording and reproduction device with the playback function is implemented by a conventional hard disk drive unit as mentioned above, since the recording and the reproduction are alternatingly repeated using a single head for recording and reproduction, noise is easily generated, and the lifetime of a head driving system is reduced because of the frequent repetition.

Further, in the recording and reproduction device with the playback function, data is recorded successively on adjacent tracks, from a track on the outermost circumference toward a track on the innermost circumference. Hence, when the recording of data on the innermost track is completed, the head must jump over plural tracks to return to the outermost track for the next recording. This results in an undesired phenomenon that frames of data to be recorded are skipped (hereinafter referred to as frame skip). In addition, when the traveling distance of the head is long, for example, when it travels from the track on the innermost circumference to the track on the outermost circumference, since the head cannot record frames which are generated during the travel of the head, more frames are skipped.

Furthermore, in the recording operation of the conventional head, as mentioned above, the head records data on tracks successively while moving from the outer circumference toward the inner circumference. So, when the recording of data on the track on the innermost circumference is completed, the head must return to the track on the outermost circumference for the next recording operation. This movement of the head seems wasteful.

Furthermore, the conventional television receiver having the playback function can only reproduce the past broadcasting signals, retroactively, for a prescribe period of time from the present time. Therefore, the availability of the playback function by the user is limited to a short period, a single time, and a single channel. Further, when an image in which a part of a program is recorded is reproduced, if the image is displayed on the whole screen, it is not possible to watch a program being broadcasted during the reproduction.

For example, when a user who is watching a sports program A wants to watch a program B which will be broadcasted on another channel from the scheduled ending time of the sports program A, if the sports program A is extended, the user records the program B as a program on another channel. In this case, however, when the user turns the channel to the program B after the program A has been through, he/she watches the program B from the middle and, thereafter, watches the recorded program B from the beginning.

When the program B is a drama, since the user sees the ending of the drama before the beginning, he/she may lose interest in the drama. Alternatively, the user may record the extended part of the sports program A after the scheduled ending time and watches the extended part after the program B has ended. In this case, however, the user will feel uneasy about the progress of the sports program A. As a result, the user must give up watching either of the programs A and B throughout.

SUMMARY OF THE INVENTION

It is an object of the present invention to provide a recording and reproduction device with a special function for reproduction, that produces less noise and provides a longer lifetime of a head driving system as compared with the conventional device, and that prevents frame skip.

It is another object of the present invention to provide a data recording and reproduction method that makes a recording head move with higher efficiency as compared with the conventional method.

It is still another object of the present invention to provide a television receiver by which a user can watch two programs A and B broadcasted on different channels, throughout, within the predetermined broadcast time, even when the channel A is extended and the program B starts from the scheduled ending time of the program A.

It is yet another object of the present invention to provide a television receiver by which a user can watch a program broadcasted on a channel, throughout, even when the user interrupts watching the program for a while.

It is a further object of the present invention to provide a television receiver by which a user can watch a plurality of programs broadcasted on different channels, throughout, within the scheduled broadcast time.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a television receiver comprises a tuner for receiving a television video signal; data storage means including a data storage unit for storing the video signal received by the tuner, for its storage capacity, a writing pointer for time-sequentially writing the video signal into the data storage unit, and a reading pointer for reading the stored video signal; select means for selecting and outputting one of the reproduced video signal output from the data storage means and the video signal received by the tuner; and control means for controlling the data storage means and the select means in response to an external input signal.

According to a second aspect of the present invention, in the above-mentioned television receiver, when a writing command signal is input as the external input signal, the writing pointer in the data storage means starts writing, and, when a reproduction command signal is input as the external input signal, the reading pointer in the data storage means starts reading, and the select means selects and outputs the reproduced video signal from the data storage means.

According to a third aspect of the present invention, in the above-mentioned television receiver, during a period from the input of the writing command signal to the input of the reproduction command signal, the reading pointer in the data storage means reproduces the video signal which has been output from the tuner at the input of the writing command signal, and outputs the video signal as a still picture.

According to a fourth aspect of the present invention, the above-mentioned television receiver includes two tuners for receiving television video signals, and, when a writing command signal is input as the external input signal, the select means selects and outputs a video signal received by one of the two tuners (first tuner), and the writing pointer in the data storage means starts writing of a video signal received by the other tuner (second tuner), and, when a reproduction command signal is input as the external input signal, the reading pointer in the data storage means starts reading and reproduces the video signal received by the first tuner, and the select circuit selects and outputs the reproduced video signal from the data storage means.

According to a fifth aspect of the present invention, the above-mentioned television receiver includes a plurality of tuners for receiving television video signals, and, when a writing command signal is input as the external input signal, the select means selects a video signal received by one of the plural tuners (first tuner), and the writing pointer in the data storage means starts writing of a video signal received by another tuner (second tuner), and, when a channel switching command signal is input as the external input signal, the reading pointer in the data storage means starts reading and reproduces the video signal, which has been received by the second tuner and recorded until the input of the channel switching command signal, at a speed higher than the writing speed of the writing pointer, and the selector means selects and outputs the reproduced video signal from the data storage means.

According to a sixth aspect of the present invention, the above-mentioned television receiver includes a plurality of tuners for receiving television video signals, and the data storage means records, simultaneously, video signals received by some of the plural tuners, designated by the external input signal. When a reproduction command signal is input as the external input signal, the data storage means reads, simultaneously, the plural video signals recorded in the data storage means, and the select means selects and outputs the plural video signals read simultaneously, and, when a channel decision signal is input as the external input signal, the select means selects, from the plural reproduced video signals, only the reproduced video signals which have been received and recorded by the tuners designated by the channel decision signal.

According to a seventh aspect of the present invention, the above-mentioned television receiver includes a plurality of tuners for receiving television video signals, and the data storage means records, simultaneously, video signals received by some of the plural tuners, designated by the external input signal, and, when a reproduction command signal is input as the external input signal, the data storage means reads, simultaneously, the plural video signals recorded in the data storage means, and the select means selects and outputs the plural video signals read simultaneously.

According to an eighth aspect of the present invention in the above-mentioned television receiver, when the reproduction command signal is input, the reading pointer reads the video signal at a speed higher than the writing speed of the writing pointer until the address of the reading pointer meets the address of the writing pointer, and, when the address of the reading pointer meets the address of the writing pointer, the select means selects an output from the tuner.

According to a ninth aspect of the present invention, in the above-mentioned television receiver, the data storage unit in the data storage means comprises a ring buffer in which the most significant address is followed by the least significant address.

According to a tenth aspect of the present invention, a recording and reproduction device with playback function comprises a recording head for recording data on a recording surface of a recording disk; a reproduction head for reproducing the recorded data; and drive control means for driving the recording head and the reproduction head individually.

According to an eleventh aspect of the present invention, a data recording method comprises a first recording step of recording date on tracks on a recording surface of a single-side recording disk, for every second track, while moving a recording head from a prescribed track toward the inner or outer circumference of the disk; and a second recording step of recording data on the remaining tracks which have been skipped in the first recording step, while moving the recording head in the opposite direction to that in the first recording step.

According to a twelfth aspect of the present invention, a data recording method comprises a first recording step of recording data on tracks on a first recording surface of a double-side recording disk, using a first recording head, while moving the first recording head and a second recording head from a prescribed track toward the inner or outer circumference of the disk; and a second recording step of recording data on tracks on a second recording surface of the double-side recording disk, using the second recording head, while moving the first and second recording heads in the opposite direction to that in the first recording step.

According to a thirteenth aspect of the present invention, a method for reproducing data recorded by the data recording method according to the eleventh aspect, comprises a first reproduction step of reproducing data recorded on the tracks on the recording surface of the single-side recording disk, for every second track, while moving a reproduction head from a prescribed track toward the inner or outer circumference of the disk; and a second reproduction stop of reproducing data from the remaining tracks which have been skipped in the first reproduction step, while moving the reproduction head in the opposite direction to that in the first reproduction step.

According to a fourteenth aspect of the present invention, a method for reproducing data recorded by the data recording method according to the eleventh aspect, comprises a first reproduction step of reproducing data recorded on the tracks on the recording surface of the single-side recording disk, at larger intervals than at the recording, while moving a reproduction head from a prescribed track toward the inner or outer circumference of the disk; and a second reproduction step of reproducing data from the remaining tracks which have been skipped in the first reproduction step, at larger intervals than at the recording, while moving the reproduction head in the opposite direction to that in the first reproduction step.

According to a fifteenth aspect of the present invention, in the above-mentioned data reproducing method, the reproduction is performed at a speed higher than the recording speed.

According to a sixteenth aspect of the present invention, a method for reproducing data recorded by the data recording method according to the twelfth aspect, comprises a first reproduction step of reproducing data recorded on the tracks on the first recording surface of the double-side recording disk, using a first reproduction head, which moving the first reproduction head and a second reproduction head from a prescribed track toward the inner or outer circumference of the disk; and a second reproduction step of reproducing data recorded on the tracks on the second recording surface of the double-side recording disk, using the second reproduction head, while moving the first and second reproduction heads in the opposite direction to that in the first reproduction step.

According to a seventeenth aspect of the present invention, a method for reproducing data recorded by the data recording method according to the twelfth aspect, comprises a first reproduction step of reproducing data recorded on the tracks on the first recording surface of the double-side recording disk, for every second track, using a first reproduction head, while moving the first reproduction head and a second reproduction head from a prescribed track toward the inner or outer circumference of the disk; and a second reproduction step of reproducing data recorded on the tracks on the second recording surface of the double-side recording disk, for every second track, using the second reproduction head, while moving the first and second reproduction heads in the opposite direction to that in the first reproduction step.

According to an eighteenth aspect of the present invention, in the above-mentioned data reproducing method, the reproduction is performed at a speed higher than the recording speed.

BRIEF DESCRIPTION OF THE DRAWINGS

FIGS. 2(a) and 2(b) are diagrams for explaining the operation of the video signal recording unit according to a first operation mode on the basis of the first embodiment.

FIGS. 3(a) and 3(b) are diagrams for explaining the operation of the video signal recording unit of the television receiver according to the first operation mode on the basis of the first embodiment.

DETAILED DESCRIPTION OF THE PREFERRED EMBODIMENTS

[Embodiment 1]

Figure 1:
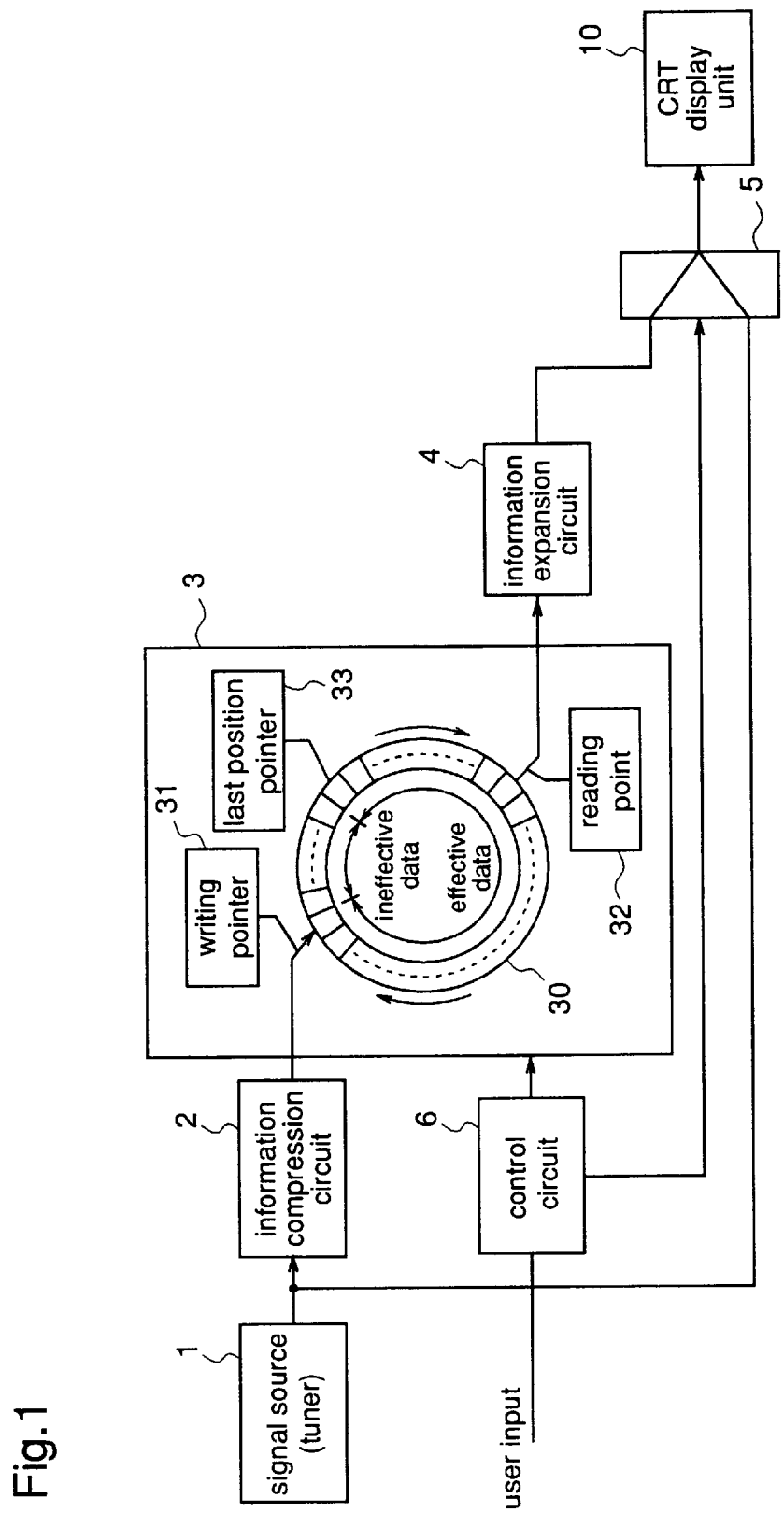
FIG. 1 is a block diagram illustrating a video signal recording unit of a television receiver according to a first embodiment of the invention.

FIG. 1 is a block diagram illustrating a video signal recording and reproduction device employed in a television receiver, according to a first embodiment of the present invention. This device realizes various recording and reproduction functions, such as a playback function. In FIG. 1, reference numeral 1 designates a tuner serving as a signal source, numeral 2 designates an information compression circuit for compressing a video signal output from the tuner 1, and numeral 3 designates a ring buffer for recording the compressed video signal output from the information compression circuit 2. In the ring buffer 3, writing of input data is performed so that address is advanced by one at every input data writing operation, and new input data overwrites old input data when the address makes a round, whereby the past data for a period of time corresponding to the recording capacity from the present time is stored. Reference numeral 30 designates an annular recording medium constituting the ring buffer 3, numeral 31 designates a writing pointer pointing the address of data which is currently being written on the annular recording medium 30, numeral 32 designates a reading pointer pointing the address of data which is currently being read from the annular recording medium 30, and numeral 33 designates a last position pointer pointing the last address of effective data already written on the annular recording medium 30. Further, reference numeral 4 designates an information expansion circuit for expanding the compressed video signal read from the ring buffer 3, numeral 5 designates a selector for selecting one of the video signal output from the tuner 1 and the video signal output from the information expansion circuit 4, numeral 10 designates a CRT display unit for displaying the video signal output from the selector 5, and numeral 6 designates a control circuit for controlling the ring buffer 3 and the selector 5 on the basis of a user input.

A description is now given of examples of operation mode realized by the television receiver shown in FIG. 1.

FIRST OPERATION MODE

The first operation mode described hereinafter is called "interruptible television". In this mode, when the user interrupts watching a television program for a while, he/she can record the program during the interruption and, when he/she starts to watch the program again, he/she can watch the recorded part of the program. Furthermore, while watching the recorded part, the user can catch up with the realtime broadcast of the program within a desired time.

The first operation mode will be described in more detail.

The information compression circuit 2 and the information expansion circuit 4 are used as desired according to the data amount, the size of the recording media, and the data transfer speed. These circuits are not necessary for the description of the first operation mode.

In FIG. 1, the ring buffer 3 is implemented by a mass storage memory capable of reading and writing of data, such as a hard disk drive unit (hereinafter referred to as an HDD). The ring buffer 3 is equipped with the annular recording medium 30 in which addresses are allocated annularly so that an address next to the most significant address returns to the least significant address. Further, the ring buffer 3 is equipped with the writing pointer (WP) 31 pointing the address of data which is currently being written on the annular recording medium 30, a reading pointer (RP) 32 pointing the address of data which is currently being read from the annular recording medium 30, and a last position pointer (LP) 33 pointing the last address of effective data already written on the annular recording medium 30.

The last position pointed by the last positionl pointer 33 is, actually, the position where writing of data on the annular recording medium 30 is started by the writing pointer 31. When the recording on the annular recording medium 30 by the writing pointer 31 is less than one round of the recording medium 30, a portion of the recording medium 30 between the position pointed by the last position pointer 33 and the position pointed by the writing pointer 31, on the side where the reading pointer 32 is not present, becomes an ineffective data region, while a portion of the recording medium 30 between the position pointed by the last position pointer 33 and the position pointed by the writing pointer 31, on the side where the reading pointer 32 is present, becomes an effective data region.

The first operation mode, i.e., the operation of the interruption television, will be described using FIG. 2(a).

In FIG. 2(a), Moni shows the state of a television image, WP shows ON and OFF of the writing pointer 31, RP shows ON and OFF of the reading pointer 32, and a and b show user's instructions (user inputs).

Further, $t_1, t_2, \ldots, t_m$ show data written in the ring buffer 3 at time $t_1, t_2, \ldots, t_m$, respectively, and $t_n(t_1), t_{n+1}(t_3), \ldots, t_{m-1}(t_{m-2}), t_m(t_m)$ show data read from the ring buffer 3 at time $t_n, t_n+1, \ldots, t_m$, respectively (each parenthesis shows the time at which the data is written in the ring buffer).

The reading operation may be performed in such a manner that the frames written as mentioned above are read for every second (third, fourth, . . . ) frame while taking the same time as the writing time for each frame. Alternatively, high-speed reproduction can be realized by appropriately skipping frames. For example, when 1.33 times high-speed reproduction is realized, data are read as follows: $t_1(t_1), t_2(t_2), t_3(t_3), t_5(t_4), t_6(t_5), t_7(t_6), t_9(t_7), t_{10}(t_8), t_{11}(t_9), \ldots$. Furthermore, high-speed reproduction can be realized by reading frames, which have been written one by one, at a speed higher than the wiring speed. For example, when the reading is performed at a speed twice as high as the writing speed, read data will be $t_n(t_1), t_{n+0.5}(t_2), \ldots, t_m(t_{m-1}), t_{m+0.5}(t_m)$.

When the user watches the television broadcast, the selector 5 selects the video signal output from the tuner 1, and the video signal is displayed on the CRT display unit 10. When the user must leave the television for a while, the user inputs a command 'interrupt' into the control circuit 6, as the user input a. Receiving the user input, the control circuit 6 instructs the ring buffer 3 to start recording.

More specifically, the control circuit 6 controls the writing pointer 31 so that the video signal, which is supplied from the tuner 1 and compressed by the information compression circuit 2, is recorded on the annular recording medium 30 through the writing pointer 31 while advancing the writing address one by one. At this time, the control circuit 6 gives the address at the start of writing to the reading pointer 32 as the reading address, whereby the initially written video information is read as a still picture. On the other hand, the selector 5 selects the video signal from the tuner 1, and the video signal is displayed on the CRT display unit 10 even through the user is absent.

When the user comes back to see the sequel of the program, the user inputs a command 'restart' to the control circuit 6 as the user input b. Receiving the user input, the control circuit 6 instructs the writing pointer 31 to continue the writing operation that has been performed after the input of 'interrupt' and, simultaneously, it instructs the reading pointer 32 to start reading operation while advancing the address from the writing start address that is given to the reading pointer 32 when 'interrupt' is input, with the reading speed of the reading pointer 32 higher than the writing speed of the writing pointer 31. As shown in FIG. 2(a), this high-speed reading may be performed by appropriately skipping the written frames, or at a speed higher than the writing speed.

On the other hand, in response to a control signal from the control circuit 6, the selector 5 selects an output from the ring buffer 3, so that the high-speed reproduced video image that is read by the reading pointer 32 is displayed on the CRT display unit 10.

During the high-speed reproduction after the input of 'restart' as the user input b, the high-speed reproduced video image chases the on-air broadcasted video image and, when the high-speed reproduced video image catches up with the one-air broadcasted video image, i.e., when the address of the reading pointer 32 matches the address of the writing pointer 31, the control circuit 6 interrupts both the writing operation by the writing pointer and the reading operation by the reading pointer 32 and, simultaneously, it switches the selector 5 to select the video signal from the tuner 1, whereby the on-air broadcasted video image is displayed on the CRT display unit 10.

In the period $T_2$ during which the user watches the high-speed reproduced video image, since the user watches the video image corresponding to the total of the period $T_1$ during which the user interrupts watching and the period $T_2$ $(T_1+T_2)$, the high-speed reproduction is performed at a speed of $(T_1+T_2)/T_2$ times.

As described above, according to the first operation mode, even when the user must interrupt watching a television program for cooking or the like, the user can see the program throughout, i.e., from the beginning to the end, utilizing the high-speed reproduction.

Further, in the first operation mode, the reading operation may be performed as shown in FIG. 2(b). That is, when 'interrupt' is input, the selector 5 is switched to select the output from the ring buffer 3, and the data $t_1$ at this time is reproduced by the reading pointer 32 during the interruption period to display a still picture on the display unit 10. When 'restart' is input, reading is performed at the reading speed of the reading pointer 32 higher than the writing speed of the writing pointer 31. This high-speed reading may be performed by appropriately skipping the written frames, or frame by frame at a speed higher than the writing speed.

When the reading is performed for every second frame, the read data are given by $t_n(t_2), t_{n+1}(t_4), \ldots, t_{m-1}(t_{m-2}), t_m(t_m)$. When the reading is performed at a speed twice as high as the writing speed, read data will be $t_n(t_2), t_{n+0.5}(t_3), \ldots, t_m(t_{m-1}), t_{m+0.5}(t_m)$. The read data during reading of the still picture are given by $t_2(t_1), t_3(t_1), \ldots, t_{n-1}(t_1)$.

In this way, the video image at the input of 'interrupt' can be displayed on the monitor as a still picture and, when 'restart' in input, reproduction is started as if 'pause' is canceled, whereby smooth reproduction without a sense of incompatibility is realized.

The first operation mode shown in FIG. 2(a) has the following drawbacks. That is, during the interruption, voice from the television catches user's ears although he/she is not watching the picture, and the user already knows the story of the program when he/she watches the program after reproduction. In addition, when the user inputs 'restart', the scene on the screen is returned to fairly previous one, and this is unnatural for the viewer. However, these problems are solved in the first operation mode shown in FIG. 2(b).

While in the first operation mods the reading speed of the reading pointer 32 is higher than the writing speed of the writing pointer 31 when the video image which has been interrupted is resumed, the reading speed may be equal to the writing speed if there is no program to watch subsequent to the program currently being watched.

In order to enable the user to see another program B immediately after a program A that is currently being watched using the above-mentioned "interruptible television", the television receiver is provided with a so-called "catch-up point automatic calculation function". This function will be described hereinafter using FIGS. 3($a$) and 3($b$). As shown in FIG. 3($a$), when 'restart' (user input b) is input, the speed of the high-speed reproduction, i.e., the reading speed of the reading pointer 32, is calculated from the period $T_3$ from the input of 'interrupt' (user input a) to the scheduled ending time of the program A and the period $T_4$ from the input of 'restart' to the scheduled ending time of the program A, according to $T_3/T_4$. Alternatively, as shown in FIG. 3($b$), the reading speed is calculated according to $(T_3-t_1)/T_4$. The high-speed reproduction of the program A is carried out at the calculated reading speed, whereby the reproduction is completed before the broadcasting start time of the program B, i.e., the scheduled ending time of the program A. To implement this function, the scheduled ending time of the program A is given to the control circuit 6.

SECOND OPERATION MODE

In this second operation mode, a multiple interruption function is added to the first operation mode.

That is, when the user is cooking while watching a television broadcast, he/she sometimes interrupts watching the broadcast. In the second operation mode, when the user interrupts watching a program several times, portions of the program during the interruptions are successively recorded so that the user can see these portions later.

Figure 4:
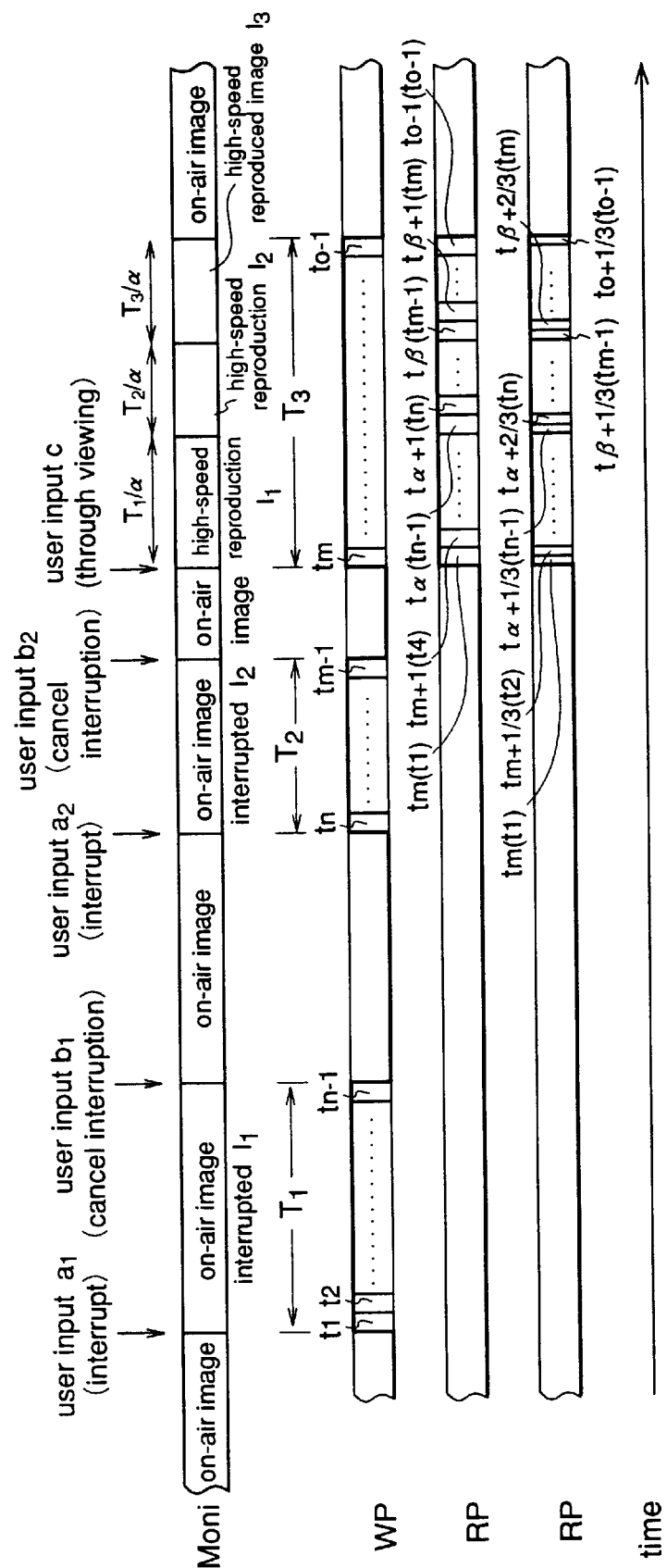
FIG. 4 is a diagram for explaining the operation of the video signal recording unit of the television receiver according to a second operation mode on the basis of the first embodiment.

The second operation mode will be described in more detail using FIG. 4. In a television receiver having the same structure as that mentioned for the first operation mode, initially, a multiple interruption mode is set in the control circuit 6. While watching a program A, the user input 'interrupt', as a first user input $a_1$, to the control circuit 6. Receiving the user input, the ring buffer 3 instructs the writing pointer WP to start writing from the point of time, and a portion of the program during the interruption, i.e., a video signal during on-air image temporary interruption $I_1$, is recorded. In FIG. 4, $t_1, t_2, \ldots, t_{n-1}$ show data written in the ring buffer 3 at time $t_1, t_2, \ldots, t_{n-1}$, respectively. At this time, the on-air video signal is displayed as it is on the CRT display unit 10 although the user is absent.

When the user comes back to see the sequel of the program, the user inputs a command 'cancel interruption' to the control circuit 6 as a user input $b_1$. Receiving the user input, the ring buffer 3 stops the writing of data by the writing pointer WP. Thereafter, the user watches the on-air video image. When the user wants to interrupt watching the program again, the user inputs 'interrupt' again as a user input $a_2$, whereby a portion of the program during the interruption, i.e., a video signal during on-air image temporary interruption $I_2$, is recorded in the ring buffer 3, subsequently to the recorded portion during on-air image temporary interruption $I_1$. In FIG. 4, $t_n, t_{n+1}, \ldots, t_{m-1}$ show data written in the ring buffer 3 at time $t_n, t_{n+1}, \ldots, t_{m-1}$, respectively.

When the user comes back to see the program and inputs 'cancel interruption', as a user input $b_2$, to the control circuit 6, the writing operation in the ring buffer 3 is stopped, and the user watches the on-air video image.

Thereafter, when the user wants to see the recorded portions of the program during the two interruptions and the on-air portion, i.e., the sequel, of the program, the user inputs a command 'through-viewing' as a user input c, to the control circuit 6. Receiving the command through the control circuit 6, the ring buffer 3 continues recording of the on-air video image by the writing pointer 31 from the point of time, and reads data at high speed by the reading pointer 32, whereby the video images $I_1$ and $I_2$ recorded during the two interruptions are reproduced at high speed. Subsequently, the video image $I_3$, which has been recorded after the input of 'through-viewing' (user input c), is reproduced at high speed, and this high-speed reproduced video signal is output through the selector 5 to the CRT display unit 10. When the high-speed reproduction catches up with the on-air broadcasting, the selector 5 is switched, and the on-air video image from the tuner 1 is displayed on the CRT display unit 10. In FIG. 4, $t_m, t_{m+1}, \ldots, t_{o-1}$ show data written in the ring buffer 3 at time $t_m, t_{m+1}, \ldots, t_{o-1}$, respectively, and $t_m(t_1), t_{m+1}(t_4), \ldots, t_{\alpha-1}(t_{n-4}), t_\alpha(t_{n-1})$ show data $I_1$ read from the ring buffer 3 at time $t_m, t_{m+1}, \ldots, t_{\alpha-1}, t_\alpha$, respectively, $t_{\alpha'1}(t_n), t_{\alpha+2}(t_{n+3}), \ldots, t_{\beta-1}(t_{m-4}), t_\beta(t_{m-1})$ show data $I_2$ read from the ring buffer 3 at time $t_{\alpha+1}, t_{\alpha+2}, \ldots, t_{\beta-1}, t_\beta$, respectively, and $t_{\beta+1}(t_m), t_{\beta+2}(t_{m+3}), \ldots, t_{o-2}(t_{o-4}), t_{o-1}(t_{o-1})$ show data $I_3$ read from the ring buffer 3 at time $t_{\beta+1}, t_{\beta+2}, \ldots, t_{o-2}, t_{o-1}$, respectively. The time given in the parentheses is the time at which each data is written in the ring buffer 3.

The reading operation is performed in such a manner that the frames written as mentioned above are read for every third frame to realize high-speed reproduction, or by appropriately skipping the frames to realize high-speed reproduction that is not higher than the high-speed reproduction for every third frame. Alternatively, the frames, which have been written one by one, may be read at a speed three times or less as high as the writing speed. For example, when the frames are read at a speed three times as high as the writing speed, data $I_1$ read from the ring buffer 3 will be $t_m(t_1), t_{m+\frac{1}{3}}(t_2), \ldots, t_\alpha(t_{n-2}), t_{\alpha+\frac{1}{3}}(t_{n-1})$. Further, data $I_2$ are given by $t_{\alpha+\frac{2}{3}}(t_n), t_{\alpha+1}(t_{n+1}), \ldots, t_\beta(t_{m-2}), t_{\beta+\frac{1}{3}}(t_{m-1})$, and data $I_3$ are given by $t_{\beta+\frac{2}{3}}(t_m), t_{\beta+1}(t_{m+1}), \ldots, t_o(t_{o-2}), t_{o+\frac{1}{3}}(t_{o-1})$.

The period $T_1$ of the first interruption, the period $T_2$ of the second interruption, the period $T_3$ which is equal to the total of the period of high-speed reproduction of the video images $I_1$ and $I_2$ corresponding to $T_1$ and $T_2$, respectively, and the period of high-speed reproduction of the video image $I_3$, which image is broadcasted (recorded) during the reproduction of the video images $I_1$ and $I_2$, to make the video image $I_3$ catch up with the on-air broadcasting, and the speed ($\alpha$ times) of the high-speed reproduction have a relationship, $T_1+T_2+T_3=\alpha T_3$. Therefore, the high-speed reproduction is performed at a speed given by $\alpha=(T_1+T_2+T_3)/T_3$.

Accordingly, the high-speed reproduction of the video images $I_1$, $I_2$, and $I_3$ takes time $T_1/\alpha$, $T_2/\alpha$, $T_3/\alpha$, respectively.

Figure 5:
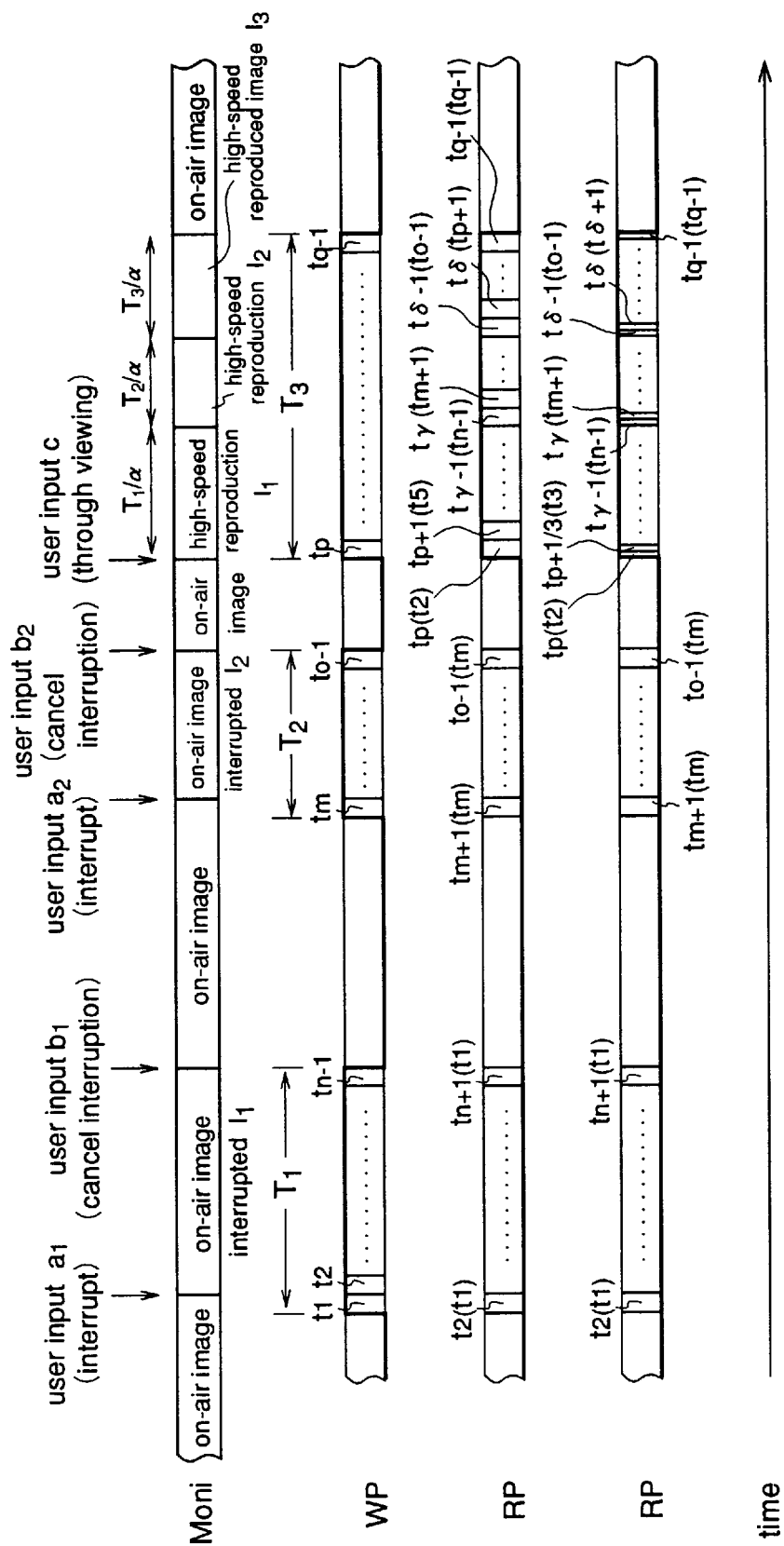
FIG. 5 is a diagrams for explaining the operation of the video signal recording unit according to the second operation mode on the basis of the first embodiment.

In the second operation mode, the reading operation may be performed as shown in FIG. 5. That is, when 'interrupt' (user input $a_1$) is input, the selector 5 is switched to select the output from the ring buffer 3, and the data $t_1$ at this time is reproduced by the reading pointer 32 during the interruption period $T_1$ so as to display a still picture on the display unit 10. This processing is performed when 'interrupt' (user input $a_2$) is input. When 'through-viewing' (user input c) is input, reading is performed at the reading speed of the reading pointer 32 higher than the writing speed of the writing pointer 31. This high-speed reading may be performed, as shown in FIG. 5, for every third frame, or by appropriately skipping the frames. Alternatively, the high-speed reading can be performed frame by frame at a speed three times or less as high as the writing speed.

Assuming that the data written in the period $T_1$ are $t_1$, $t_2, \ldots, t_{n-1}$, the data written in the period $T_2$ are $t_m, t_{m+1}, \ldots, t_{o-1}$, and the data written in the period $P_3$ are $t_p, t_{p+1}, \ldots, t_{q-1}$, the data read in the period $T_1$ are $t_2(t_1), t_3(t_1), \ldots, t_{n-1}(t_1)$, and the data read in the period $T_2$ are $t_{m+2}(t_m), t_{m+3}(t_m), \ldots, t_{o-1}(t_m)$.

Further, reading of data in the period $T_3$ is performed for every third frame, or by appropriately skipping the frames. When it is performed for every third frame, the high-speed reproduced data $I_1$ are $t_p(t_2), t_{p+1}(t_5), \ldots, t_{\gamma-2}(t_{n-4}), t_{\gamma-1}(t_{n-1})$, the high-speed reproduced data $I_2$ are $t_\gamma(t_{m+1}), t_{\gamma+1}(t_{m+4}), \ldots, t_{\delta-2}(t_{o-4}), t_{\delta-1}(t_{o-1})$, and the high-speed reproduced data $I_3$ are $t_\delta(t_{p+1}), t_{\delta+1}(t_{p+4}), \ldots, t_{q-2}(t_{q-4}), t_{q-1}(t_{q-1})$.

By the way, reading of data in the period $T_3$ may be performed frame by frame at a speed three or more times as high as the writing speed of each frame. When reading is performed at a speed three times as high as the writing speed, the high-speed reproduced data $I_1$ are $t_p(t_2), t_{p+\frac{1}{3}}(t_3), \ldots, t_{\gamma-\frac{1}{3}}(t_{n-2}), t_{\gamma-1}(t_{n-1})$, the high-speed reproduced data $I_2$ are $t_\gamma(t_{m+1}), t_{\gamma+\frac{1}{3}}(t_{m+2}), \ldots, t_{\delta-\frac{1}{3}}(t_{o-2}), t_{\delta-1}(t_{o-1})$, and the high-speed reproduced data $I_3$ are $t_\delta(t_{p+1}), t_{\delta+\frac{1}{3}}(t_{p+2}), \ldots, t_{q-\frac{1}{3}}(t_{q-2}), t_{q-1}(t_{q-1})$.

In this way, the video image at the input of 'interrupt' can be displayed as it is, i.e., as a still picture, and the user can see video images during the plural interruption periods at high speed.

As described above, according to the second operation mode, even when the user interrupts watching a program several times, he/she can see portions of the program during the interruptions, throughout, and the rest of the program.

When the user gives 'through-viewing' after the program has ended, he/she can see only the portions of the program during the several interruptions.

[Embodiment 2]

Figure 6:
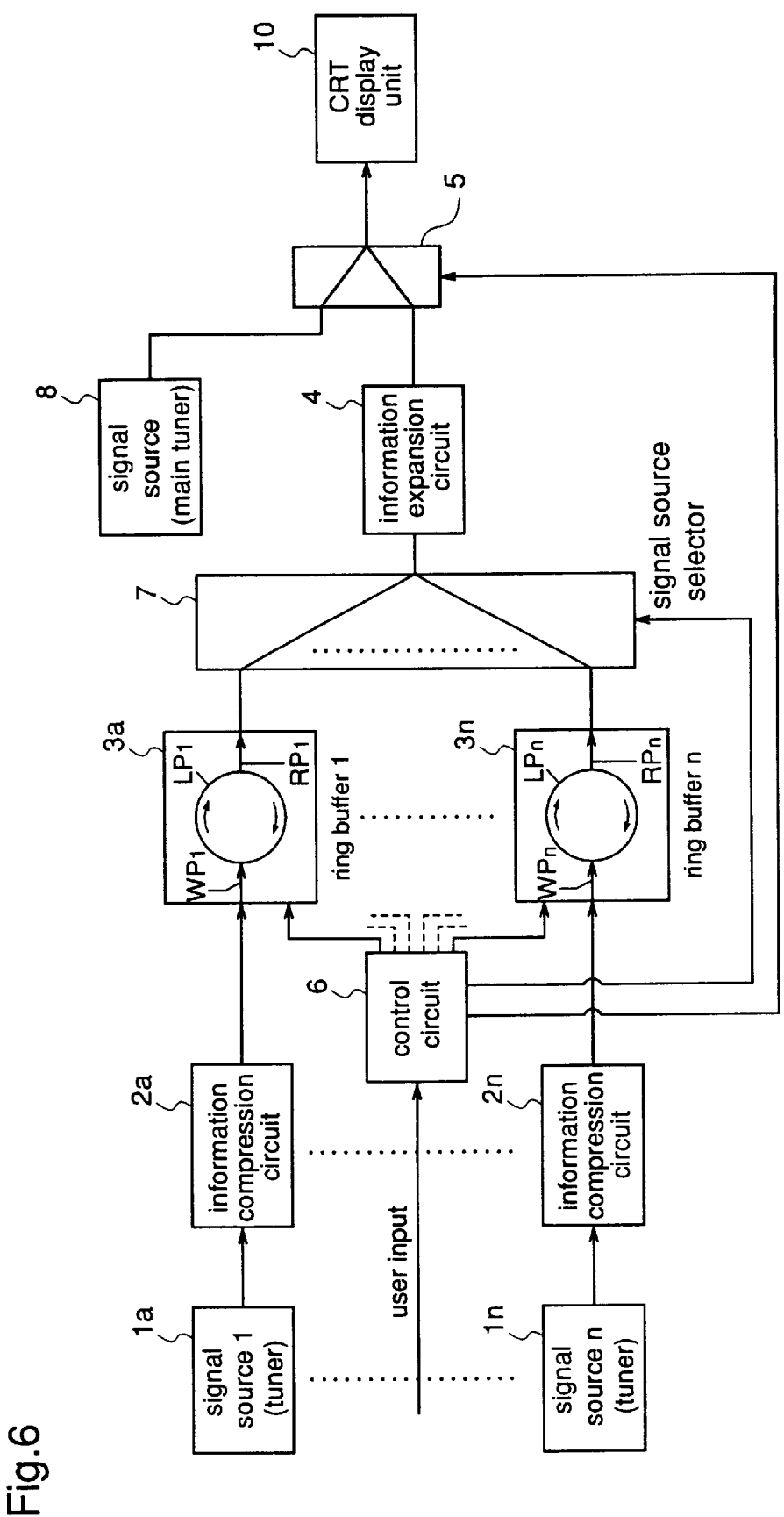
FIG. 6 is a block diagram illustrating a video signal recording unit of a television receiver according to a second embodiment of the invention.

FIG. 6 is a block diagram illustrating a video signal recording unit included in a television receiver, according to a second embodiment of the present invention. In this second embodiment, the television receiver is equipped with plural pairs of tuners (1a to 1n) and ring buffers (3a to 3n), and signals output from the respective ring buffers are selected by a selector 7.

Figure 7:
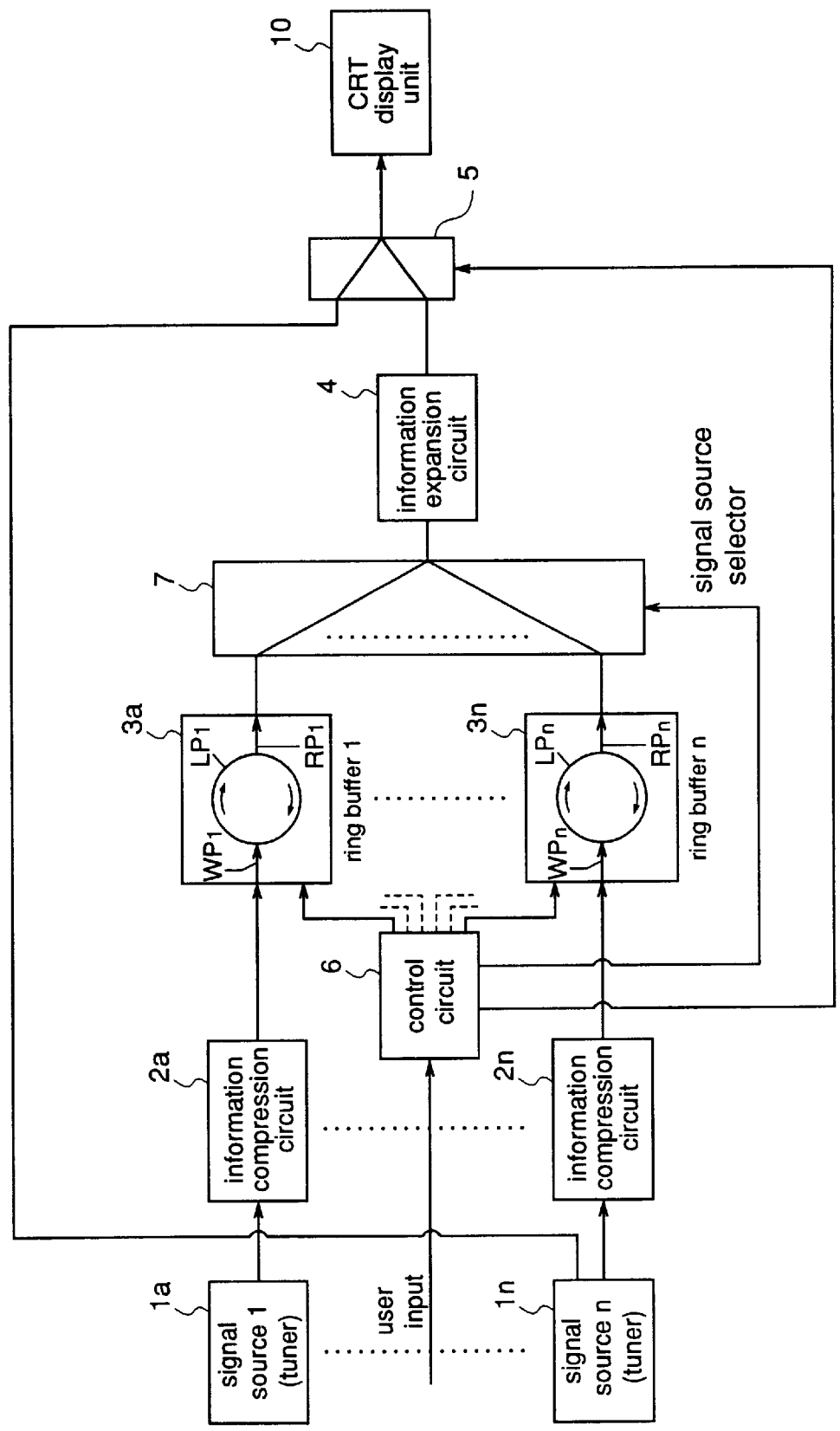
FIG. 7 is a block diagram illustrating a video signed recording unit of the television receiver according to the second embodiment of the invention.

More specifically, in FIG. 6, reference numerals 1a to 1n designate tuners serving as signal sources, numerals 2a to 2n designate information compression circuits for compressing video signals output from the tuners 1a to 1n, numerals 3a to 3n designate ring buffers for recording the compressed video signals output from the information compression circuits 2a to 2n, numeral 7 designates a signal source selector for selecting one of the video signals output from the ring buffers 3a to 3n, and numeral 5 designates a selector for selecting one of an output from the signal source selector 7 and an output from a main tuner 8. As shown in FIG. 7, when one of the tuners 1a to 1n serves as a main tuner, the main tuner 8 can be dispensed with. This is implemented by connecting a signal source tuner which receives a channel to be received by the main tuner 8, for example, the tuner 1n, to the selector 5.

THIRD OPERATION MODE

A description is given of a third operation mode realized by the television receiver according to the second embodiment.

This third operation mode is called "solution of overlapped broadcast time". More specifically, when a user who is watching a program A wants to watch a program D which will be later broadcasted on another channel, if the broadcasting of the program A is extended, the broadcast time of the program A will overlap with the broadcast time of the program D. In such a case, the third operation mode enables the use to see both the programs A and B throughout.

Figure 8:
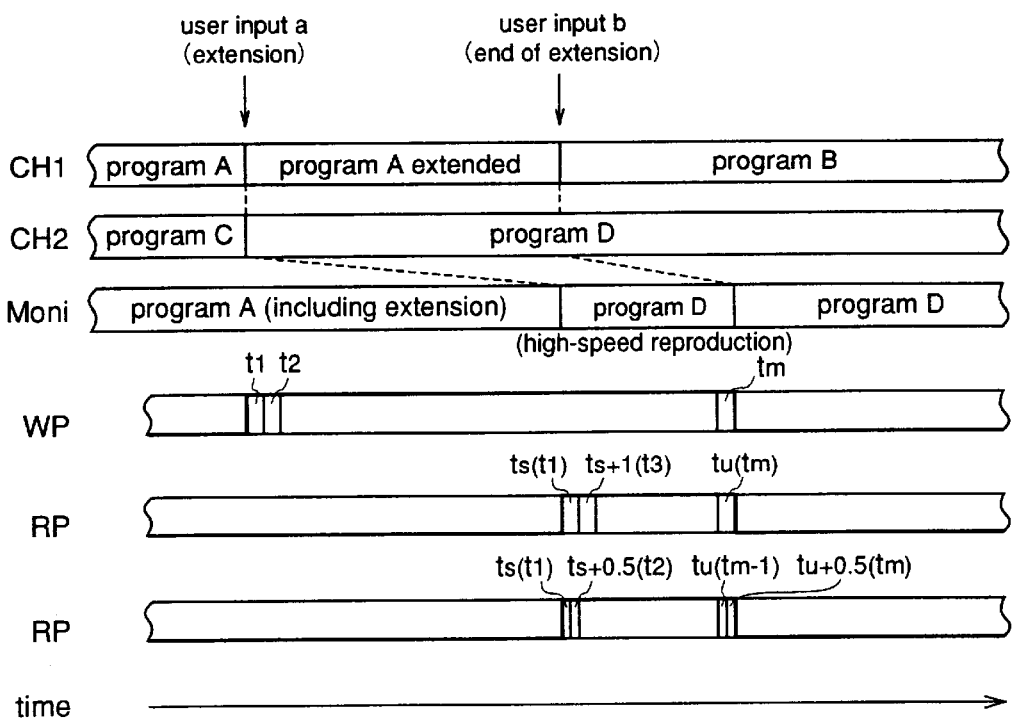
FIG. 8 is a diagram for explaining the operation of the video signal recording unit according to a third operation mode on the basis Of the second embodiment.

As shown in FIG. 8, when the user who is watching the program A on channel CH1 wants to see the program D on channel CH2, if the broadcasting of the program A on channel CH1 is extended, the user inputs a command 'extension' as a user input a. Receiving the user input, the main tuner 8 or the tuner 1n continues to receive the program A on channel CH1, and this program A is selected by the selector 5 and output to the CRT display unit 10. The CRT display unit 10 continues to display the video image of the program A. On the other hand, when 'extension' (user input a) is input to the control circuit 6, the control circuit 6 instructs the tuner 1a to receive the program D on channel CH2, whereby the program D is recorded on the ring buffer 3a. In FIG. 8, $t_1, t_2, \ldots, t_m$ show data recorded on the ring buffer 3a at time $t_1, t_2, \ldots, t_m$, respectively.

When the program A on channel CH1 has ended, the user inputs 'end of extension' as a user input b. Receiving the user input b, the ring buffer 3a performs high-speed reproduction of the program D on channel CH2, which program has been received by and recorded in the tuner 1a after the input of 'extension'.

When this high-speed reproduction is performed for every second frame, the reproduced data will be $t_s(t_1), t_{s-1}(t_3), \ldots, t_{u-1}(t_{m-2}), t_u(t_m)$, and this means that these data are reproduced at time $t_s, t_{s+1}, t_{u-1}, t_u$, respectively. When the high-speed reproduction is realized at double-speed, reproduced data will be $t_s(t_1), t_{s+0.5}(t_2), \ldots, t_u(t_{m-1}), t_{u+0.5}(t_m)$, and this means that these data are reproduced at time $t_s, t_{s+0.5}, \ldots, t_u, t_{u+0.5}$, respectively.

During the high-speed reproduction, as instructed by the control circuit 6, the selector 7 selects the high-speed reproduced video image of the program D that is output from the ring buffer 3a and, at the input of 'end of extension' (user input b), the selector 5 is switched from selecting an output from the tuner 8 or the tuner 1a to selecting outputs output from the ring buffers 3a to 3n, whereby the high-speed reproduced video image of the program D id displayed on the CRT display unit 10. When the high-speed reproduction of the program D catches up with the on-air broadcasting of the program D, the on-air broadcasting of the program D is displayed.

According to the above-mentioned operation, on the CRT monitor, the program A and the extended part of the program A are displayed and, subsequently, the high-speed reproduced video image of the program D is displayed from the beginning and, thereafter, the on-air video image of the program D is displayed without interruption. Therefore, after watching the program A throughout, the user can watch the program D whose broadcast time overlaps with the broadcast time of the extended part of the program A, throughout.

Although in this third operation mode the program D is reproduced at high speed so as to catch up with the on-air broadcasting thereof, when the user has no program to watch subsequently to the program D, the reproduction of the program D may be performed at the same speed as the speed of the on-air broadcasting.

When the user wants to see another program after the program D, it is possible to control the speed of the high-speed reproduction of the program D so that the reproduction of the program D is ended before the end of the on-air broadcasting of the program D, that is, so that the reproduction of the program D catches up with the on-air broadcasting thereof within the broadcast time, as mentioned for the first embodiment of the present invention.

Although in the above-mentioned third operation mode only one or two of the tuners $1a$ to $1n$ is/are used, more tuners may be used to solve overlapping of broadcast time for more channels.

FOURTH OPERATION MODE

This fourth operation mode is called "zapping connection". For example, when a user wants to watch all of three programs A, B, and C on three channels CH1, CH2, and CH3, respectively, this fourth operation can meet tile user's request using the high-speed reproduction mentioned above. If the user's request is to see all the programs intermittently, even a conventional television receiver can meet this request by "zapping", i.e., changing the channel successively using the commercial time. However, this fourth operation mode enables the user to watch all the programs A, B, and C throughout, from the beginning to the end.

Figure 9:
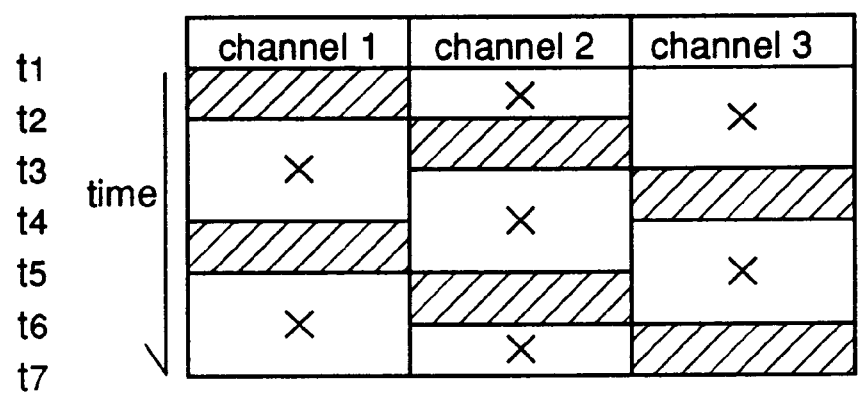
FIG. 9 is a diagram for explaining zapping.

As shown in FIG. 9, three programs A, B, C are simultaneously broadcasted on channels CH1, CH2, and CH3, respectively. In the figure, hatched regions show periods of time during which the user watches the programs, and regions with x show periods of time during which the user cannot watch the programs.

When the user watches the channel CH1 ($t_1$–$t_2$ and $t_4$–$t_5$), the user cannot watch the channels CH2 and CH3. When the user watches the channel CH2 ($t_2$–$t_3$ and $t_5$–$t_6$), the user cannot watch the channels CH1 and CH3. Likewise, when the user watched the channel CH3 ($t_3$–$t_4$ and $t_6$–$t_7$), the user cannot watch the channels CH1 and CH2.

Figure 10:
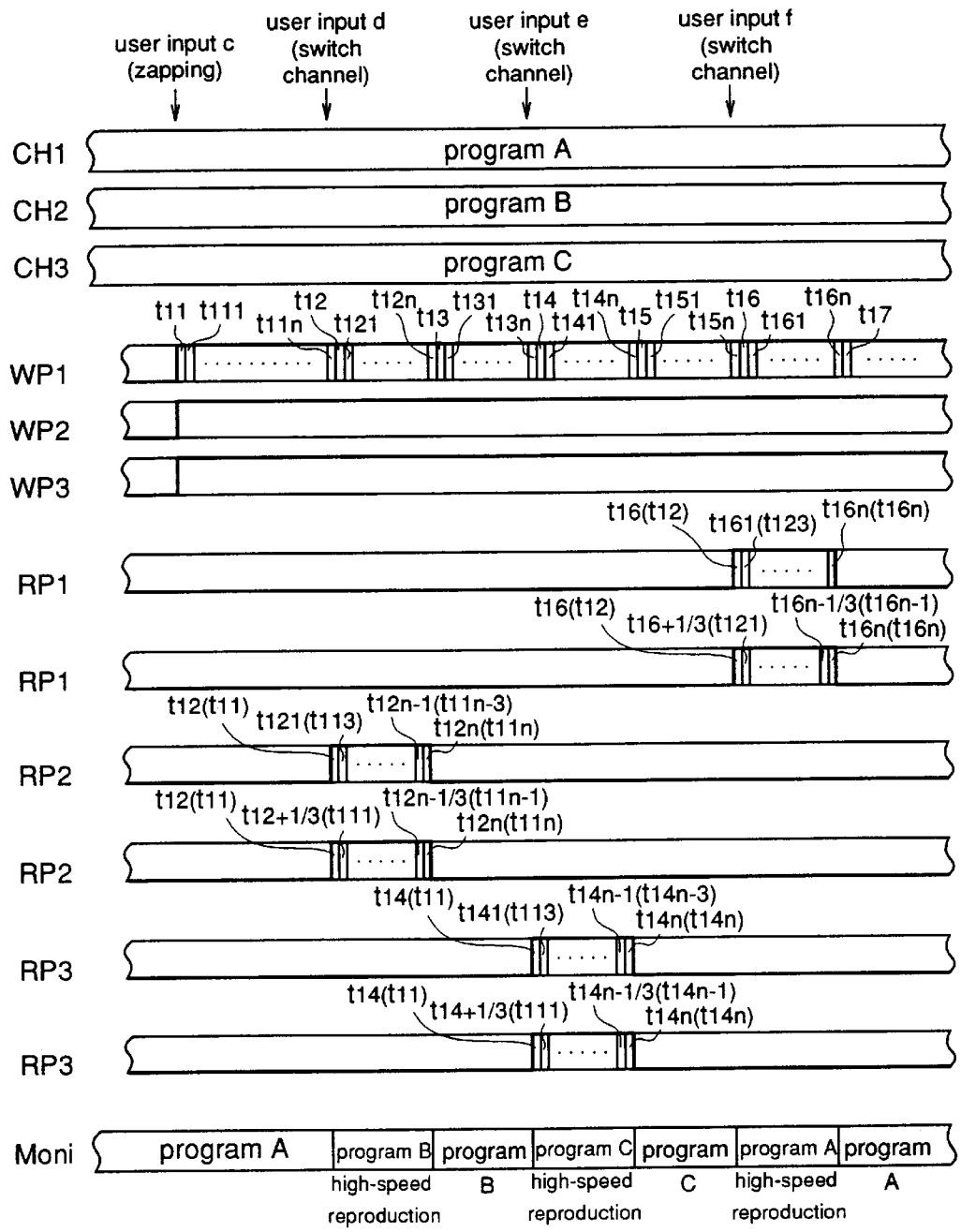
FIG. 10 is a diagram for explaining the operation of the video signal recording unit according to a fourth operation mode on the basis of the second embodiment.

After selecting the three channels CH1, CH2, CH3 for which zapping is desired, the user inputs a command 'zapping' as a user input c. Receiving this command through the control circuit 6, the tuners $1a$, $1b$, and $1c$ receive video signals of the channels CH1, CH2, and CH3, respectively. As shown in FIG. 10, at time $t_{11}$, the writing pointers WP1–WP3 in the respective ring buffers $3a$–$3c$ start writing operation, whereby the programs A, B, ant C are recorded. In FIG. 10, $t_{11}, t_{111}, \ldots, t_{11n}, t_{12}, t_{121}, \ldots, t_{12n}, \ldots, t_{151}, \ldots, t_{15n}, t_{16}, t_{161}, \ldots, t_{16n}$ show data written in the respective ring buffers $3a$–$3c$ at time $t_{11}, t_{111}, \ldots, t_{11n}, t_{12}, t_{121}, \ldots, t_{12n}, \ldots, t_{151}, \ldots, t_{15n}, t_{16}, t_{161}, \ldots, t_{16n}$, respectively.

Figure 11:
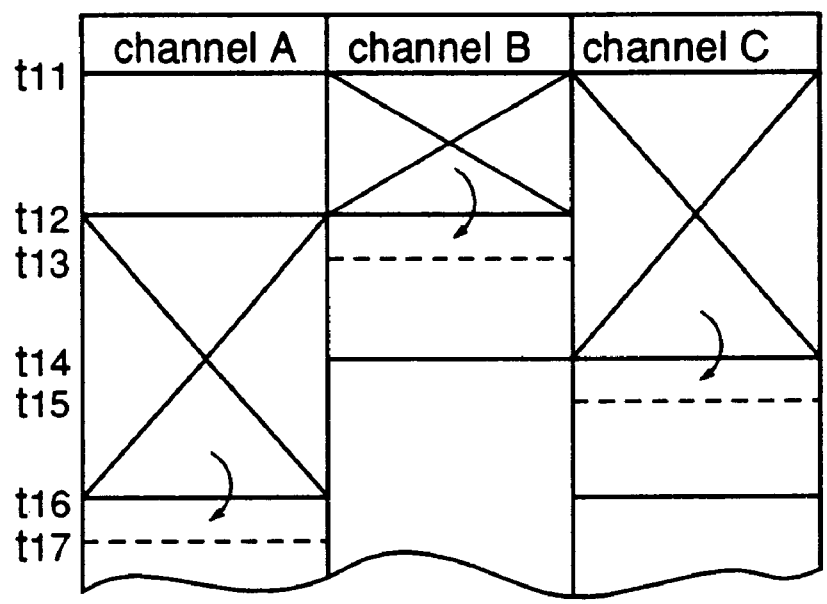
FIG. 11 is a diagram for explaining zapping connection according to the fourth operation mode.

On the other hand, as shown in FIG. 11, the tuner 8 or the tuner $1n$ receives the video signal of the channel CH1 which is the first channel at the input of 'zapping' at time $t_{11}$, and this video signal is selected in the selector 5, so that the program A of the channel CH1 is displayed on the CRT display unit 10.

When a command 'switch channel' is input as a user input d at time $t_{12}$, the tuner 8 or the tuner $1n$ switches the channel to the channel CH2 which is the second channel at the input of 'zapping', and the ringer buffer $3b$ instructs the reading pointer RP2 to perform high-speed reading, whereby the program B which has been broadcasted and recorded during a period from the input of 'zapping' (user input c) to the input of 'switch channel' (user input d) is reproduced for every second (third, fourth, . . . ) frame. In FIG. 11, $t_{12}(t_{11})$, $t_{121}(t_{113})$, $t_{12n-1}(t_{11n-3})$, $t_{12n}(t_{11n})$ are high-speed reproduced data read from the ring buffer $3b$ for every second frame, at time $t_{12}, t_{121}, \ldots, t_{12n-1}, t_{12n}$, respectively. This high-speed reproduction may be performed by reading data at a speed three times or more as high as the writing speed. When data is read at a speed three times as high as the writing speed, reproduced data will be $t_{12}(t_{11})$, $t_{12+\frac{1}{3}}(t_{111})$, . . . , $t_{12n-\frac{1}{3}}(t_{11n-1})$, $t_{12n}(t_{11n})$.

On the other hand, according to the command 'switch channel', the selector 5 is switched to select an output from the ring buffer, whereby the high-speed reproduced video image of the program B is displayed on the CRT display unit 10. At time $t_{13}$, when the high-speed reproduction of the program B catches up with the on-air broadcasting of the program B, the reading operation of the reading pointer RP2 is stopped, and no video signal is output from the ring buffer $3b$. At this time, the selector 5 is switched to select an output from the tuner 8, and the on-air broadcast of the program B from the tuner 8 or the tuner $1n$ is displayed on the CRT display unit 10.

At time $t_{14}$, when a command 'switch channel' is input as a user input e, the tuner 8 or the tuner $1n$ switches the channel to the channel CH3 which is the third channel at the input of 'zapping', and the ringer buffer $3c$ instructs the reading pointer RP3 to perform high-speed reading for every second (third, fourth, . . . ) frame, whereby the program C which has been broadcasted and recorded during a period from the input of 'zapping' (user input c) at time $t_{11}$ to the input of 'switch channel' (user input e) at time $t_{14}$ is reproduced. In FIG. 11, $t_{14}(t_{11}), t_{141}(t_{113}), \ldots, t_{14n-1}(t_{14n-3})$, $t_{14n}(t_{14n})$ are high-speed reproduced data read from the ring buffer $3c$ for every third frame, at time $t_{14}, t_{141}, \ldots, t_{14n-1}$, $t_{14n}$, respectively. This high-speed reproduction may be performed by reading data at a speed three times or more as high as the writing speed. When data is read at a speed three times as high as the writing speed, reproduced data will be $t_{14}(t_{11})$, $t_{14+\frac{1}{3}}(t_{111})$, . . . , $t_{14n-\frac{1}{3}}(t_{14n-1})$, $t_{14n}(t_{14n})$.

On the other hand, according to the command 'switch channel' at time $t_{14}$, the selector 5 is switched to select an output from the ring buffer $3c$, whereby the high-speed reproduced video image of the program C is displayed on the CRT display unit 10. At time $t_{15}$, when the high-speed reproduction of the program C catches up with the on-air broadcasting of the program C, the reading operation of the reading pointer RP3 is stopped, and no video signal is output from the ring buffer $3c$. At this time, the selector 5 is switched to select an output from the tuner 8 or the tuner $1n$, and the on-air broadcast of the program C from the tuner 8 or the tuner $1n$ is displayed on the CRT display unit 10.

At time $t_{16}$, when a command 'switch channel' is input as a user input f, the tuner 8 or the tuner $1n$ switches the channel to the channel CH1, and the ringer buffer $3a$ instructs the reading pointer RP1 to perform high-speed reading, whereby the program A, which has been broadcasted and recorded from time $t_{12}$ when the command 'switch channel' (user input d) is input to the ring buffer $3a$, is reproduced for every third (fourth, fifth . . . ) frame. In FIG. 11, $t_{16}(t_{12})$, $t_{161}(t_{123})$, . . . , $t_{16n-1}(t_{16n-3})$, $t_{16n}(t_{16n})$ are high-speed reproduced data read from the ring buffer $3a$ for every third frame, at time $t_{16}, t_{161}, \ldots, t_{16n-1}, t_{16n}$, respectively. This high-speed reproduction may be performed by reading data at a speed three times or more as high as the writing speed. When data is read at a speed three times as high as the writing speed, reproduced data will be $t_{16}(t_{12})$, $t_{16+\frac{1}{3}}(t_{121})$, . . . , $t_{16n-\frac{1}{3}}(t_{16n-1})$, $t_{16n}(t_{16n})$.

On the other hand, according to the command 'switch channel', the selector 5 is switched to select an output from the ring buffer $3a$, whereby the high-speed reproduced video image of the program A is displayed on the CRT display unit 10. At time $t_{17}$, when the high-speed reproduction of the program A catches up with the on-air broadcasting of the program A, the reading operation of the reading pointer RP1 is stopped, and no video signal is output from the ring buffer $3a$. At this time, the selector 5 is switched to select an output from the tuner 8, and the on-air broadcast of the program A from the tuner 8 is displayed on the CRT display unit 10. Thereafter, the operation for the second time display, similar to the above-mentioned one for the program A, is repeated.

As described above, according to the fourth operation mode, the programs A, B, and C, which are broadcasted in the same period of time, are recorded simultaneously using plural tuners and ring buffers and, for example, when the channel is switched from the program A to the program B, high-speed reproduction of the program B on the channel CH2, which program has been recorded during user's watching the program A, is performed and, thereafter, the on-air broadcasting of the program B is displayed. Thereafter, in similar manner, when the channel is switched to the program C, high-speed reproduction of the program C on the channel CH3, which program has been recorded during user's watching the programs A and B, is performed and, thereafter, the on-air broadcasting of the program C is displayed. Thereafter, at every switching of the channel, the display of the high-speed reproduction and the display of the on-air broadcasting are performed. Therefore, the user can watch a plurality of programs broadcasted in the same period of time, throughout, by successively switching the channel.

Although zapping of three channels is described, this fourth operation mode is applicable to zapping of n (integer not less than 2) channels, and this zapping is realized by n-times high-speed reproduction.

Furthermore, when this fourth operation mode is combined with a function of automatically recognizing a portion of program that is not desired by the user, for example, commercial, recording and display of the unnecessary portion can be eliminated. For the above-mentioned zapping of three channels, a reproduction speed three times or more as high as the recording speed is needed. However, when the unnecessary portion, such as commercial, is eliminated, zapping of three channels is realized at a speed lower than the above-mentioned reproducing speed.

[Embodiment 3]

Figure 12:
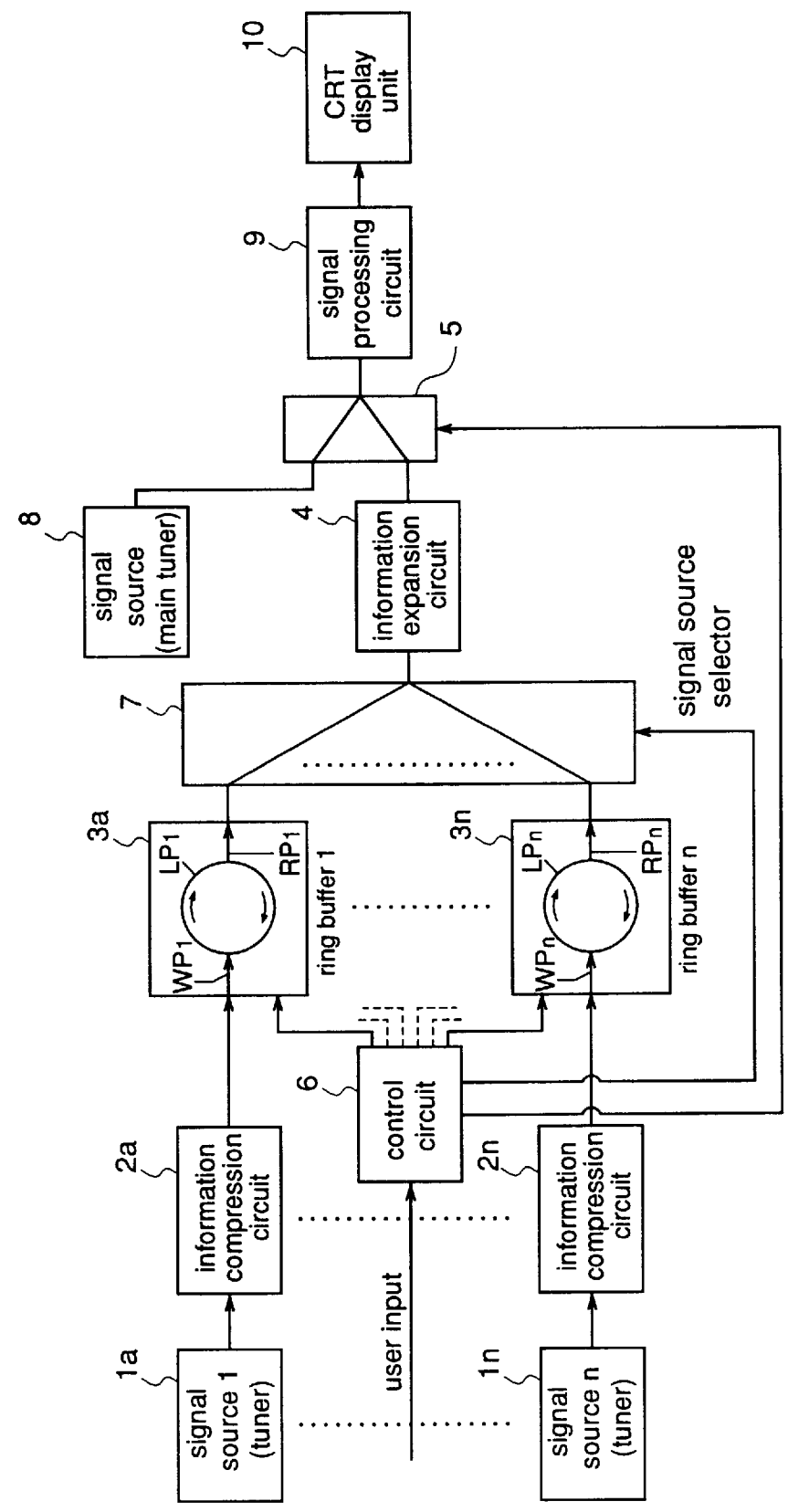
FIG. 12 is a block diagram illustrating a video signal recording unit of a television receiver according to a third embodiment of the invention.

FIG. 12 is a block diagram illustrating a video signal recording unit included in a television receiver according to a third embodiment of the present invention. In this third embodiment, multi-window display is realized for an output from the selector 7 shown in FIGS. 6 or 7.

Figure 13:
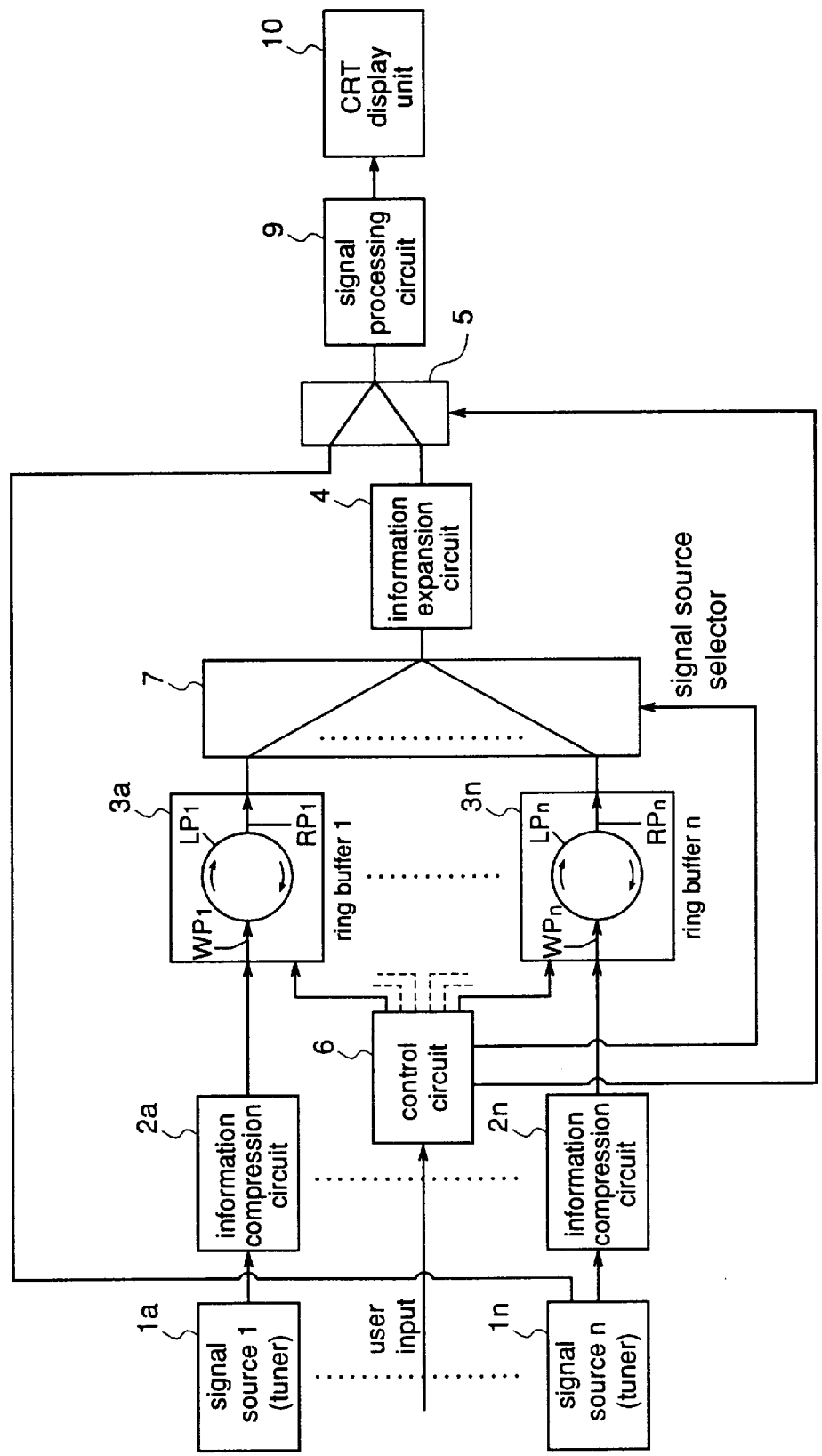
FIG. 13 is a block diagram illustrating a video signal recording unit of the television receiver according to the third embodiment of the invention.

More specifically, in FIGS. 12 and 13, reference numeral 9 designate a signal processing circuit wherein an output from the selector 7 is processed for multi-window display on the CRT display unit 10.

A description is now given of a fifth operation mode that is realized using the structure according to this third embodiment.

FIFTH OPERATION MODE

This fifth operation mode is called "rapid traverse index". In this mode, a user reproduces and watches plural programs, which have been broadcasted and recorded before his/her return home, and then he/she can select some of the plural programs. More Specifically, plural programs selected by a user in advance are recorded in plural ring buffers. When the user turns on the television at an arbitrary time, these programs, which are being recorded, are displayed by multi-window at the same time, and the user selects his/her favorite program. In this way, the user can watch one of the programs, or some of the programs using multi-window. Here, 'multi-window' is to divide one monitor screen into plural parts.

In the television receiver according to this third embodiment, the selector 7 shown in FIGS. 12 and 13 selects some of plural channels of the plural ring buffers 3a to 3n, and the signal processing circuit 9 processes output signals from the selector 7 for multi-window display, whereby the selected channels are displayed on the CRT display unit 10 by multi-window.

A description is given of the operation.

Figure 14:
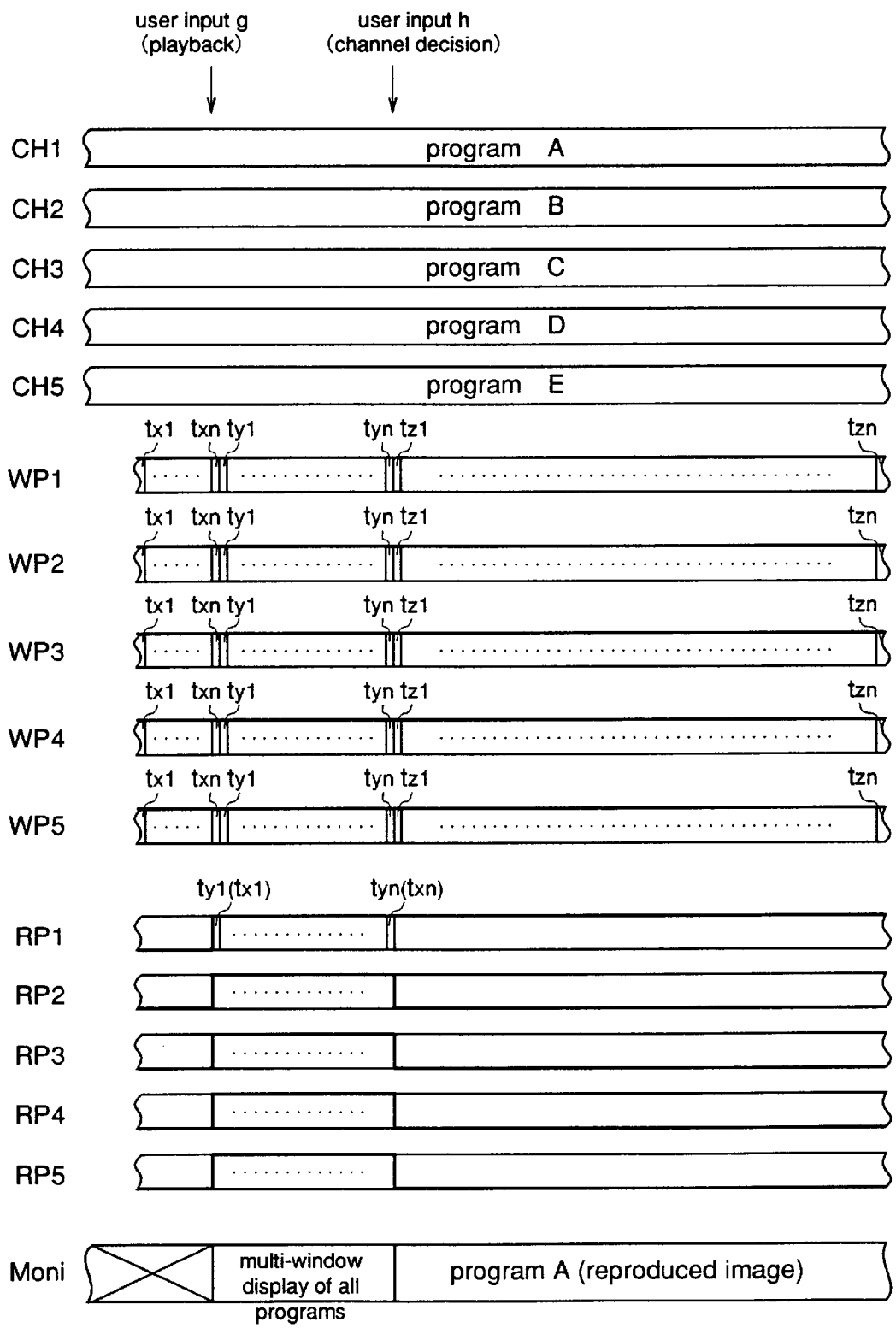
FIG. 14 is a diagram for explaining the operation of the video signal recording unit according to a fifth operation mode on the basis of the third embodiment.

When the user goes out, he/she sets plural channels (five channels in this embodiment) so that he/she can select and see programs on these channels later. Receiving the user input, as shown in FIG. 14, five programs A to E broadcasted on the five channels CH1 to CH5 are received by the tuners 1a to 1e, compressed by the information compression circuits 2a to 2e, and recorded in the ring buffers 3a to 3e, respectively. As shown in FIG. 14, this recording is performed for a prescribed period of time, for example, two hours, before the user's switching on the television. In FIG. 14, $t_{x1}, \ldots, t_{xn}, t_{y1}, \ldots, t_{yn}, t_{z1}, \ldots, t_{zn}$ show data written in the ring buffers 3a to 3e at time $t_{x1}, \ldots, t_{xn}, t_{y1}, \ldots, t_{yn}, t_{z1}, \ldots, t_{zn}$, respectively.

When the user comes home, he/she puts a playback signal as a user input g. Receiving the user input g at time $t_{y1}$, the control circuit 6 shown in FIG. 12 controls the ring buffers 3a to 3e so that the reading pointer RP1 to RP5 start reading and reproduction of video signals of the respective programs A to E, from the writing start addresses of the writing pointers WP1 to WP5, while continuing writing by the writing pointer WP1 to WP5. In FIG. 14, $t_{y1}(t_{x1}), \ldots, t_{yn}(t_{xn})$ show data read from the ring buffers 3a to 3e at time $t_{y1}, \ldots, t_{yn}$, respectively.

With the reading and reproduction of the video signals of the programs A to E, the selector 7 selects outputs from the ring buffers 3a to 3e, and the selector 5 selects an output from the selector 7. These output signals are input to the signal processing circuit 9, processed for multi-window display, and output to the CRT display unit 10, whereby multi-window display of the programs A to E is realized.

Watching the multi-window display, the user selects one of the programs A to B (in this embodiment, A), and a channel decision signal is input as a user input h. Receiving the user input h at time $t_{z1}$, the control circuit 6 shown in FIG. 12 instructs the reading pointers RP2 to RP5 to stop reading of the other programs B to E, and instructs the selector 7 to select an output from the ring buffer 3a that reproduces the video image of the selected program A. In FIG. 14, $t_{z1}(t_{y1}), \ldots, t_{zn}(t_{yn})$ show data read from the ring buffer 3a at time $t_{z1}, \ldots, t_{zn}$, respectively.

The ring buffer 3a reproduces and outputs an image at the same speed as the speed of the on-air broadcasting by making the speed of advancing the address of the reading pointer RP equal to the writing speed. In the signal processing circuit 9, the multi-window display is canceled, whereby only the selected program A output from the ring buffer 3a is displayed on the CRT display unit 10. At this time, to reduce power consumption, writing operation of the writing pointers WP2 to WP5 of the ring buffers for recording the unselected programs B to E may be stopped.

Figure 15:
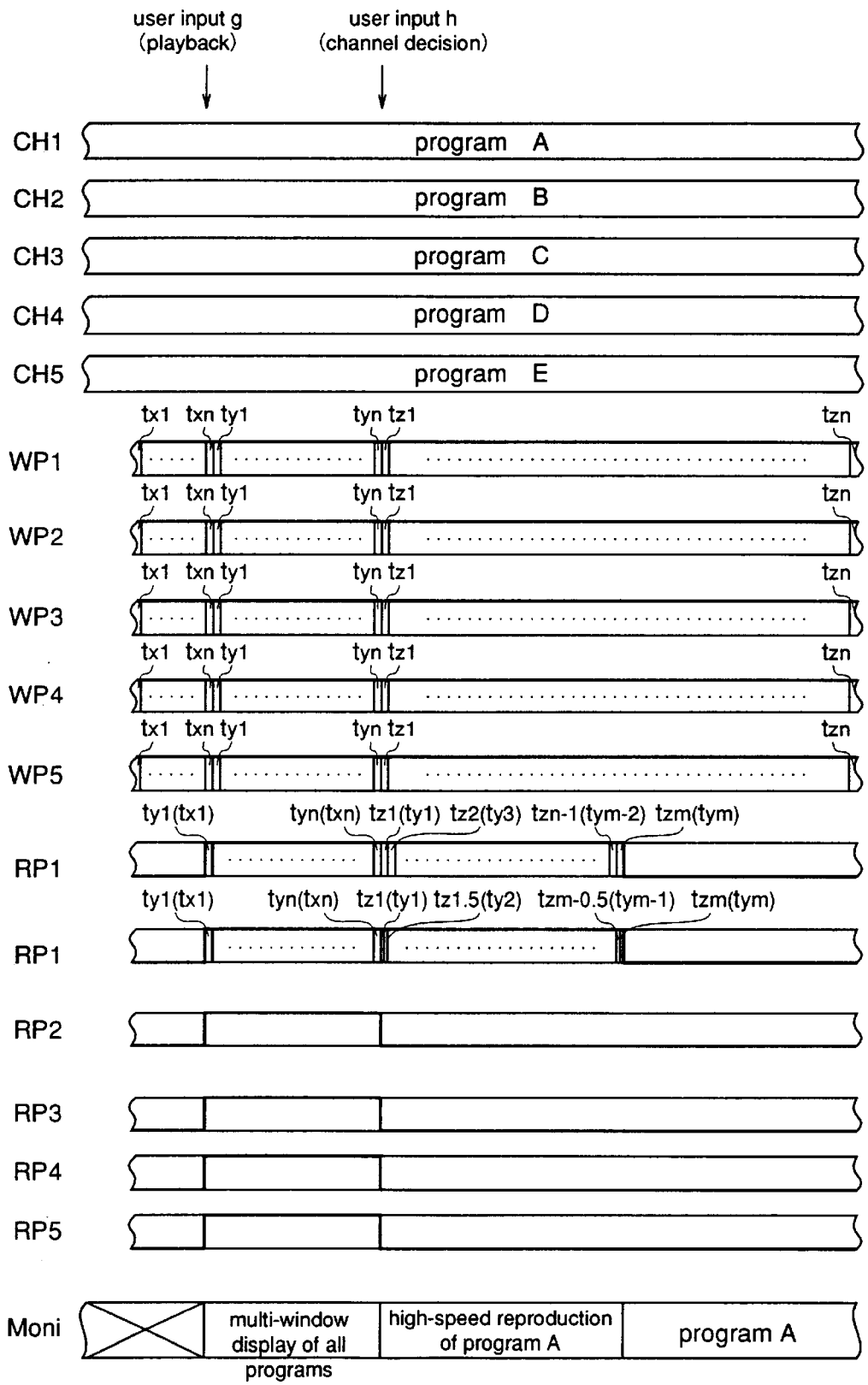
FIG. 15 is a diagrams for explaining the operation of the video signal recording unit according to the fifth operation mode on the basis of the third embodiment.

Alternatively, as shown in FIG. 15, after the program A is selected by the channel decision signal (user input h) at time $t_{z1}$, high-speed reproduction of data recorded in the ring buffer 3a is performed by reading the data at a speed higher than the normal speed (writing speed), and the selector 5 is switched when the image of the date catches up with the on-air broadcasted image to display the video signal from the main tuner 8. In FIG. 15, $t_{z1}(t_{y1}), t_{z2}(t_{y3}), \ldots, t_{zm-1}(t_{ym-2}), t_{zm}(t_{ym})$ show data reproduced for every second frame at time $t_{z1}, t_{z2}, \ldots, t_{zm-1}, t_{zm}$, respectively, and $t_{z1}(t_{y1}), t_{z1.5}(t_{y2}), \ldots, t_{zm-0.5}(t_{ym-1}), t_{zm}(t_{ym})$ show data reproduced at a speed twice as high as the writing speed at time $t_{z1}, t_{z1.5}, \ldots, t_{zm-0.5}, t_{zm}$, respectively.

At time $t_{zm}$, when the high-speed reproduction catches up with the on-air broadcasting, the control circuit 6 stops reading of data from the ring buffer 3a and switches the selector 5 to the main tuner 8 or the tuner 1n, whereby the video signal from the tuner is displayed on the CRT display unit 10.

As described above, according to the fifth operation mode, a plurality of programs on different channels are recorded in advance, and the recorded programs are displayed by multi-window when the user turns on the television. Then, the user selects one of the programs, and this program is displayed by full-screen. When the user selects some or all of the programs, these programs are displayed by multi-window. Therefore, even when the user comes home later than expected, the user can select his/her favorite programs by watching recorded portions of the programs and then watch the selected programs throughout.

Although the fifth operation mode is described for five channels, all the tuners 1a to 1n may be used.

SIXTH OPERATION MODE

This sixth operation mode is called "full-time multi-window playback" by which a user can reproduce and watch plural programs all at once, which programs have been broadcasted before his/her return home.

Figure 16:
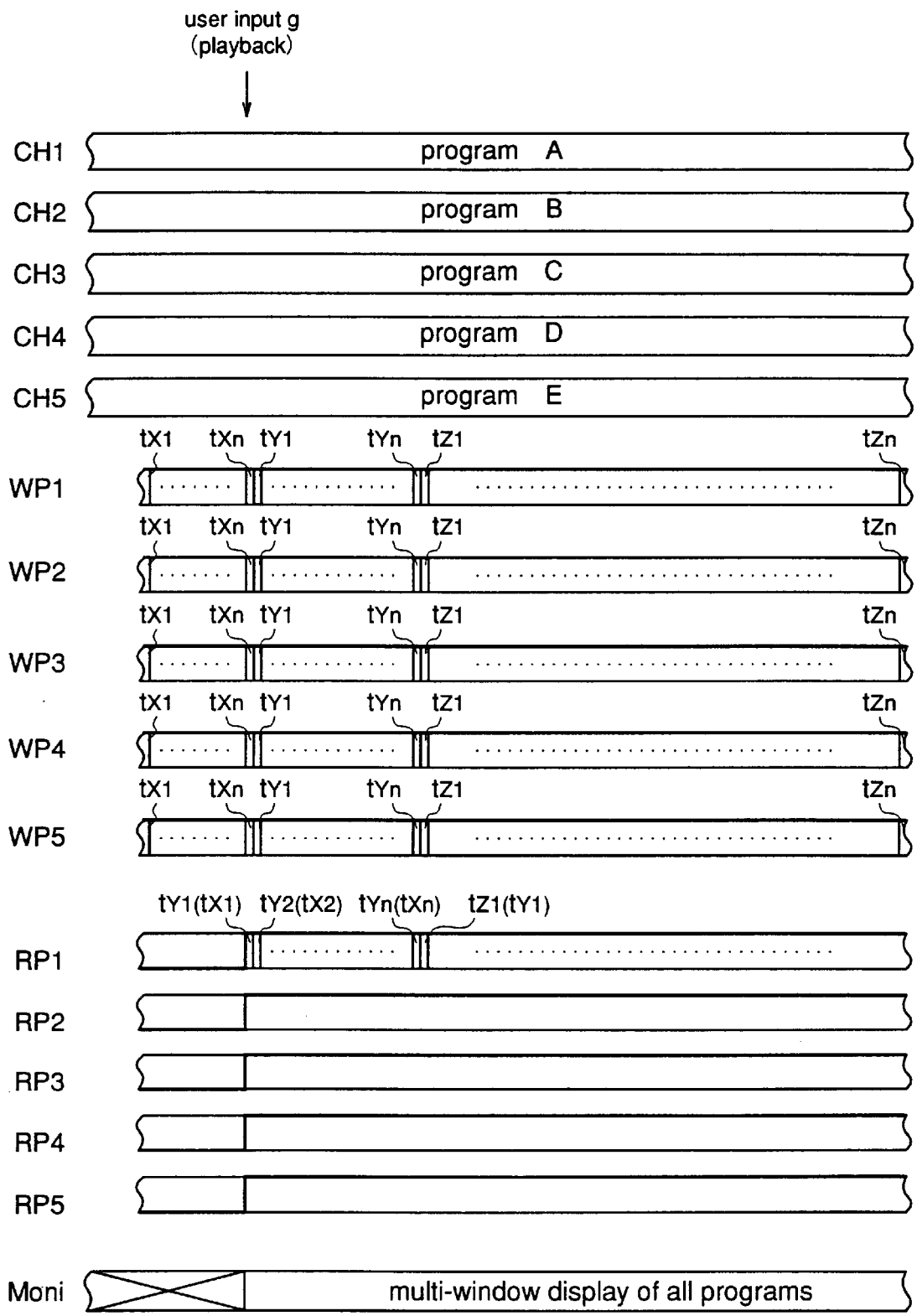
FIG. 16 is a diagram for explaining the operation of the video signal recording unit according to a sixth operation mode on the basis of the third embodiment.

More specifically, when the user wants to watch programs A to E which will be broadcasted while his/her being out, by playback, he/she sets the programs A to E in advance. Receiving the user input, as shown in FIG. 16, the ring buffers 3a to 3n turn on the writing pointers WP1 to WP5 to write the programs A to E. In FIG. 16, $t_{x1}, t_{x2}, \ldots, t_{xn-1}, t_{xn}$, $t_{y1}, t_{y2}, \ldots, t_{yn-1}, t_{yn}, t_{z1}, \ldots, t_{zn-1}, t_{zn}$ show data written at time $t_{x1}, t_{x2}, \ldots, t_{zn-1}, t_{zn}$, respectively. As shown in FIG. 16, this recording is performed for a prescribed period of time, for example, two hours, before the user's switching on the television.

Figure 17:
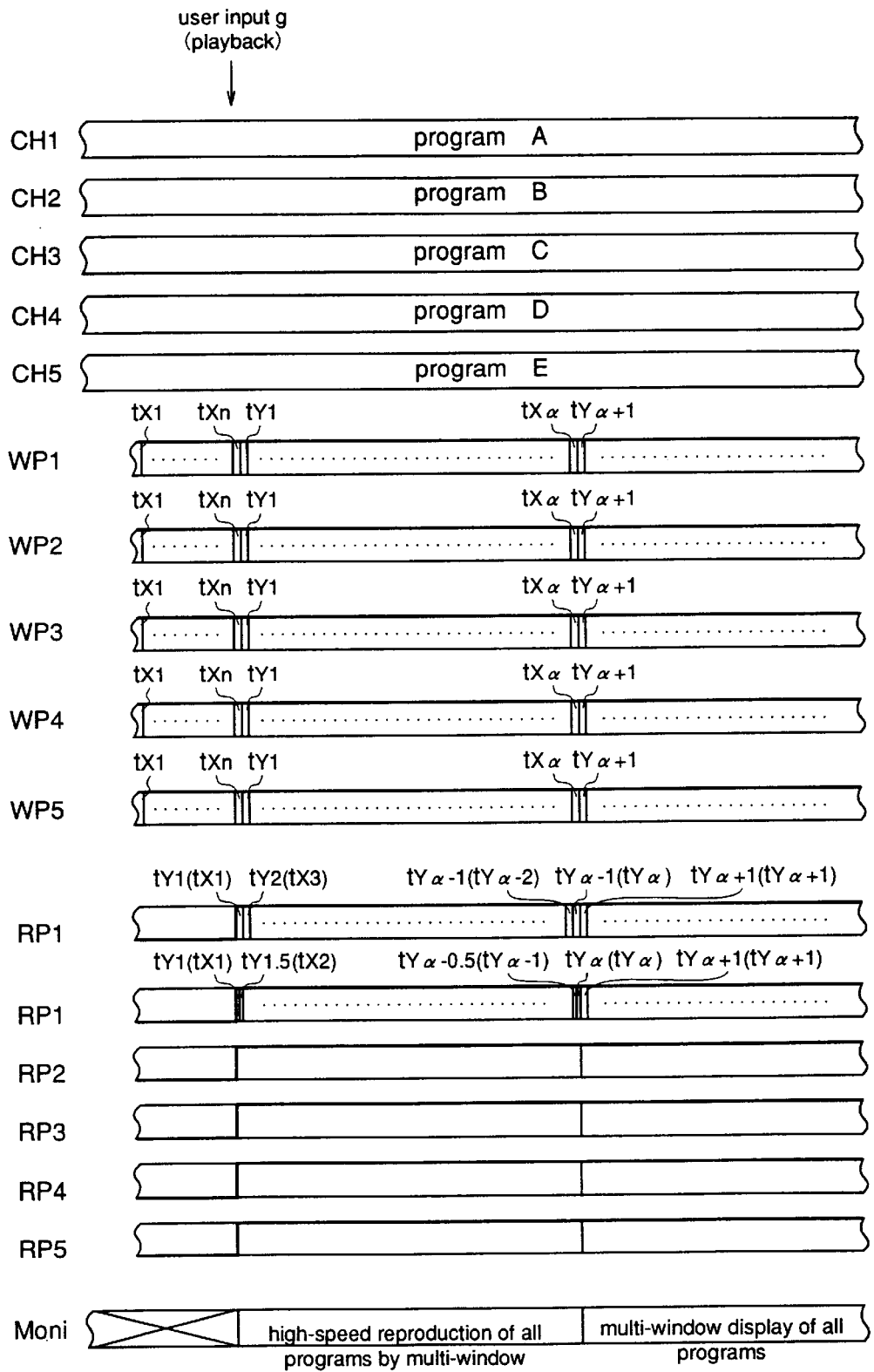
FIG. 17 is a diagrams for explaining the operation of the video signal recording unit according to the sixth operation mode on the basis of the third embodiment.

At time $t_{y1}$, when a playback signal is input as a user input g, the reading pointers RP1 to RP5 are turned on and all the programs A to E are displayed by multi-window. In FIG. 16, $t_{z1}(t_{x1}), t_{y2}(t_{x2}), \ldots, t_{yn-1}(t_{xn-1}), t_{yn}(t_{xn}), t_{z1}(t_{y1}), \ldots$ show data read from the ring buffers 3a to 3e at time $t_{y1}, t_{y2}, \ldots, t_{yn-1}, t_{yn}, t_{z1}, \ldots$ This reproduction can be performed at high speed as shown in FIG. 17 and, when the high-speed reproduction catches up with the on-air broadcasting, the user watches the on-air program in the actual time.

That is, when the user inputs a playback signal as a user input g at time $t_{z1}$, data recorded in the ring buffers 3a to 3e are reproduced at a speed higher than the normal speed (writing speed). In FIG. 17, $t_{y1}(t_{x1}), t_{y2}(t_{x3}), \ldots, t_{y\alpha-1}(t_{x\alpha-2})$, $t_{y\alpha}(t_{x\alpha})$ show data reproduced for every second frame at time $t_{y1}, t_{y2}, \ldots, t_{y\alpha-1}, t_{y\alpha}$, respectively. After the high-speed reproduction has ended, data, $t_{y\alpha+1}(t_{y\alpha+1}), t_{y\alpha+2}(t_{y\alpha+2}) \ldots$, are read out, that is, data currently being written is read from the ring buffers.

When the high-speed reproduction is performed at a speed twice as high as the recording speed, $t_{y1}(t_{x1}), t_{y1.5}(t_{x2}), \ldots$, $t_{y\alpha-0.5}(t_{y\alpha-1}), t_{y\alpha}(t_{y\alpha})$ are read out. After this high-speed reproduction has ended, $t_{y\alpha+1}(t_{y\alpha+1}), t_{y\alpha+2}(t_{y\alpha+2}) \ldots$ are read out as mentioned above.

As described above, according to the sixth operation mode, plural programs on different channels are recorded in advance, and the recorded programs are reproduced at high speed by multi-window when the user turns on the television. Therefore, full-time multi-window playback of desired plural programs is realized, and the user can see these programs at once in a short time.

The television receivers according to the second and third embodiments of the invention can be equipped with an HDD having a storage capacity of several hundreds of GHz. In this case, all television programs broadcasted in a month can be recorded and reproduced for each month according to the above-mentioned operation (recording and reproduction).

Further, in the first to third embodiments of the invention, on the screen on which the reproduced image is displayed, an icon, such as a watch, or a message indicating the reproduction may be displayed.

Furthermore, in the first to third embodiments, when the high-speed reproduction is performed, it is necessary to control the reading pointer so that the reading pointer does not rush in the ineffective data region of the ring buffer, i.e., so that the address of the reading point does not pass the address of the writing pointer. In addition, it is possible to realize rewind reproduction by moving the reading pointer in the reverse direction to the reading direction of the writing pointer.

Although in the first to third embodiments an HDD is employed as a ring buffer, any recording medium, such as an optical disk, may be employed as long as it is a memory capable of setting the reading address for each block. Further, if the reading pointer is not moved in the reverse direction, an FIFO (First In First Out) memory can be used.

Furthermore, as a method for compressing information employed in the first to third embodiments, a method of compressing a video signal for each frame is optimum, but JPEG, MPEG, or other encoding methods may be employed.

[Embodiment 4]

In order to realize the television receivers according to the first to third embodiments of the invention, when the ring buffer serving as a recording and reproduction device is implemented by a storage device capable of random access and using a disk medium, such as an HDD, it is necessary to reduce operation noise, frame skip that occurs at disk access, or unnecessary disk access.

Figure 18:
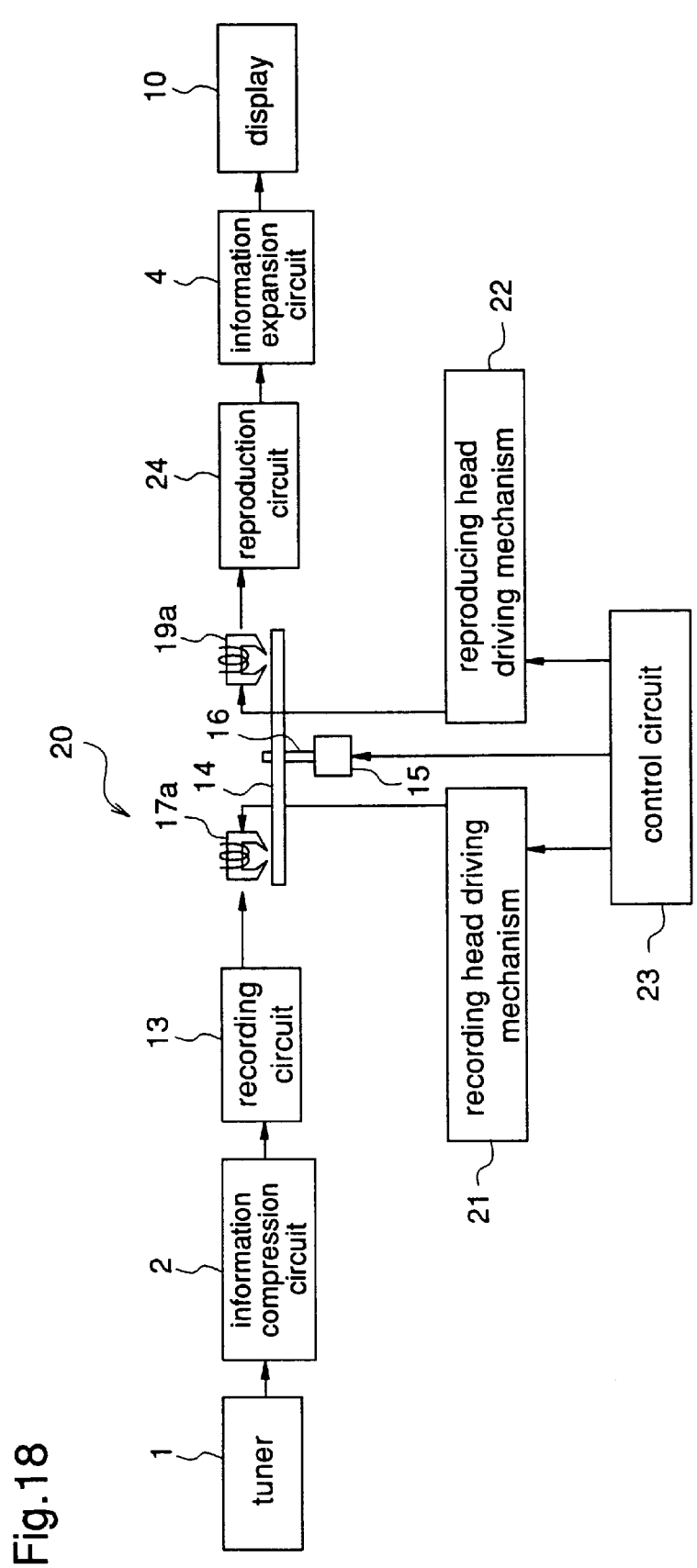
FIG. 18 is a block diagram illustrating a recording and reproduction device with playback function according to a fourth embodiment of the present invention.
Figure 19:
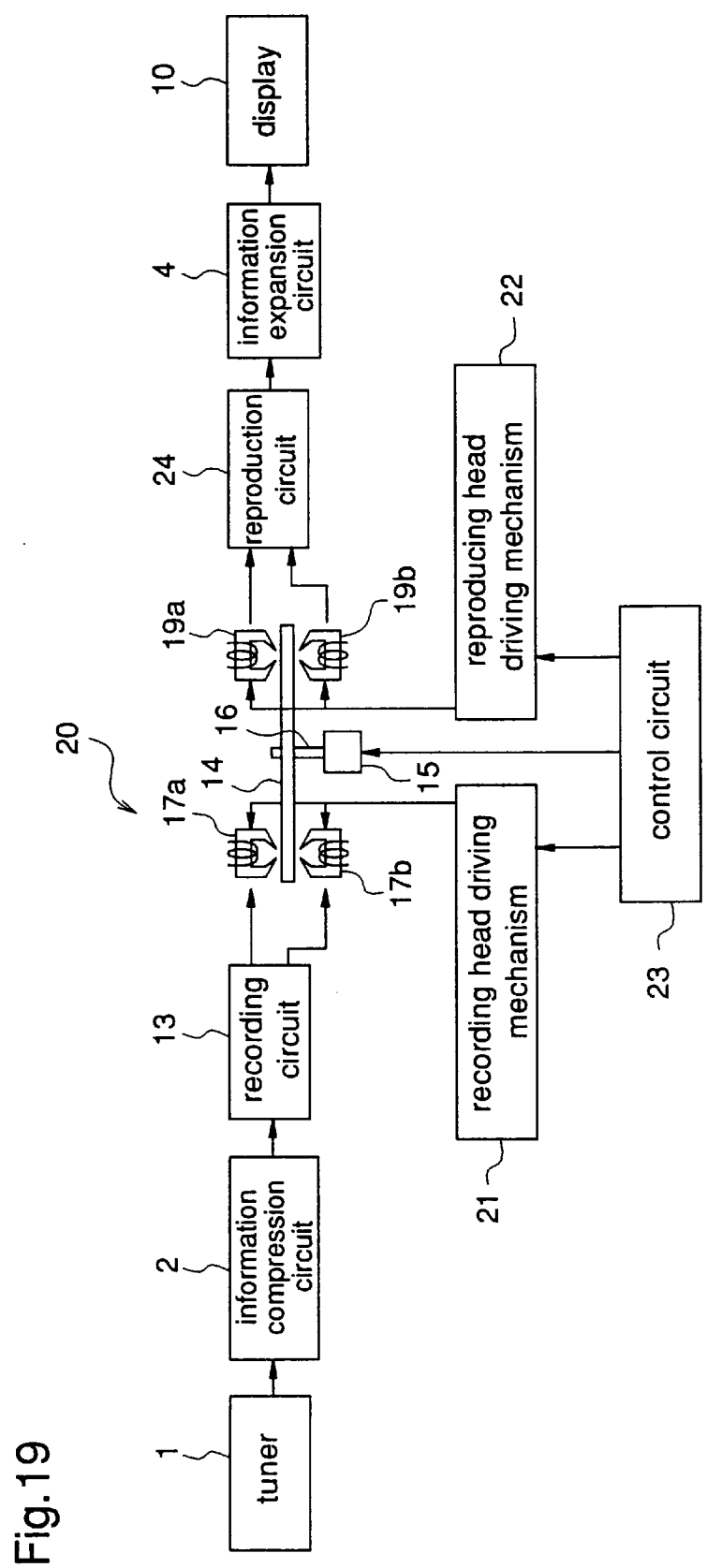
FIG. 19 is a block diagram illustrating a recording and reproduction device with playback function according to the fourth embodiment of the present invention.

FIGS. 18 and 19 are block diagrams each illustrating a recording and reproduction device with a playback function, which can solve the above-mentioned programs, according to a fourth embodiment of the present invention. The device shown in FIG. 18 is for recording data on one side of a signal, disk, and the device shown in FIG. 19 is for recording data on both sides of a single disk.

In FIGS. 18 and 19, reference numeral 1 designates a tuner for receiving a broadcasting signal, numeral 2 designates an information compression circuit for compressing the broadcasting signal received by the tuner 1, and numeral 3 designates a recording circuit for recording the compressed signal.

Reference numeral 20 designates an HDD unit for recording and reproducing the compressed signal, and this HDD unit is employed to implement a ring buffer in which addresses are given in a loop, that is, recording in the most significant address is followed by recording in the least significant address. In FIG. 18, the HDD unit 20 comprises a magnetic disk 14, a spindle motor 15, a rotation axis 16, a first recording head 17a, a recording head drive mechanism 21, a first reproduction head 19a, a reproduction head drive mechanism 22, and a control unit 23. The HDD unit shown in FIG. 19 is identical to that shown in FIG. 18 except that it further includes a second recording head 17b and a second reproduction head 19b.

The magnetic disk 14 is a recording medium for recording the compressed signal 14. The spindle motor 15 with the rotation axis 16 rotates the magnetic disk 14 at a constant speed. The first recording head 17a (the second recording head 17b) is a magnetic head for writing an output signal from the recording circuit 13 in the magnetic disk 14. The recording head drive mechanism 21 drives the first recording head 17a. When the HDD unit includes both the first recording head 17a and the second recording head 17b as shown in FIG. 19, these heads move together. The first recording head 17a records data on the upper surface of the magnetic disk 14, and the second recording head 17b records data on the lower surface of the magnetic disk 14. The first reproduction head 19a (the second reproduction head 19b) is a magnetic head for reading data written in the magnetic disk 14, and the reproduction head drive mechanism 22 drives the first reproduction head 19a. When the HDD unit includes both the first reproduction head 19a and the second reproduction head 19b as shown in FIG. 19, these heads move together. The first reproduction head 19a reproduces data from the upper surface of the magnetic disk 14, and the second reproduction head 19b reproduces data from the lower surface of the magnetic disk 14.

The control unit 23 outputs control signals for controlling the rotation of the spindle motor 15, the position of the first recording head 17a (the second recording head 17b), and the position of the first reproduction head 19a (the second reproduction head 19b). The first recording head 17a (the second recording head 17b) and the first reproduction head 19a (the second reproduction head 19b) are independently driven by the drive mechanisms 21 and 22, respectively, according to the control signals from the control unit 23.

A reproduction circuit 24 reproduces the signals read by the reproduction head 19a (19b), an information expansion circuit 4 expands the reproduced signal, and a display 10 displays the expanded signal.

Figure 20:
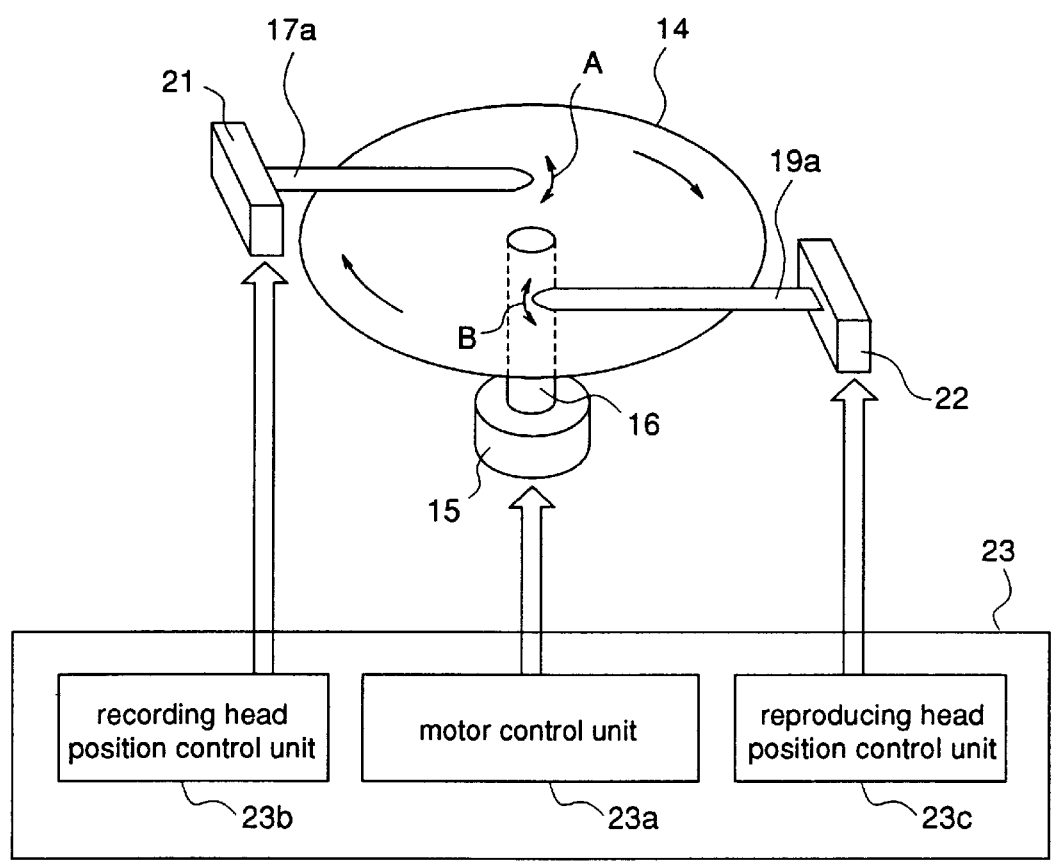
FIG. 20 is a schematic diagram illustrating a magnetic disk and its vicinity in the recording and reproduction device according to the fourth embodiment.
Figure 21:
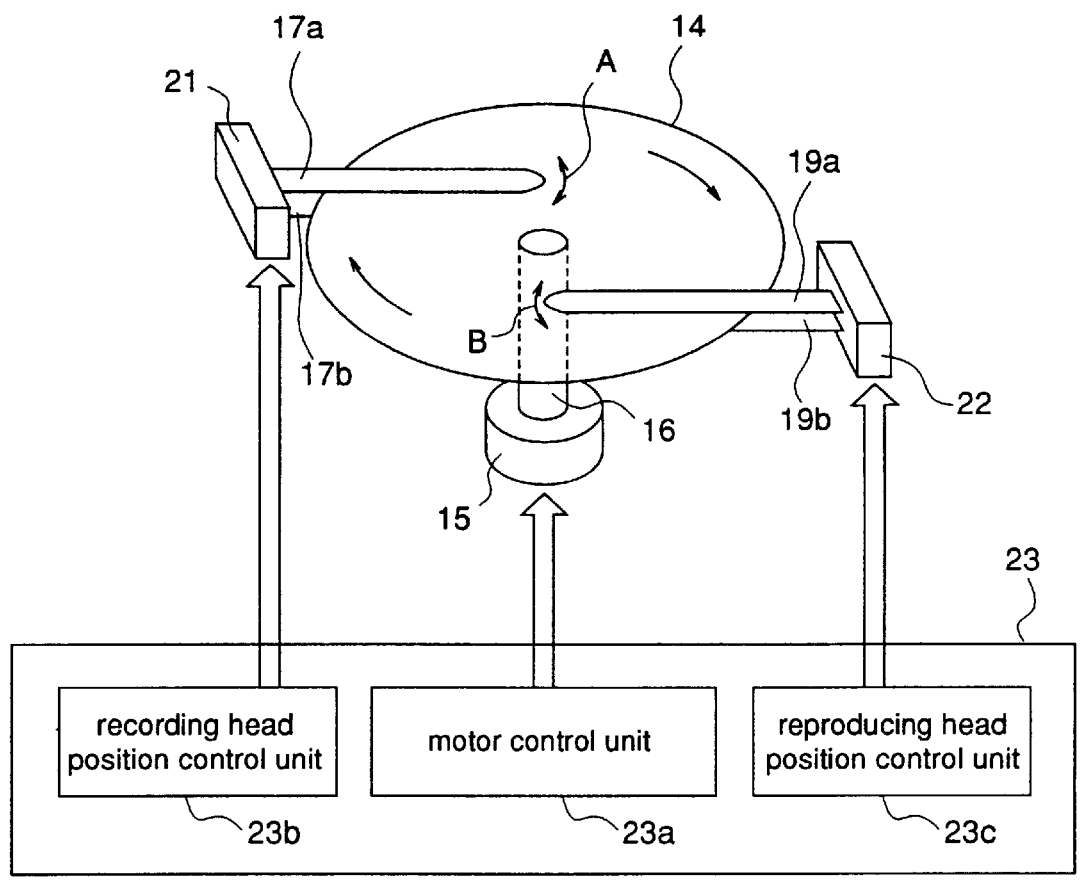
FIG. 21 is a schematic diagram illustrating a magnetic disk and its vicinity in the recording and reproduction device according to the fourth embodiment.

FIGS. 20 and 21 are perspective views each illustrating the magnetic disk and its vicinity.

As shown in FIGS. 20 and 21, the first recording head 17a (the second recording head 17b) and the first reproduction head 19a (the second reproduction head 19b) are disposed with the center point of the magnetic disk 14 between them. The recording head 17a (17b) is moved randomly between the inner circumference and the outer circumference of the disk 14, as shown by arrow A, by the recording head drive mechanism 21. A recording head position control unit 23b outputs a control signal for controlling the position of the recording head 17a (17b) to the recording head drive mechanism 21. The reproduction head 19a (19b) is moved randomly between the inner circumference and the outer circumference of the disk 14, as shown by arrow B, by the reproduction head drive mechanism 22. A reproduction head position control unit 23c outputs a control signal for controlling the position of the reproduction head 19a (19b) to the reproduction head drive mechanism 22. A motor control unit 23a controls the spindle motor 15 so that the rotating speed of the motor 15 is constant. The control unit 23 comprises the recording head position control unit 23b, the reproduction head position control unit 22c, and the motor control unit 23a. The positionl relationship between the recording head and the reproduction head is not restricted to that mentioned above.

FIGS. 22 to 27 are schematic diagrams each illustrating the relationship (correspondence) between the track numbers on the magnetic disk 14 of the single-side recording HDD unit and the loop addresses on the ring buffer implemented by the HDD unit.

Figure 22:
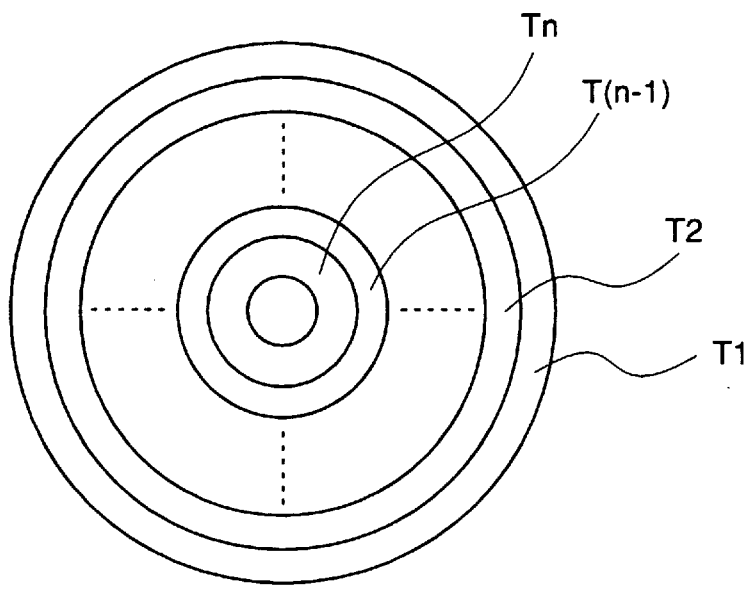
FIGS. 22(a) and 22(b), and 23 to 27 are diagrams illustrating the relationship between track numbers on a single-side recording magnetic disk and loop addresses on a ring buffer, in the recording and reproduction device according to the fourth embodiment of the invention.
Figure 22:
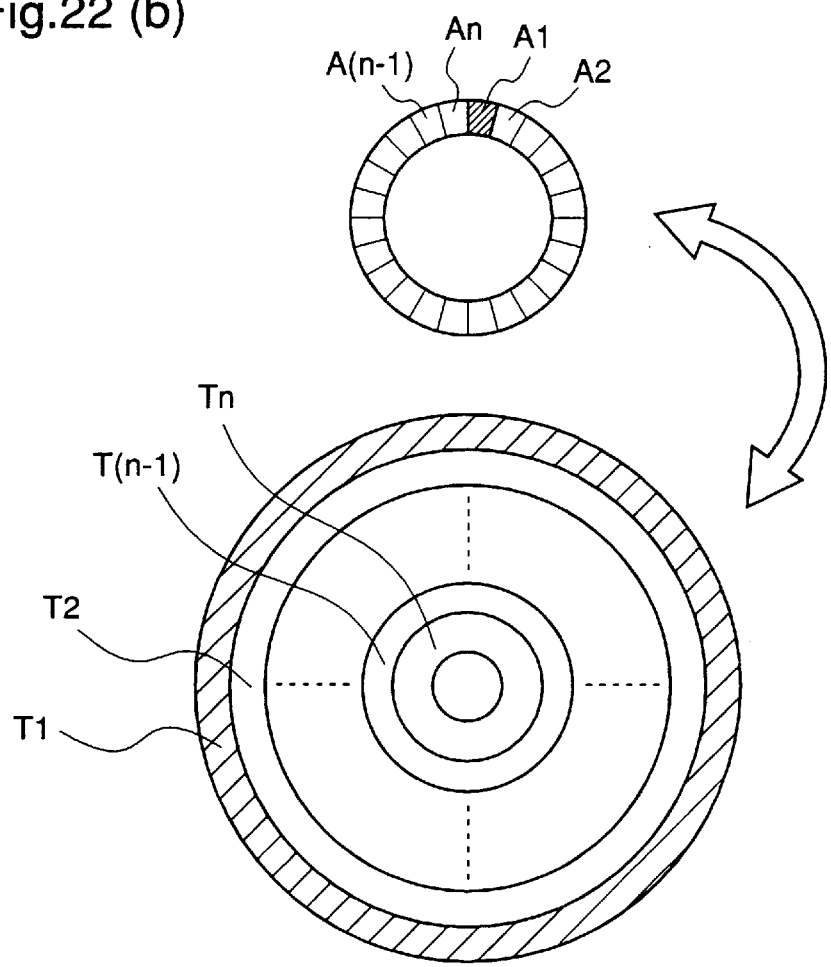

In FIG. 22, A1, A2, ... , A(n−1), An show addresses on the ring buffer, and T1, T2, ... , T(n−1), Tn show tracks on the magnetic disk 14.

A description is now given of the recording and reproduction operation of the device according to this fourth embodiment using FIGS. 18 to 27, and a data recording method according to the present invention.

(I) First of all, the recording and reproduction operation using a single-side recording magnetic disk having n tracks will be described.

Initially, the recording operation will be described.

The magnetic disk 14 is set with its recording surface looking upward. On the magnetic disk 14, tracks with numbers T1, T2, ... , T(n−1), Tn are produced from the outer circumference toward the inner circumference. The recording head stands by at the outer circumference of the magnetic disk 14. When recording is started, data is successively recorded in the tracks, from the outermost track T1 toward the inner circumference, by the first recording head 17a.

Figure 23:
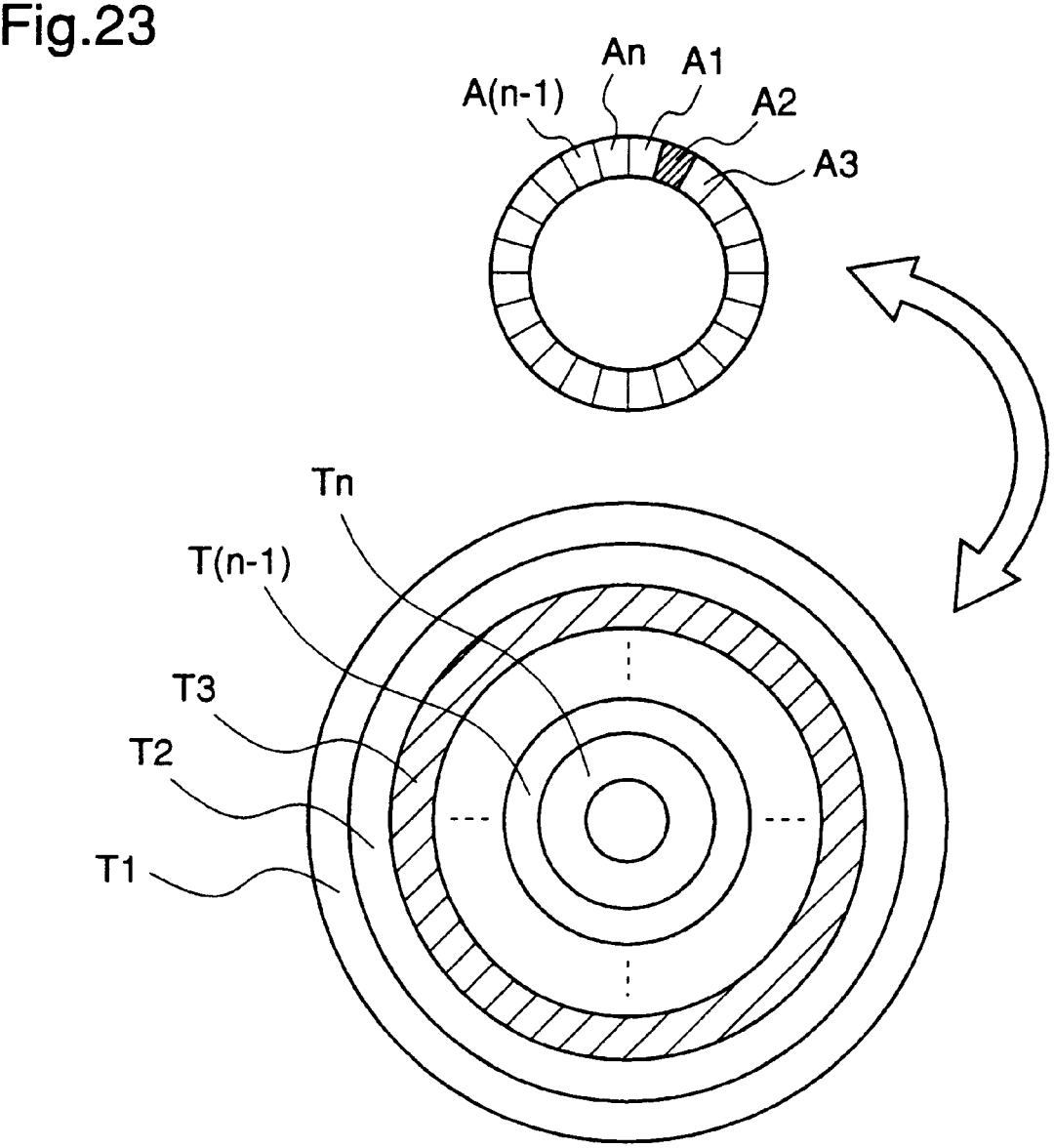

To be specific, according to the control signal from the recording head position control unit 23b, the recording head drive mechanism 21 drives the first recording head 17a as follows. That is, as shown in FIGS. 22(b), 23, and 24, the first recording head 17a starts recording from track T1 when the address of the ring buffer is A1 and, with one-by-one advance in address, i.e., A2, A3, ... , A(m−2), A(m−1), Am, while moving toward the inner circumference, the recording head 17a successively records data on every second track, i.e., T3, T5, T(n−5), T(n−3), T(n−1).

Figure 24:
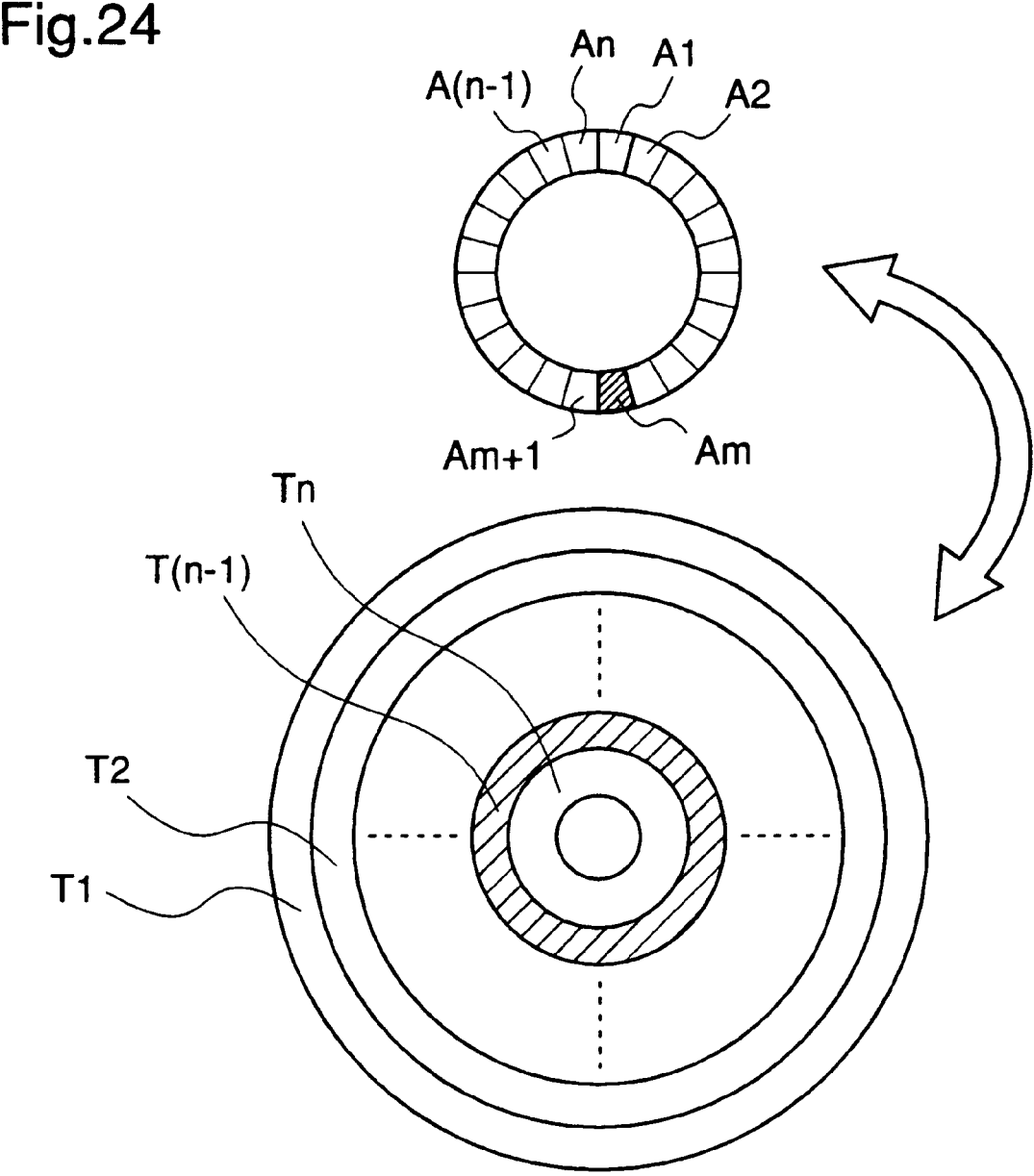
Figure 25:
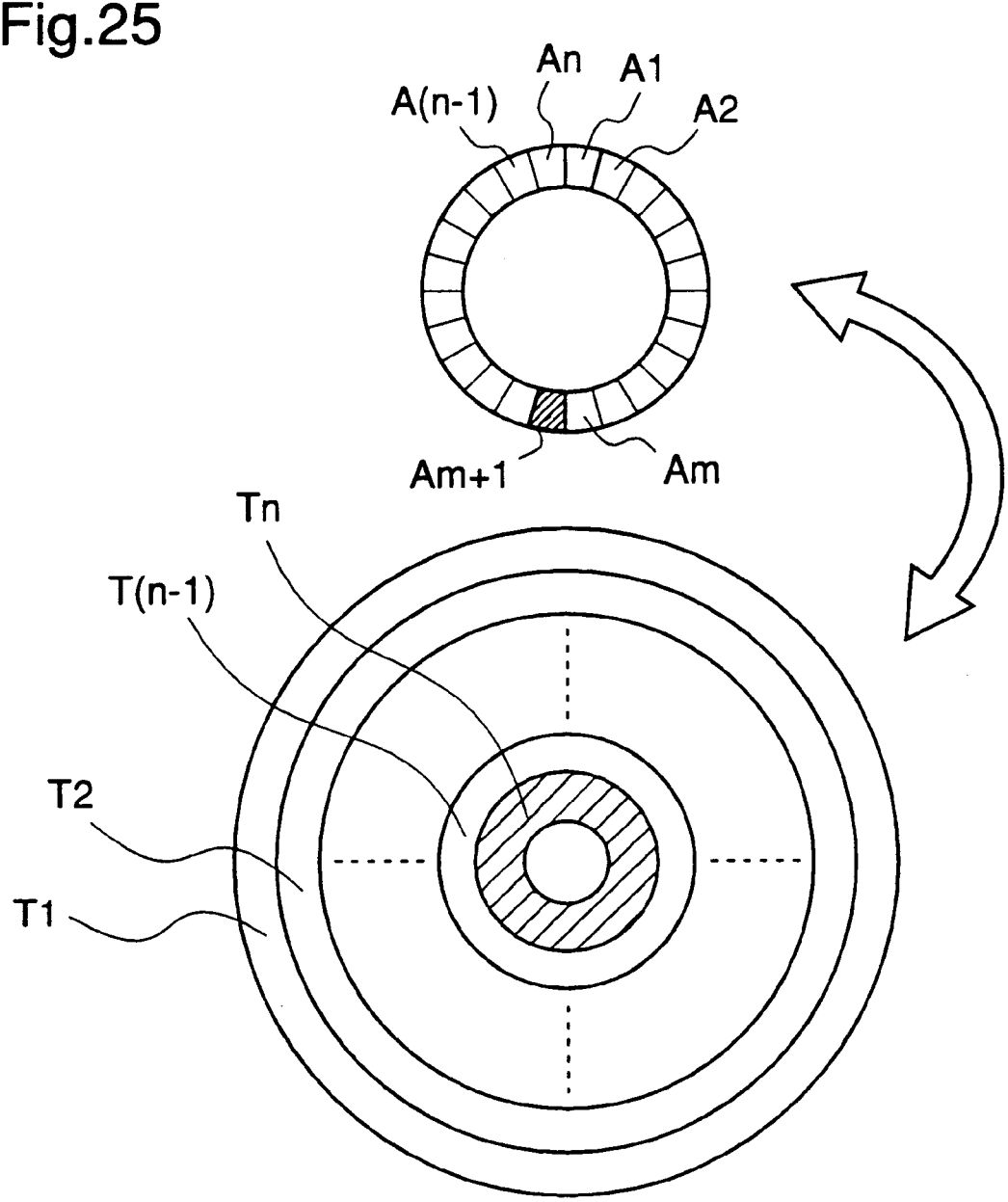
Figure 26:
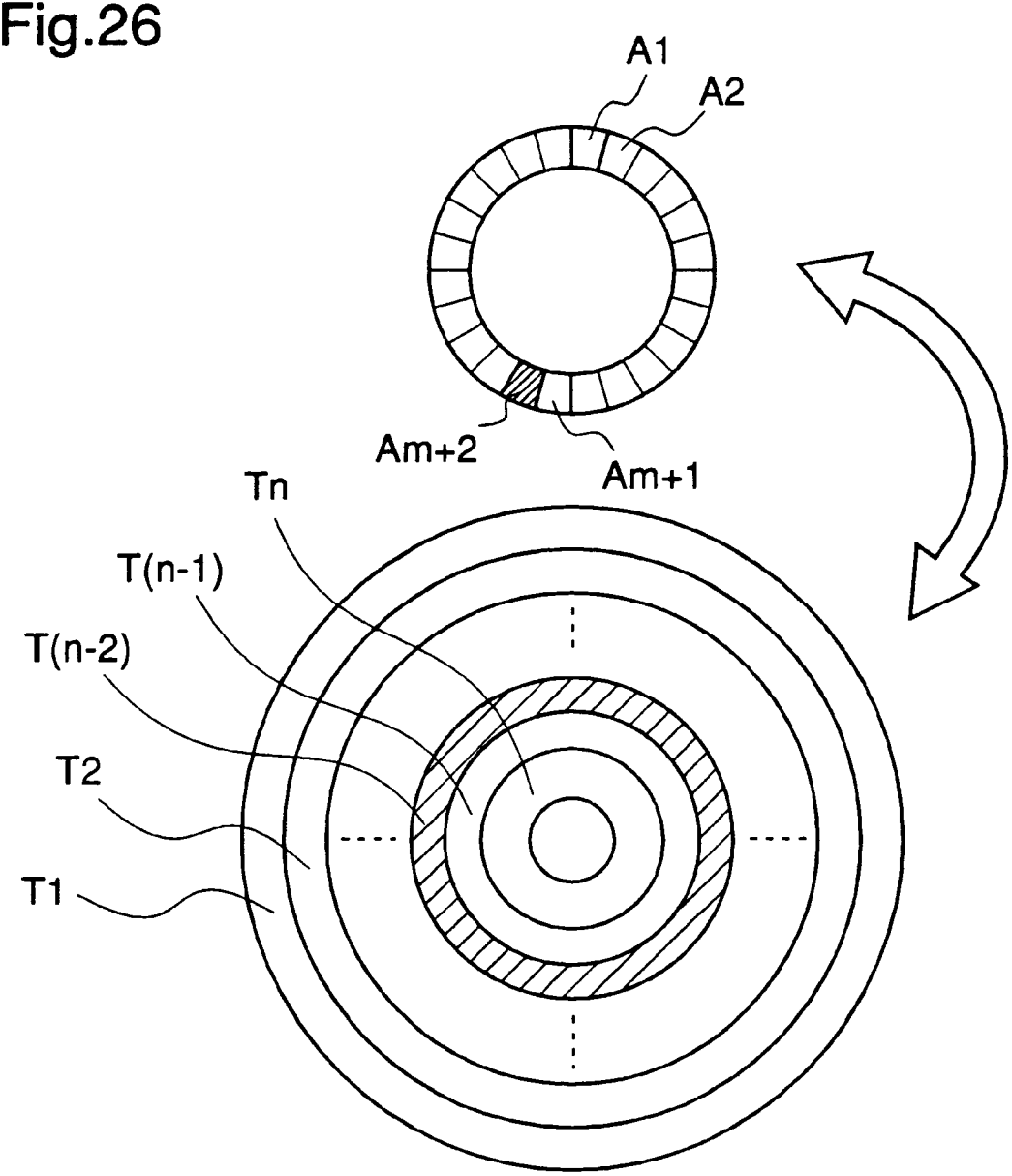
Figure 27:
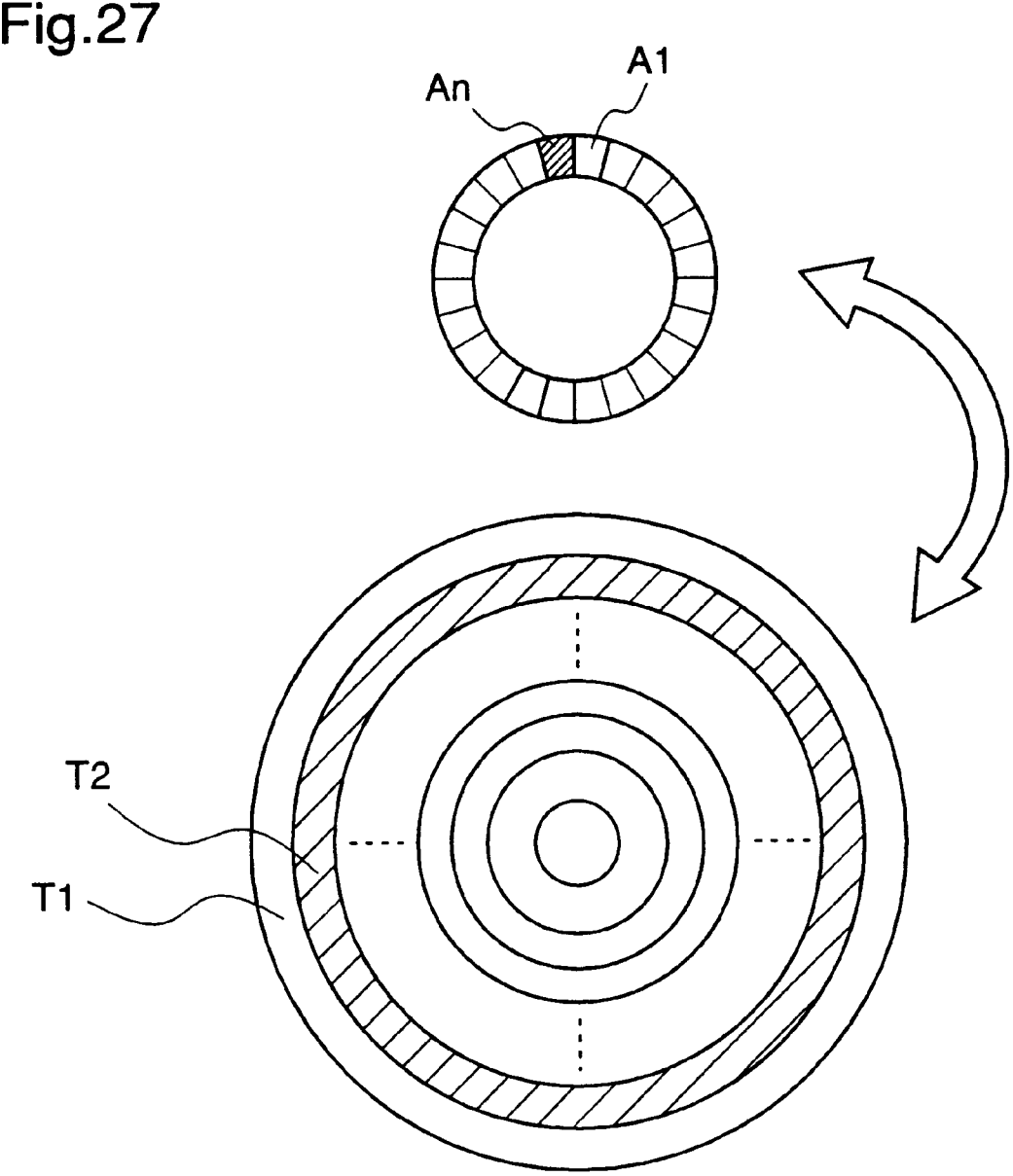

As shown in FIG. 24, when the address advances from Am to A(m+1), recording on track T(n−1) is completed and recording on the innermost track Tn is performed. When the recording on track Tn is completed, the first head 17a records data successively on the tracks which are skipped in the above-mentioned recording operation, while moving toward the outer circumference of the disk 14. More specifically, as shown in FIGS. 25 to 27, when the address of the ring buffer advances from A(m+1) to A(m+2), the first recording head 17a moves from track Tn to track T(n−2) and, with one-by-one advance in address, i.e., A(m+2), A(m+3), ... , A(n−2), A(n−1), An, the recording head 17a successively records data in every second track, i.e., T(n−2), T(n−4), ... , T6, T4, T2, while moving toward the outer circumference of the disk 14.

When the above-mentioned recording operation is summarized, the recording head position control is performed as follows (n=even number).

track T1→track T3→track T5→. . . → track T(n−3) →track T(n−1) track Tn→track T(n−2) track T(n−4) →track T4→track T2

When the recording head returns to track T2 and the address of the ring buffer increases by 1 from An, i.e., returns to A1, the recording head moves back to track T1 and repeats the above-mentioned operation.

As a result of the repetition of the above-mentioned recording operation by the first recording head 17a, video signals which have been transmitted during a period from the present time back to a certain point of time in the past are recorded.

According to the recording operation mentioned above, the moving distance of the recording head is equal for all the tracks excluding the innermost and outermost tracks, end the moving distance for the innermost and outermost tracks is smaller than that for the other tracks.

In the conventional recording and reproduction device, as mentioned in BACKGROUND OF THE INVENTION, when the recording on the innermost track is completed, the recording head must jump over many tracks to return to the outermost track for the next recording. In this fourth embodiment, such an unnecessary movement of the recording head can be dispensed with, so that undesired frame skip of recorded data is avoided.

Next, a description is given of the data reproducing operation.

The magnetic disk 14 is set with its recording surface looking upward, and only the first reproduction head 19a is used for the operation. During the reproduction, the above-mentioned recording operation is carried out by the first recording head 17a.

Initially, "playback reproduction" will be described.

When the user inputs a command to execute 'playback' while the on-air broadcasting signal is displayed on the display unit 10, the first reproduction head 19a performs the following operation according to the control signal from the reproduction head position control unit 23c.

The first reproduction head 19a is moved to a track on which the first recording head 17a has been positioned a prescribed time before the input of the command, and the display on the display unit 10 is switched to the reproduced signal from the first reproduction head 19a. Thereafter, with one-by-one advance in address of the ring burrer, the first reproduction head 19a is moved on the tracks in the same manner as described for the first recording head 17a. It is needless to say that the first reproduction head 19a reproduces data on the tracks for every second track.

To be specific, reproduction is performed from the outermost track T1 on the magnetic disk 14 toward the inner circumference of the disk 14, in the order of T3, T5, T(n−5), T(n−3), T(n−1). When reproduction on track T(n−1) is completed, the reproduction head 19a reproduces tracks, Tn, T(n−2), T(n−4), . . . , T6, T4, T2, successively.

After a prescribed period of time, the display on the display unit 10 may be switched to the on-air signal to stop the reproduction by the first reproduction head 19a. Alternatively, the tracks on which data are recorded by the recording head 17a may be reproduced by appropriately skipping tracks so that the reproduction speed will be higher then the recording speed. This high-speed reproduction is, in other words, a reduction in the reproduction time.

This high-speed reproduction is to reproduce data at a speed higher than the normal speed (recording speed) and, when it is performed for every second frame, tracks T1, T5, . . . , T(n−5), T(n−1) are successively reproduced. After reproduction of track T(n−1) is completed, tracks Tn, T(n−4), . . . , T6, T2 are successively reproduced.

Furthermore, in this high-speed reproduction, the operating cycle of the reproduction head for reproducing one frame is the repetition of head movement→timing adjustment→data readout waiting time→. If the waiting time can be reduced, it is possible to perform the normal-speed reproduction for tracks T1, T3, T5, . . . , T(n−5), T(n−3), T(n−1), Tn, T(n−2), T(n−4), . . . , T6, T4, T2, at a speed higher than the recording speed of the recording head.

While the high-speed reproduction is performed in such a manner, the first reproduction head 19a can catch up with a track on which the first recording head 17a is present. When the head 19a catches up with the track, the reproduction is stopped, and the display on the display unit 10 is switched to the on-air broadcasting signal.

This high-speed reproduction realizes the interruptible television according to the first operation mode described for the first embodiment of the invention.

Further, when plural interruption periods are recorded and reproduced using the above-mentioned recording and reproduction device, the multiple interruption according to the second operation mode described for the first embodiment of the invention is realized.

A description is now given of "pause reproduction".

When the user inputs a command to execute 'pause reproduction' while the on-air broadcasting signal is displayed on the display unit 10, the first reproduction head 19a is moved to a track on which the first recording head 17a has been positioned a prescribed time before the input of the commend, and the head 19a is stopped on the track to reproduce the recorded signal on the track repeatedly. Alternatively, when the user inputs the command to execute 'pause reproduction' while the reproduced signal from the first reproduction head 19a is displayed on the display unit 10, the first reproduction head 19a is moved to a track on which the first recording head 17a is present at the input of the command, and the head 19a is stopped to reproduce the recorded signal on the track repeatedly. Since the video signal is recorded by one frame or one field for each track, a still picture is displayed by the above-mentioned reproduction.

On the other hand, when the user inputs a command to cancel 'pause reproduction', the first reproduction head 19a is moved in the same manner as mentioned for the first recording head 17a to perform time-shift reproduction. Alternatively, the above-mentioned high-speed reproduction is performed until the first reproduction head 19a catches up with a track on which the first recording head 17a is present. When the first reproduction head 19a catches up with the first recording head 17a, the reproduction by the first reproduction head 19a is stopped, and the display is switched to the on-air broadcasting signal.

This reproducing operation realizes the still-picture reproduction during interruption according to the first operation mode described for the first embodiment of the invention.

Next, a description is given of "reverse reproduction".

In this operation, initially, the display on the display unit 10 is switched from the demodulated signal from the tuner 1 to the reproduced signal from the first reproduction signal 19a. Then, according to the control signal from the reproduction head position control unit 23c, the first reproduction head 19a reproduces the tracks, for every second track, in the reverse order to the order or tracks on which data is recorded by the first recording head 17a. In this case, the reproduced image on the display moves reversely to the recorded image.

Next, "frame-to-frame reproduction" will be described.

First of all, a first example of this operation is as follows. Initially, the first reproduction head 19a is stopped on a track for a prescribed period of time to reproduce a video image on the track during the period. Next, the first reproduction head 19a is moved to a track on which a frame next to the frame of the track that has just been reproduced is recorded, and a video image on the track is reproduced during a prescribed time.

This frame-to-frame reproduction is a kind of slow reproduction. On the screen, the image moves by one frame and then stops, and the movement and the standstill are alternatingly repeated.

Next, a second example of the frame-to-frame reproduction will be described. This second example is to solve the drawback of the first example, that is, very low reproduction speed. To be specific, in order to avoid a reduction in the reproduction speed, after the standstill reproduction on the same track, the reproduction head 19a is not moved to a track on which the next frame is recorded, but moved to a trace on which a frame, which is several frames away from the frame of the track that has just been reproduced, is recorded. This is similar to the above-mentioned high-speed reproduction in that the tracks are reproduced skippingly.

Further, in this second example, it is possible to approximate the reproduction time to that of the normal reproduction in which the tracks are successively reproduced, by appropriately selecting the number of tracks to be skipped. This frame-to-frame reproduction equivalent to the constant-speed reproduction is called "stroboscopic reproduction".

The stroboscopic reproduction will be described in more detail. Initially, it is assumed that the normal reproduction needs time T₁ to successively reproduce from the first track to the fifth track and also needs time T₁ to successively reproduce tracks from the sixth track to the tenth track. In this case, when the stroboscopic reproduction is employed, the first track is reproduced for a period a little shorter than time T₁, the second track to the fifth track are skipped, and reproduction of the sixth track is started after time T₁ from the start of reproduction of the first track. This sixth track is reproduced during a period a little shorter than time T₁.

As described above, since the recording head and the reproduction head are separately provided, it is not necessary to rapidly move the heads between tracks, in contrast with the conventional recording/reproduction head. Therefore, unwanted noise and frame skip are avoided, resulting in a long life of a head driving mechanism.

(II) Hereinafter, the recording and reproduction operation according to the fourth embodiment will be described for a case where a double-side recording magnetic disk having n tracks is employed.

FIGS. 28 to 31 are schematic diagrams each illustrating the relationship (correspondence) between the track numbers on the manetic disk 14 of the double-side recording HDD unit and the loop addresses on the ring buffer implemented by the HDD unit.

Figure 28A:
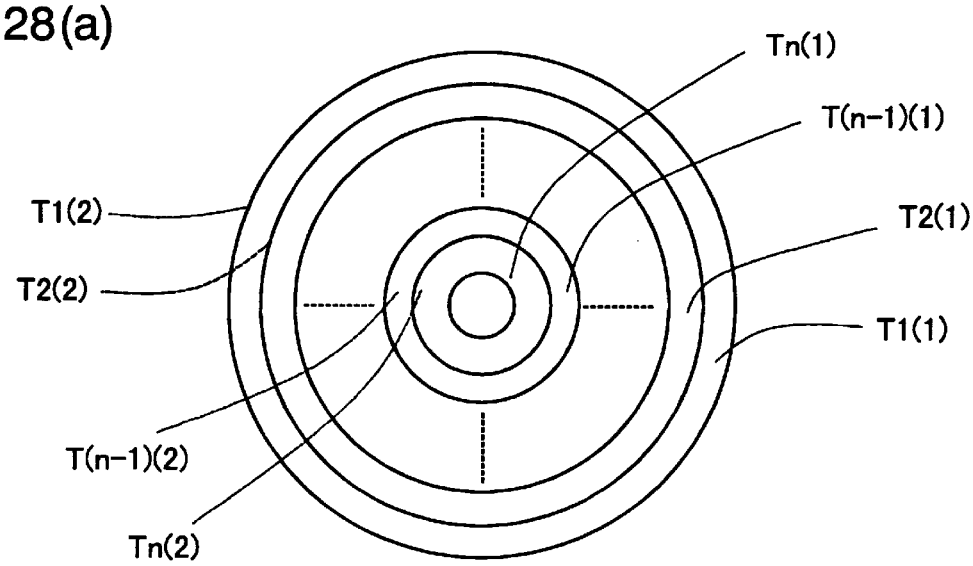
FIGS. 28(a) and 28(b), and 29 to 31 are diagrams illustrating the relationship between track numbers on a double-side recording magnetic disk and loop addresses on a ring buffer, in the recording and reproduction device according to the fourth embodiment of the invention.

In FIG. 28(a), A1, . . . , An, A(n+1), . . . , A2n show addresses on the ring buffer, and T1(1), T2(1), T(n−1)(1), Tn(1), Tn(2), T(n−1)(2), . . . , T2(2), T1(2) show tracks on the magnetic disk 14, wherein (1) and (2) mean that the tracks are on the upper surface and the lower surface of the magnetic disk 14, respectively.

The upper surface of the magnetic disk 14 is recorded by the first recording head 17a, ad the lower surface of the magnetic disk 14 is recorded by the second recording head 17b.

Figure 28B:
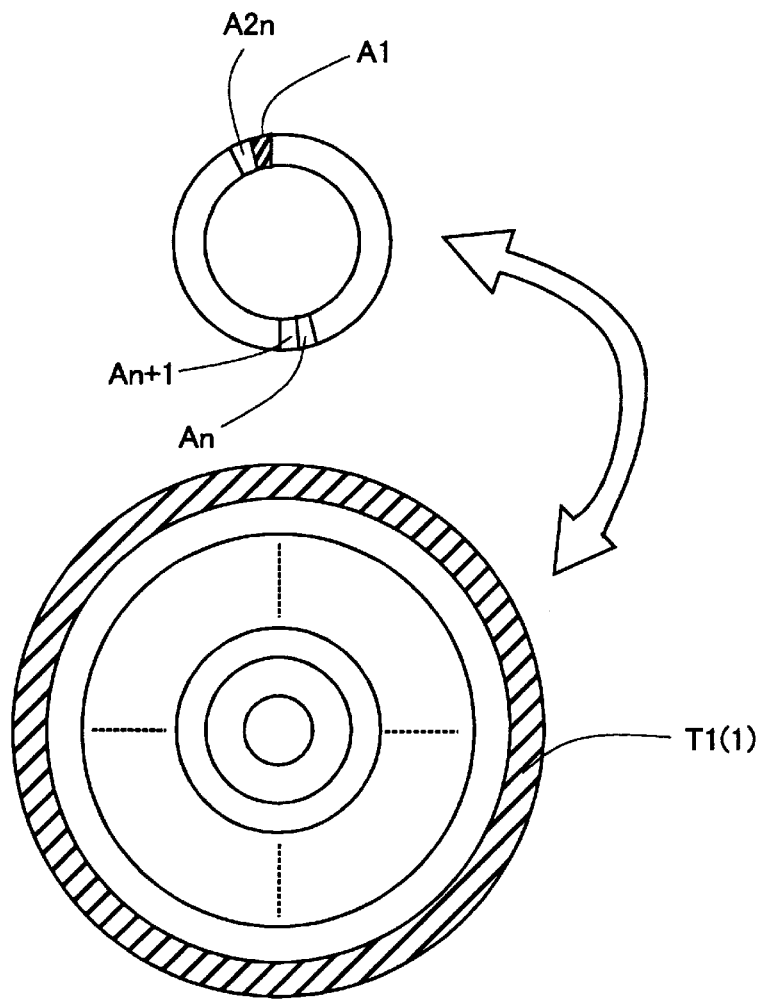
Figure 29:
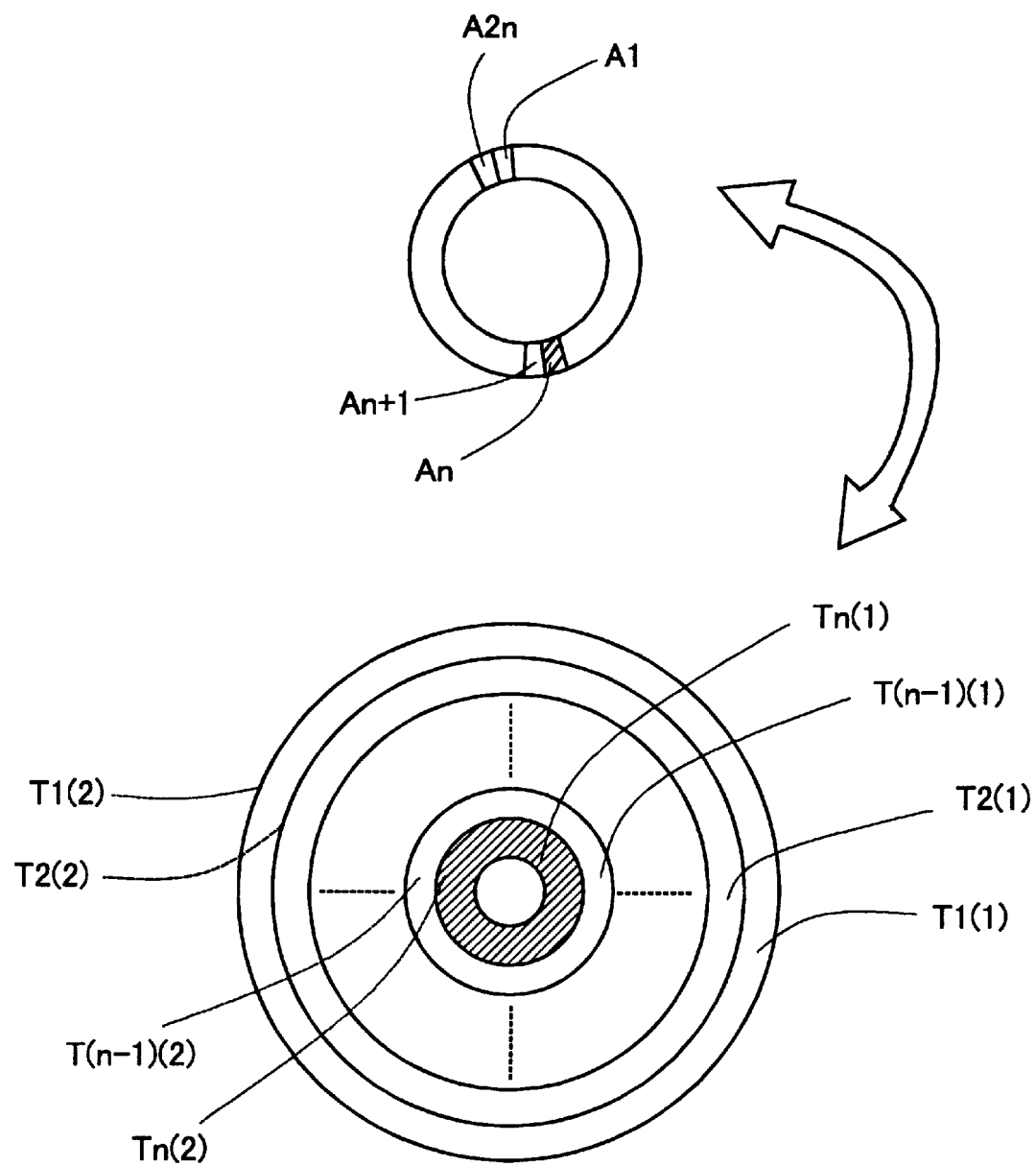

To be specific, according to the control signal from the recording head position control unit 23b, the recording head drive mechanism 21 drives the first recording head 17a and the second recording head 17b as in the following manner. That is, as shown in FIGS. 28(b) and 29, the first recording head 17a starts recording from track T1(1) when the address of the ring buffer is A1 and, with one-by-one advance in address, i.e., A2, A3, . . . , A(n−2), A(n−1), An, while moving toward the inner circumference of the disk 14, the recording head 17a successively records data on tracks, T2(1), T3(1), . . . , T(n−2)(1), T(n−1)(1), Tn(1). During this recording, the second recording head 17b does not record data.

Figure 30:
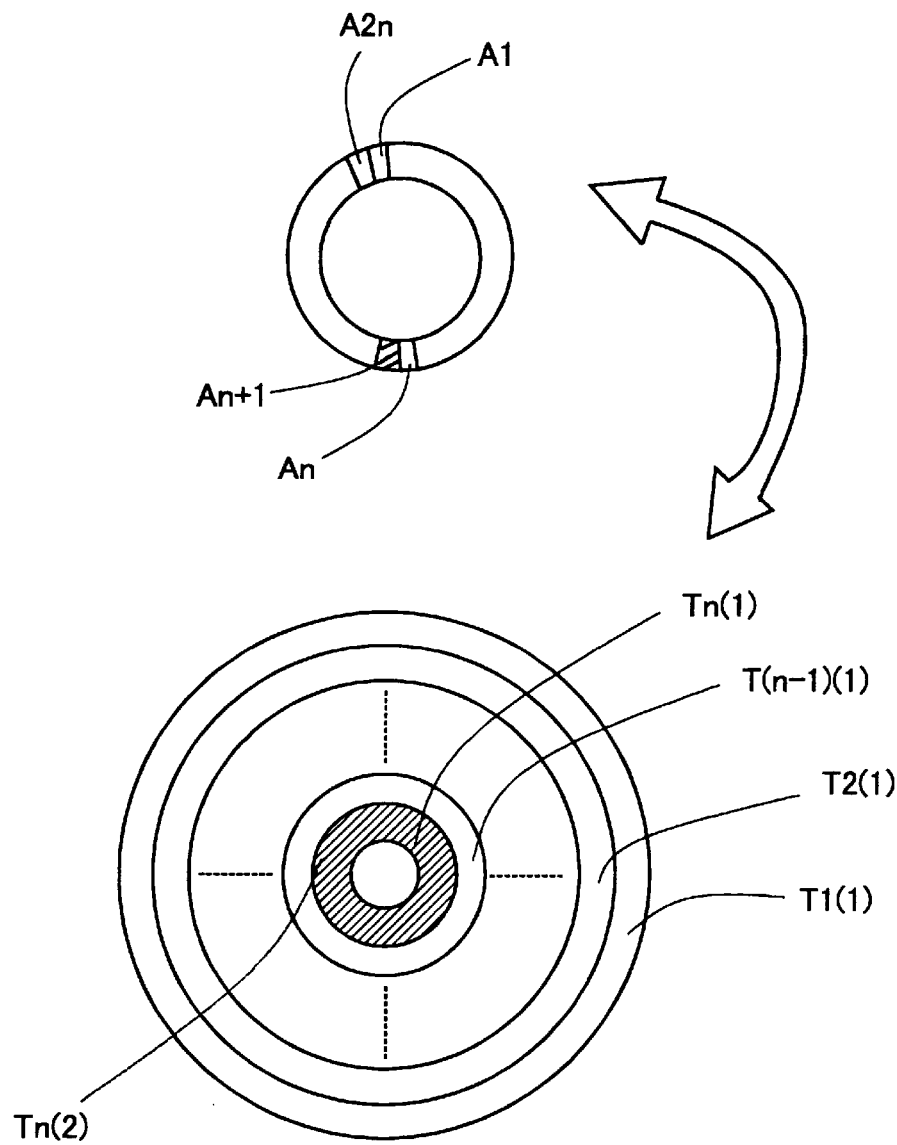
Figure 31:
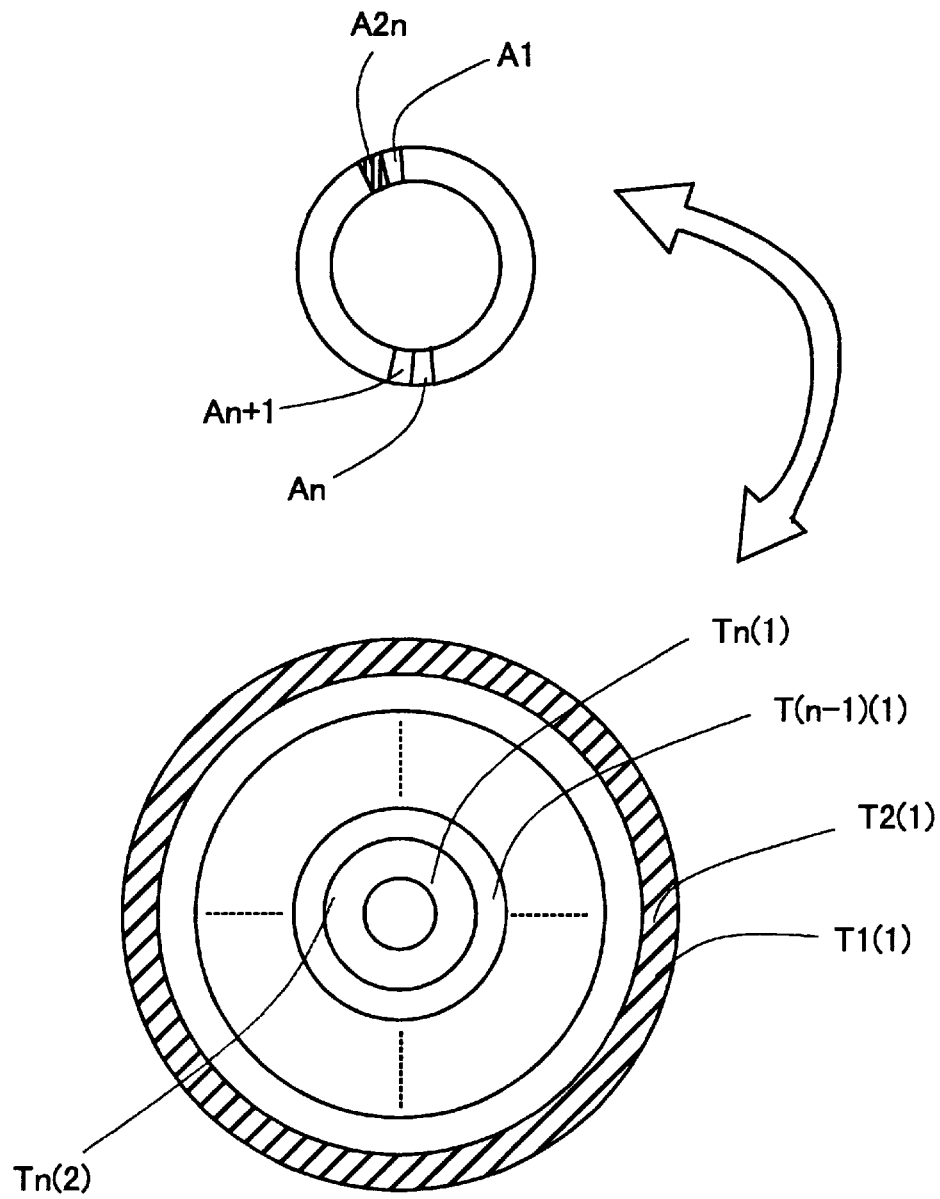

When recording on the innermost track Tn is completed, according to the control signal from the recording head position control unit 23b, the recording head drive mechanism 21 drives the second recording head 17b with the first recording head 17a as follows. That is, as shown in FIGS. 30 and 31, the second recording head 17b starts recording from track Tn(2) when the address of the ring buffer is A(n+1) and, with one-by-one advance in address, i.e., A(n+2), . . . , A(2n−2), A(2n−1), A2n, while moving toward the outer circumference of the disk 14, the second recording head 17b successively records data on tracks T(n−1)(2), T(n−2)(2), . . . , T3(2), T2(2), T1(2).

When the above-mentioned recording operation is summarized, the recording head position control is performed as follows.

track T1(1)→track T2(1)→track T3(1)→. . . →track Tn(1)→track Tn(2)→track T(n−1)(2) . . . →track T1(2).

After the second recording head 17b returns to track T1(2) and the address of the ring buffer increases by 1 from A2n and returns to A1, the first recording head 17a again records data on track T1(1). Thereafter, the above-mentioned recording operation is repeated.

As a result of the repetition of the above-mentioned recording operation by the first and second recording heads 17a and 17b, video signals which have been transmitted during a period from the present time back to a certain point of time in the past are recorded.

Next, a description is given of the reproducing operation.

The reproduction modes, i.e., playback reproduction, high-speed reproduction, pause reproduction, reverse reproduction, or frame-to-frame reproduction, are fundamentally identical to those mentioned above except that both the first reproduction head 19a and the second reproduction head 19b are used.

The playback reproduction is performed by successively reproducing tracks in the order, T1(1), T2(1), T3(1), . . . , Tn(1), Tn(2), T(n−1)(2), . . . , T1(2), whereby video signals which have been recorded during a period from the present time back to a certain point of time in the past are reproduced.

The high-speed reproduction is realized by appropriately skipping frames so that data is reproduced at a speed higher than the recording speed, for example, T1(1), T3(1), . . . , T(n−2)(1), . . . , Tn(1), Tn(2), T(n−2)(2), T3(2), T1(2). When the above-mentioned waiting time in the operating cycle of the reproduction head can be reduced, high-speed reproduction is realized by reducing the waiting time.

This high-speed reproduction realizes the interruptible television according to the first operation mode described for the first embodiment of the invention.

Further, when plural interruption periods are recorded and reproduced using the above-mentioned recording and reproduction device, the multiple interruption according to the second operation mode described for the first embodiment is realized.

Further, the pause reproduction is performed as follows. The first reproduction head 19a or the second reproduction head 19b is moved to and stopped at a desired track to reproduce the recorded video signal on the track repeatedly. Since the video signal is recorded by one frame or one field for each track, a still picture is displayed by this reproduction.

This pause reproduction realizes the still-picture reproduction during interruption according to the first operation mode described for the first embodiment of the invention.

The reverse reproduction is performed by reproducing every second track using the first (second) reproduction head, in the reverse order to the recording order by the first (second) recording head. In this case, the reproduced image moves reversely to the recorded image.

The frame-to-frame operation is performed as follows. The first reproduction head 19a or the second reproduction head 19b is stopped on a track for a prescribed period of time to reproduce a video image on this track during the period. Then the reproduction head is moved to a track on which a frame next to the frame of the track that has just been reproduced is recorded, and a video image on the track is reproduced during a prescribed period.

Alternatively, after the standstill reproduction on the same track, the reproduction head may be moved to a track on which a frame, which is several frames away from the frame of the track that has just been reproduced, is recorded. In this case, the above-mentioned stroboscopic reproduction is realized.

During the reproduction, the above-mentioned recording operation by the first and second recording heads 17a and 17b is performed.

Also in this case (II), as described for the case (I), unnecessary movements of the recording and reproduction heads are avoided. Therefore, unwanted noise and frame skip are avoided, resulting in a long life of a head driving mechanism.

[Embodiment 5]

Figure 32:
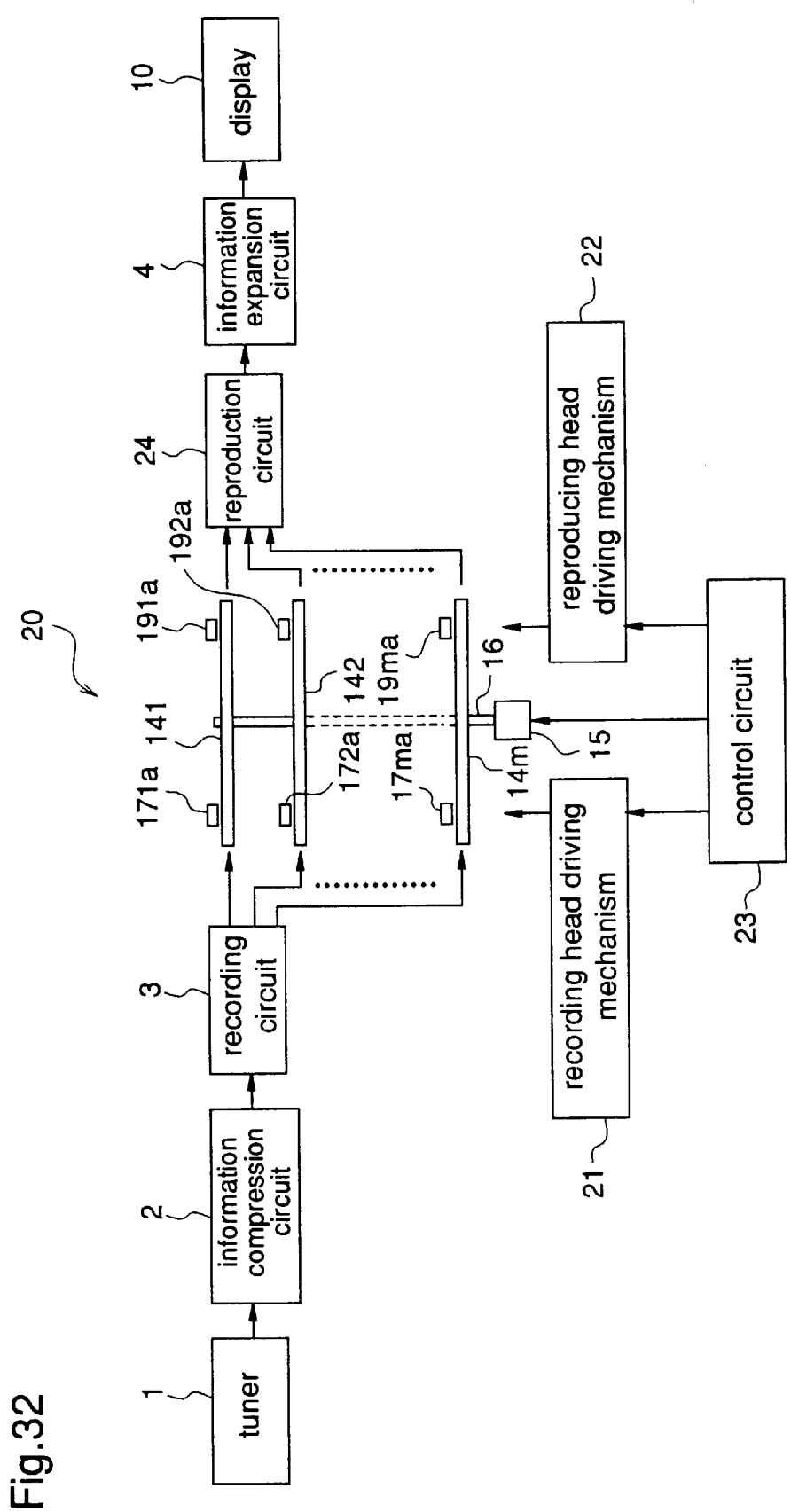
FIG. 32 is a schematic diagram illustrating a magnetic disk and its vicinity in a recording and reproduction device with playback function according to a fifth embodiment of the invention.
Figure 33:
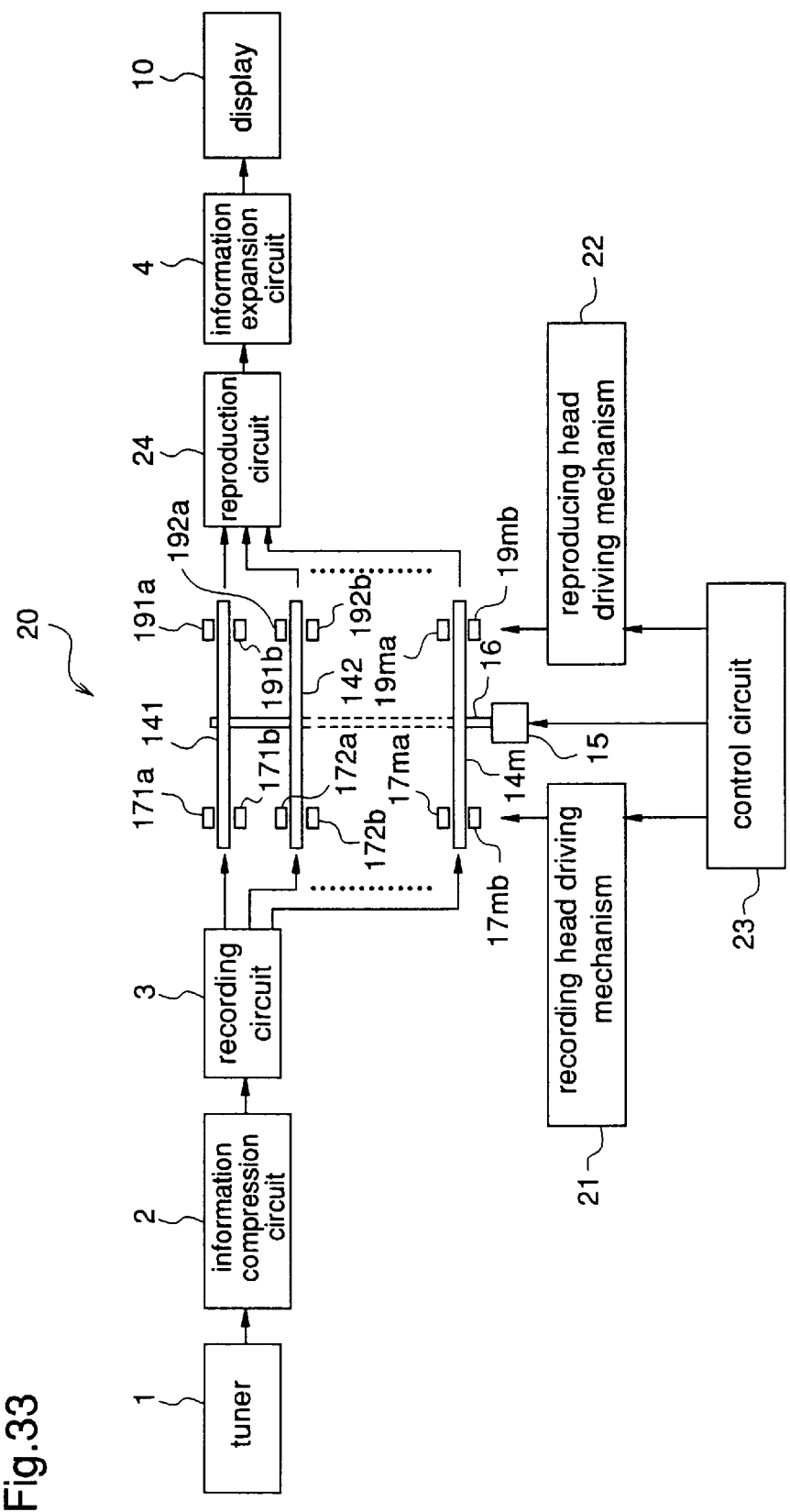
FIG. 33 is a schematic diagram illustrating a magnetic disk and its vicinity in the recording and reproduction device according to the fifth embodiment.

FIGS. 32 and 33 are block diagrams each illustrating a recording and reproduction device with playback function using a plurality of magnetic disks each having n tracks, according to a fifth embodiment of the present invention. The structure of the recording and reproduction device according to this fifth embodiment is different from the device according to the fourth embodiment only in that a plurality of magnetic disks are used. In FIGS. 32 and 33, the same reference numerals as those shown in FIGS. 18 and 19 designate the same or corresponding parts.

As shown in FIGS. 32 and 33, the recording and reproduction device according to this fifth embodiment uses m (m: integer not less than 2) magnetic disks 141, 142, 14m. The device shown in FIG. 32 includes a single-side recording HDD unit 20. This unit includes a first recording head 171a and a first reproduction head 191a for the first magnetic disk 141, a first recording head 172a and a first reproduction head 191a for the second magnetic disk, and a first recording head 17ma and a first reproduction head 19ma for the m-th magnetic disk 14m. These recording heads 171a, ..., 17ma are moved together by the recording head drive mechanism 21, and these production heads 191a, ..., 19ma are moved together by the recording head drive mechanism 22.

The device shown in FIG. 33 includes a double-side recording HDD unit 20. This unit includes first and second recording heads 171a and 171b and first and second reproduction heads 191a and 191b for the first magnetic disk 141, first and second recording heads 172a and 172b and first and second reproduction heads 191a and 191b for the second magnetic disk, ..., and first and second recording heads 17ma and 17mb and first and second reproduction heads 19ma and 19mb for the m-th magnetic disk 14m. These recording heads 171a, 171b, ..., 17ma, 17mb are moved together by the recording head drive mechanism 21, and these production heads 191a, 191b, ..., 19ma, 19mb are moved together by the recording head drive mechanism 22.

FIGS. 34 to 51 are schematic diagrams each illustrating the relationship (correspondence) between the track numbers on the magnetic disks 141, ..., 14m of the single-side recording HDD unit 20 and the loop addresses on the ring buffer implemented by the HDD unit. In the FIG.s, RB denote ring buffers, arid D1 to Dm denote magnetic disks.

A description is now given of the recording and reproduction operation according to this fifth embodiment using FIGS. 32, 34 to 51.

(I) First of all, the recording and reproduction operation using m single-side recording magnetic disks each having n tracks will be described.

Initially, the recording operation will be described.

Each recording head records data on the upper recording surface of each magnetic disk (141, ..., 14m), for every second track, while moving from the outermost circumference toward the innermost circumference. Thereafter, each recording head records data on the upper recording surface of each magnetic disk, for every second track, while moving from the innermost circumference toward the outermost circumference.

To be specific, according to a control signal from the recording head position control unit 23b shown in FIG. 32, the recording head drive mechanism 21 drives the first recording heads 171a, 172a, ..., 17ma for the magnetic disks 141, ..., 14m as follows:

When the first recording heads 171a, ..., 17ma are positioned on the outermost tracks T1 on the upper surfaces of the magnetic disks, the recording operation is performed in the following manner.

Figure 34:
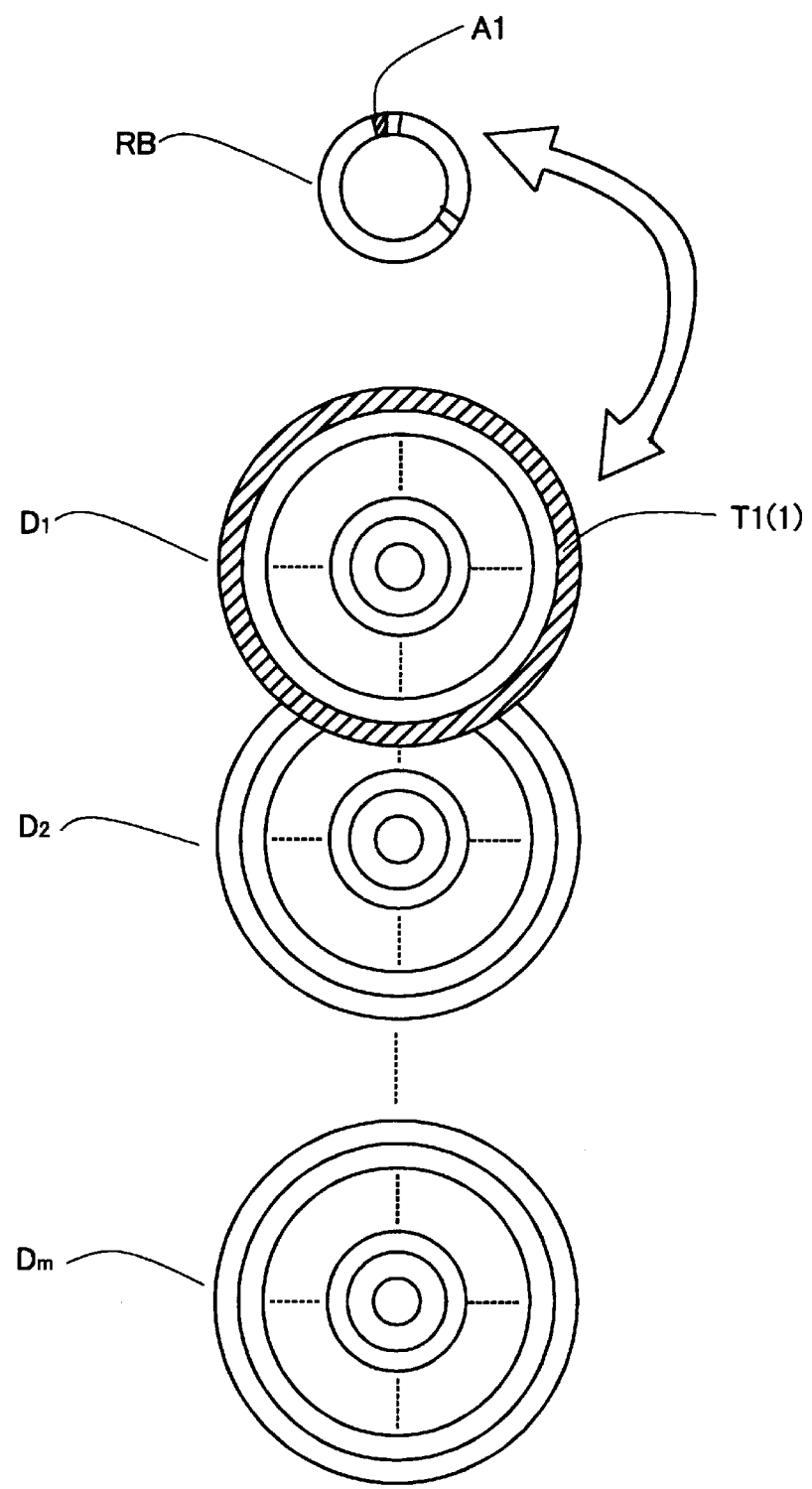
FIGS. 34 to 51 are diagrams illustrating the relationship between track numbers on single-side recording magnetic disks and loop addresses on a ring buffer, in the recording and reproduction device according to the fifth embodiment of the invention.
Figure 35:
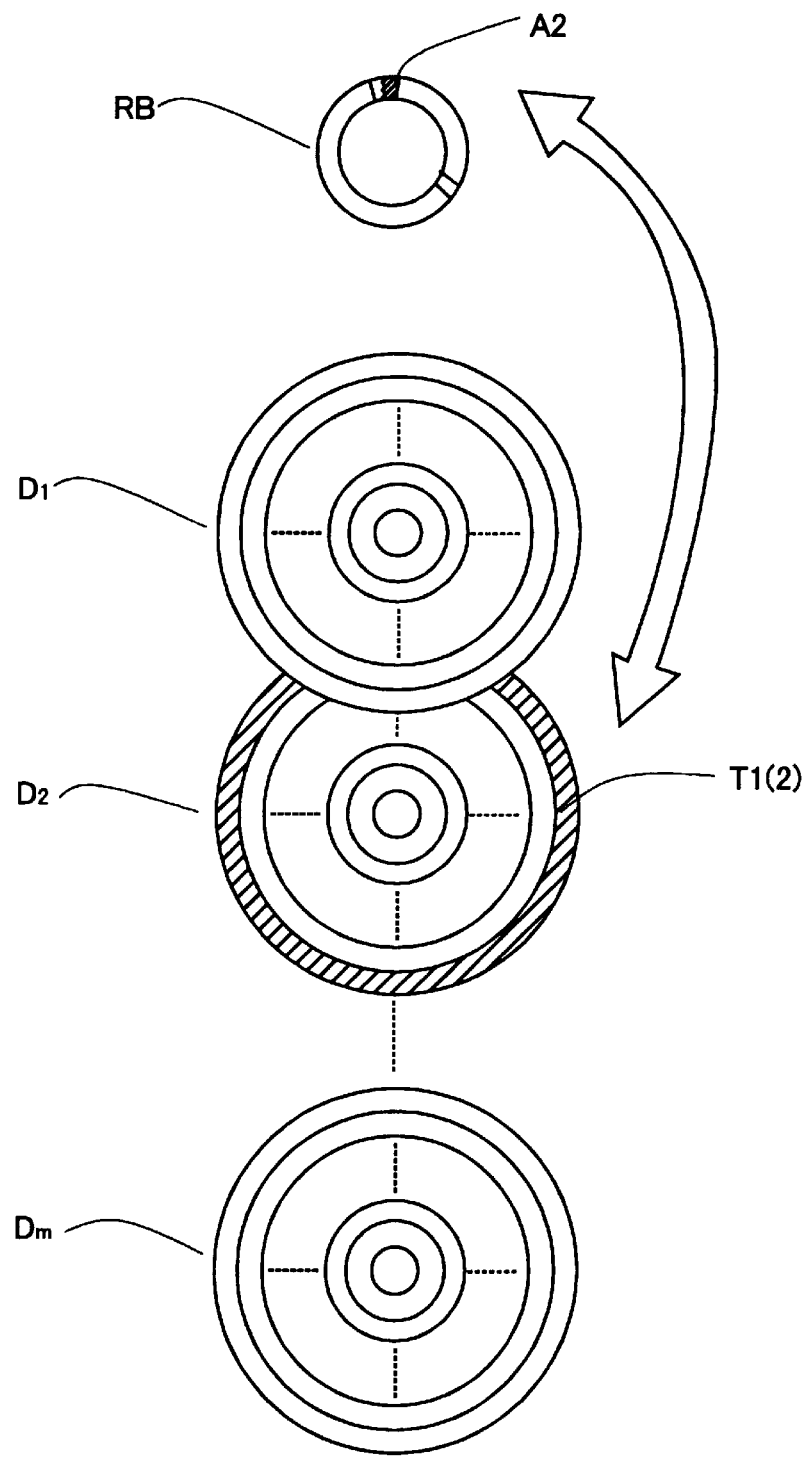
Figure 36:
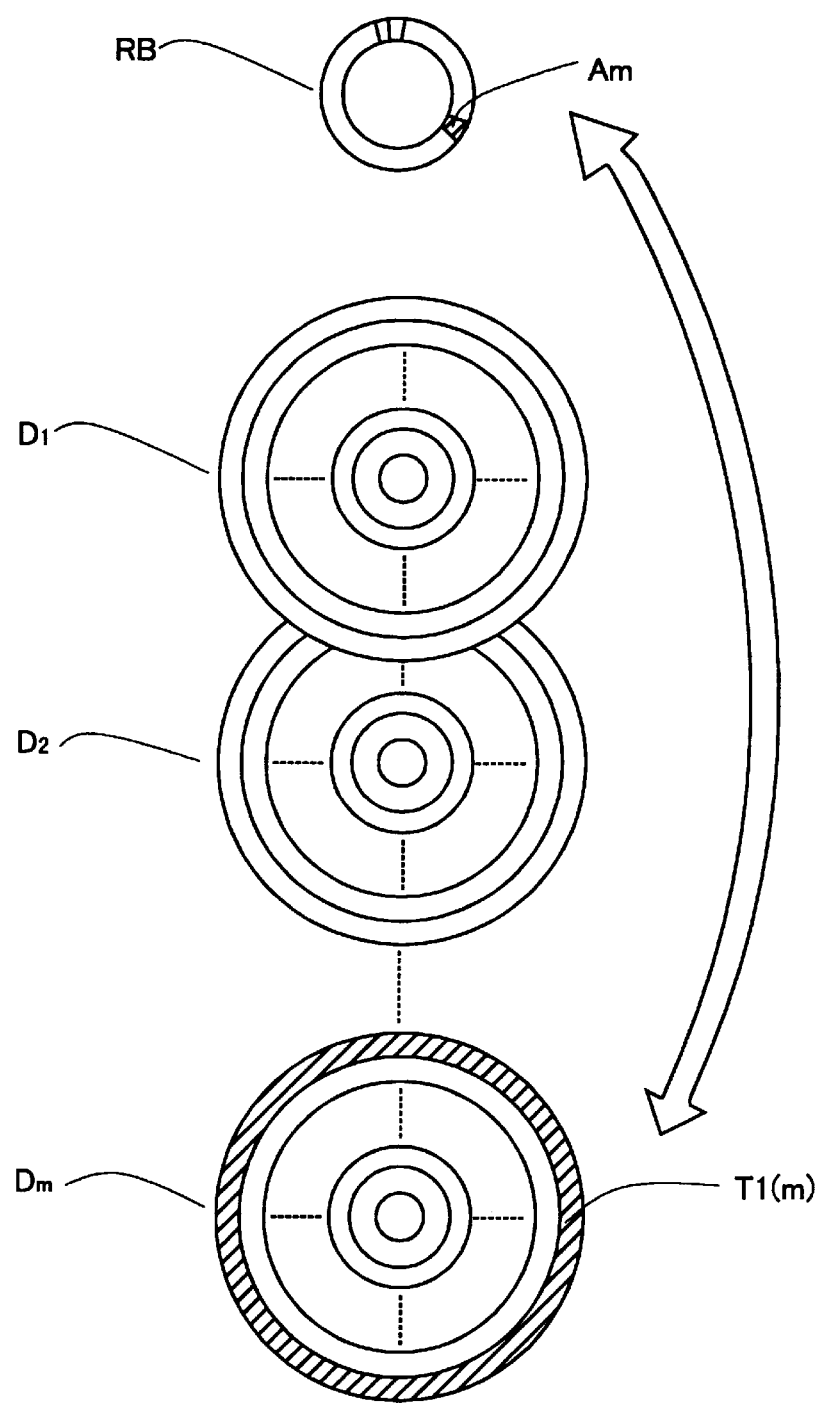

Initially, the first recording head 171a records data on the outermost track T1 of the first magnetic disk 141. When the address of the ring buffer advances from A1 to A2, the second recording head 172a records data on the outermost track T1 of the second magnetic disk 142. As shown in FIGS. 34 to 36, the recording operation is successively performed in this way until the address of the ring buffer reaches Am by one-by-one advance from A1 and date is recorded on the outermost track T1 of the m-th magnetic disk 14m by the m-th recording head 17ma.

Next, when the address of the ring buffer advances from Am to Am+1, the first recording heads 171a, ..., 17ma move from the outermost tracks T1 on the respective disks 141, ..., 14m toward the inner circumferences of these disks, skipping one track, that is, the recording heads reach tracks T3 on the respective disks. Thereafter, until the address of the ring buffer reduces A2m by one-by-one advance from Am+1, the above-mentioned recording operation is performed.

Figure 37:
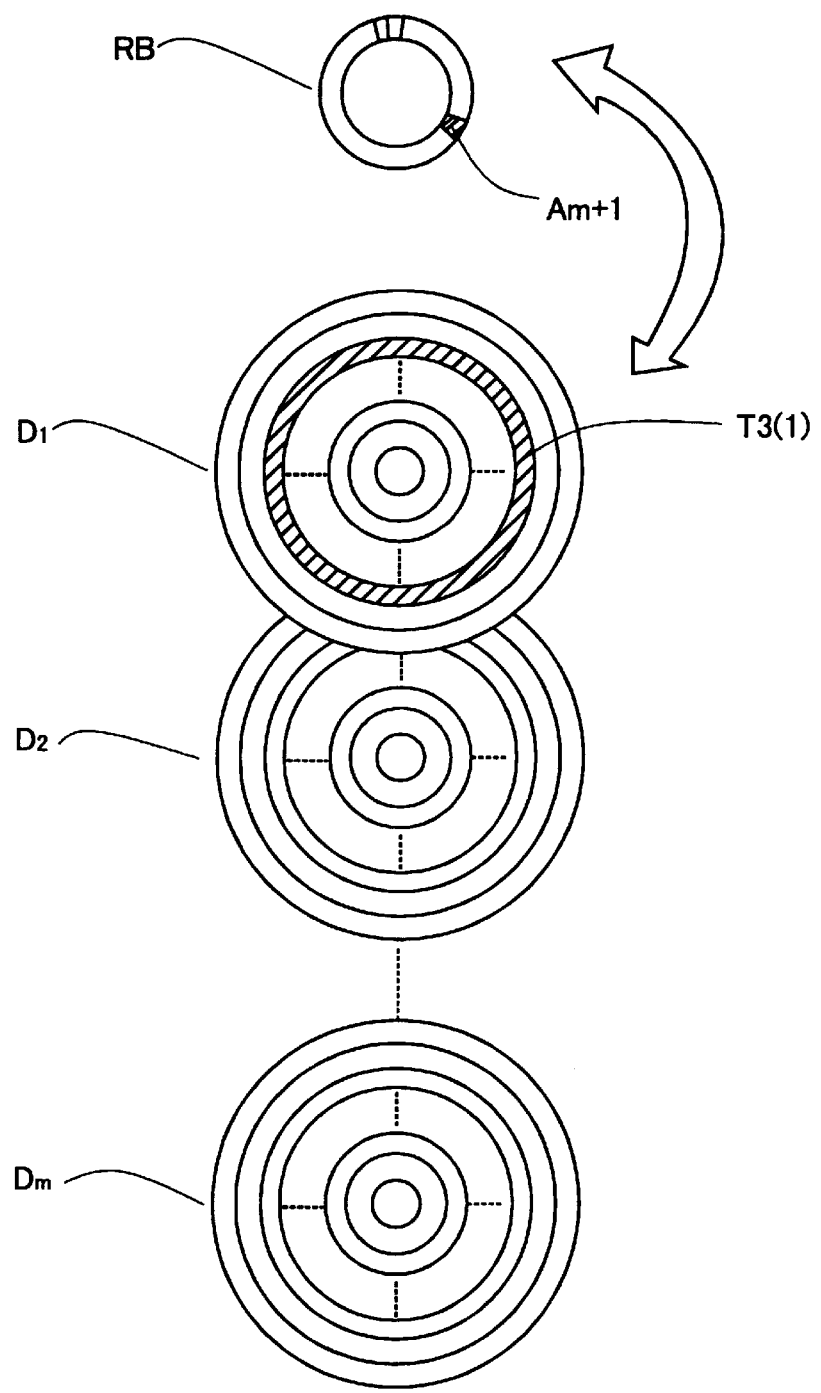
Figure 38:
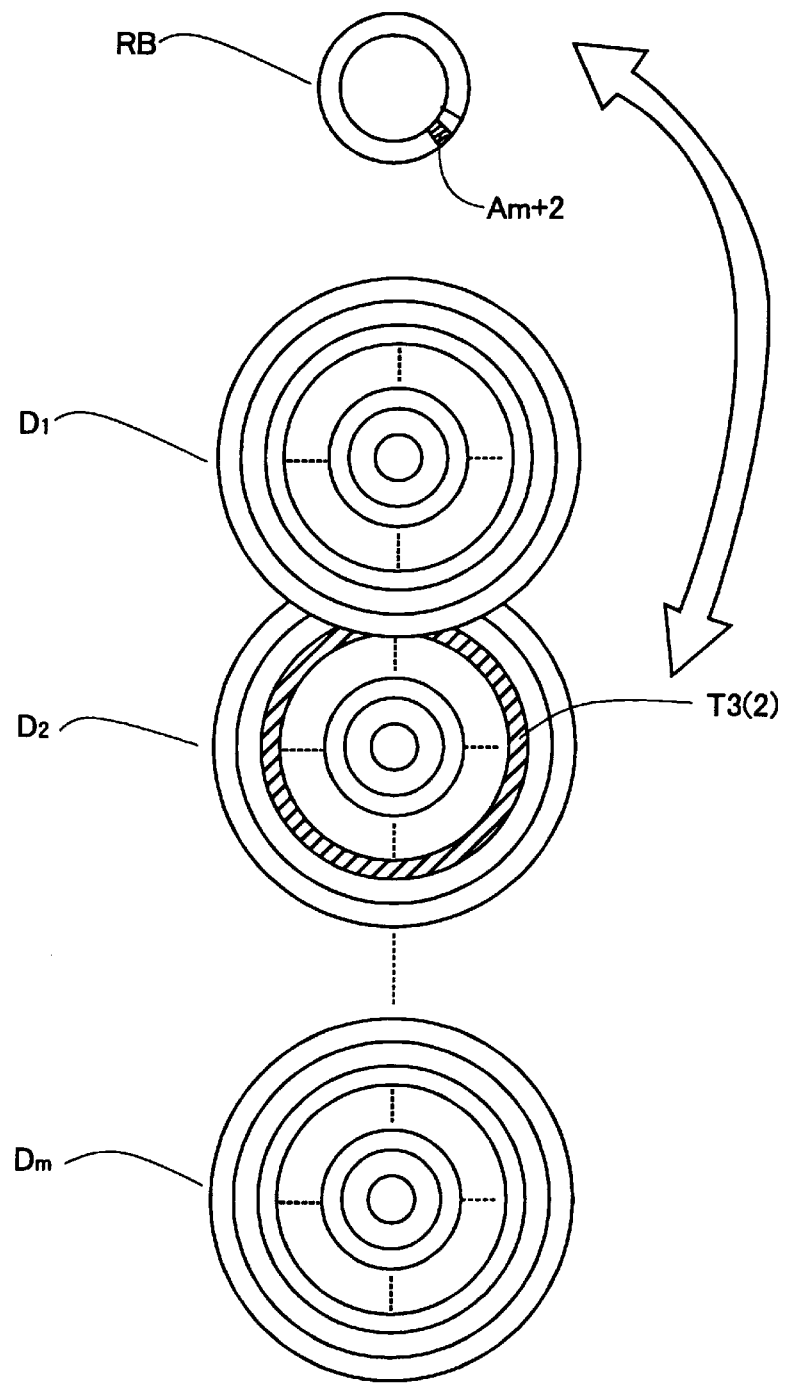
Figure 39:
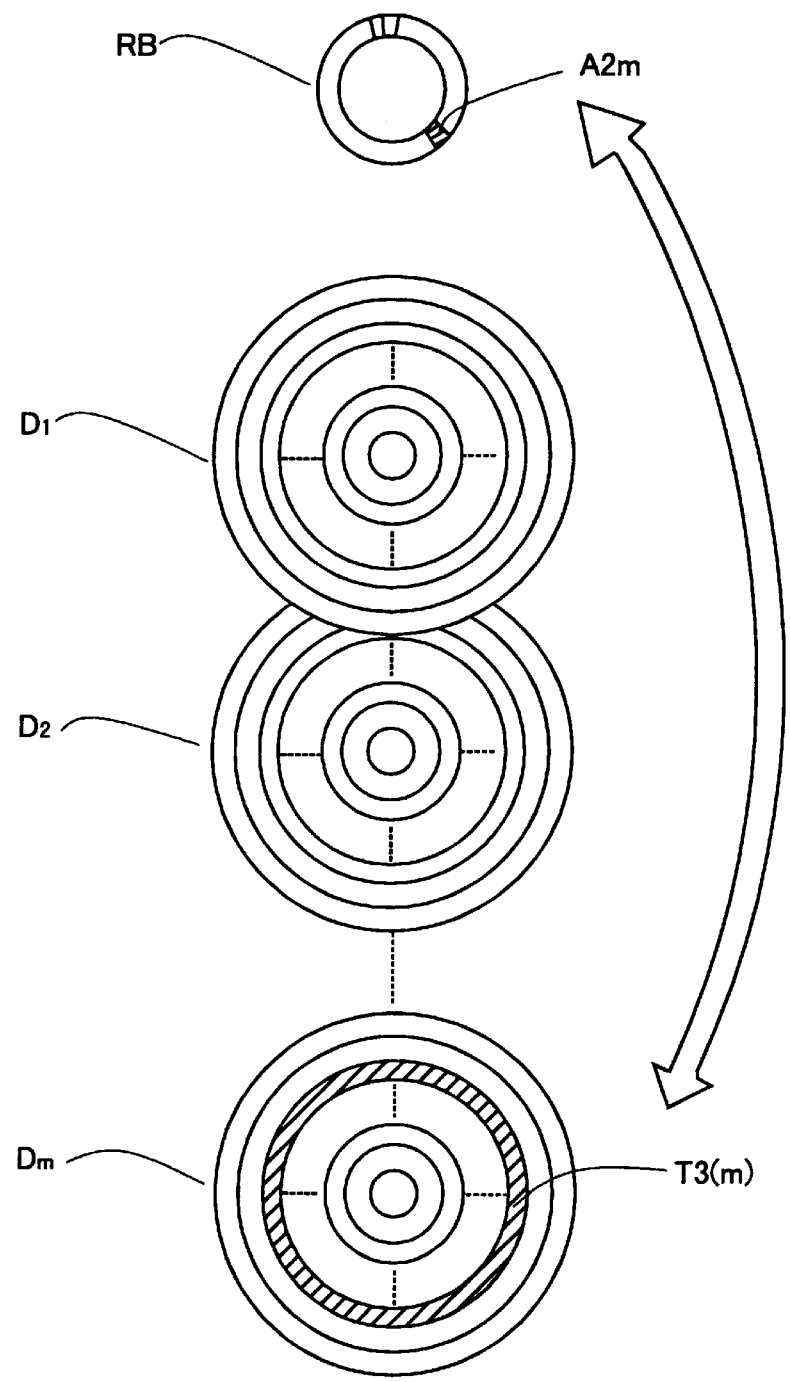

More specifically, as shown in FIGS. 37 to 39, the recording order by the first recording heads 171a, ..., 17ma will be as follows: track T3 on the first disk 141, track T3 on the second disk 142, ..., track T3 on the m-th disk 14m.

Figure 40:
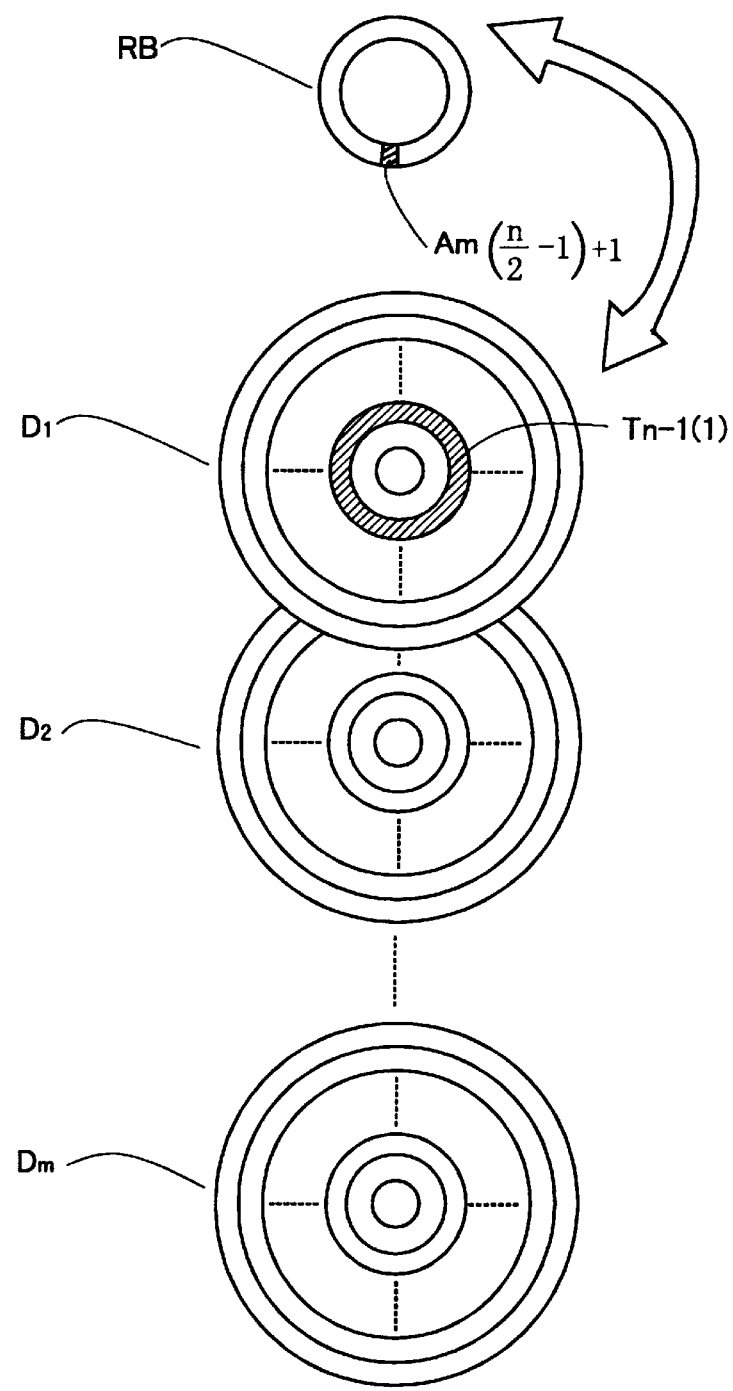
Figure 41:
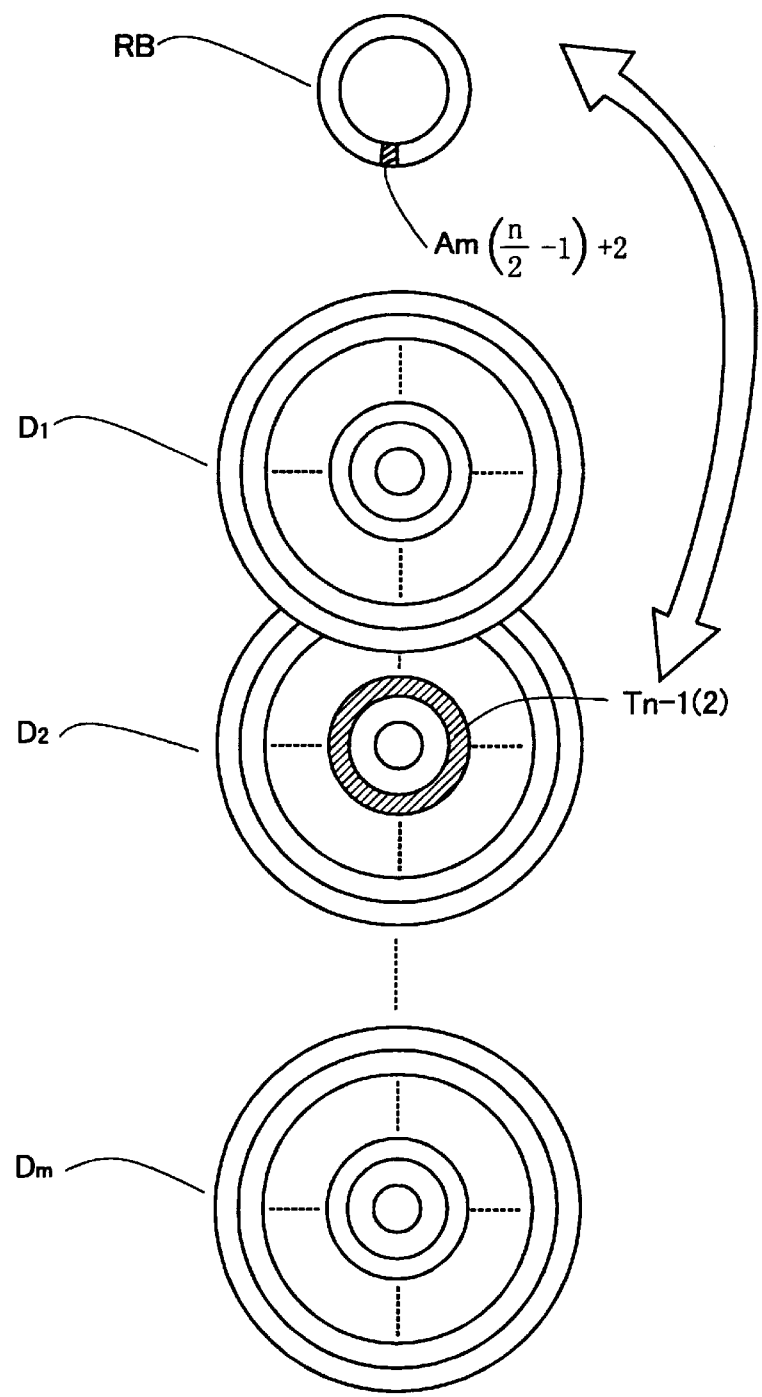
Figure 42:
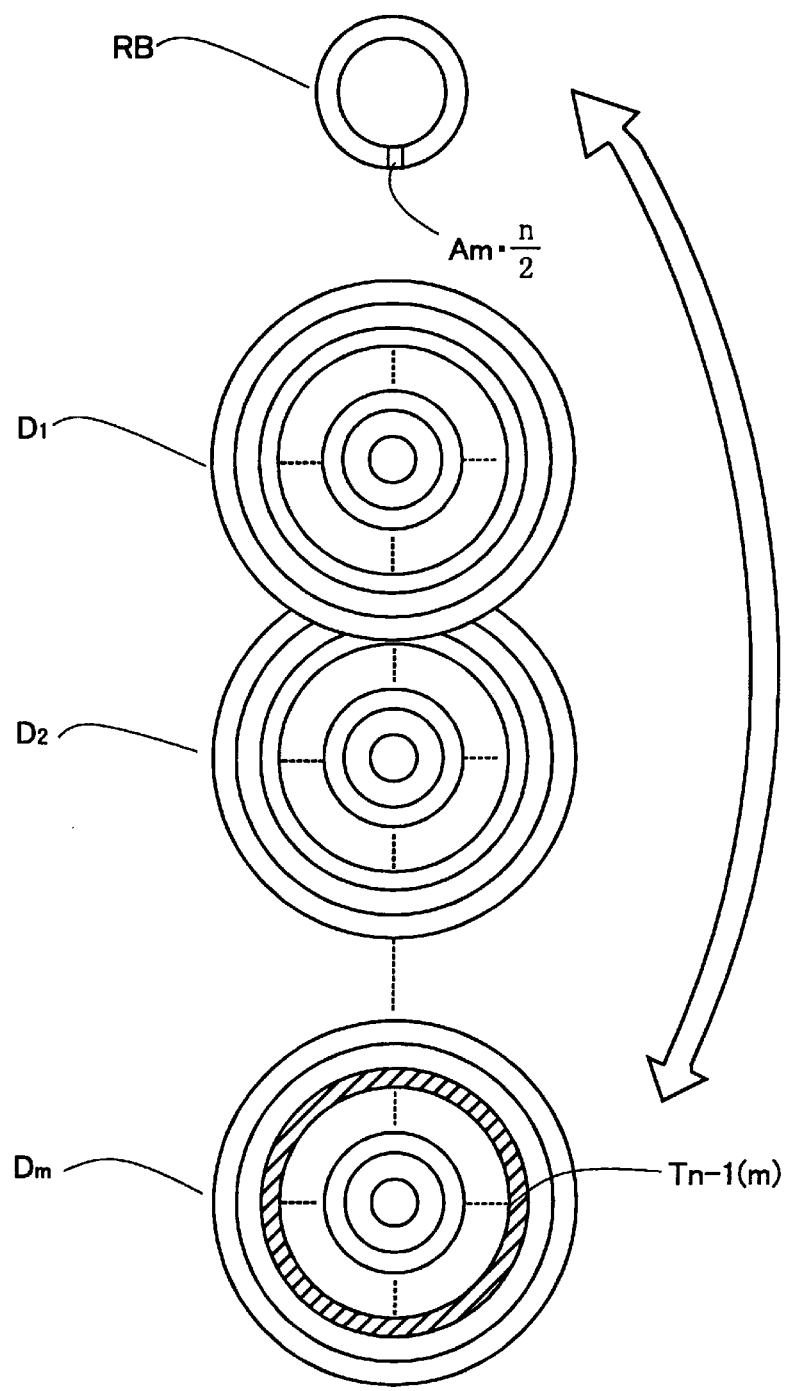

When the address of the ring buffer reaches Am(n/2) by one-by-one advance from Am(n/2−1)+1 as shown in FIGS. 40 to 42, recording on the innermost tracks Tn−1(1), ..., T(n−1)(m) on the first to m-th magnetic disks 141, ..., 14m is completed. Subsequently, recording is preformed for the tracks on the upper surface of the magnetic disks 141, ..., 14m while moving the respective reading heads from the innermost tracks Tn toward the outer circumferences.

Figure 43:
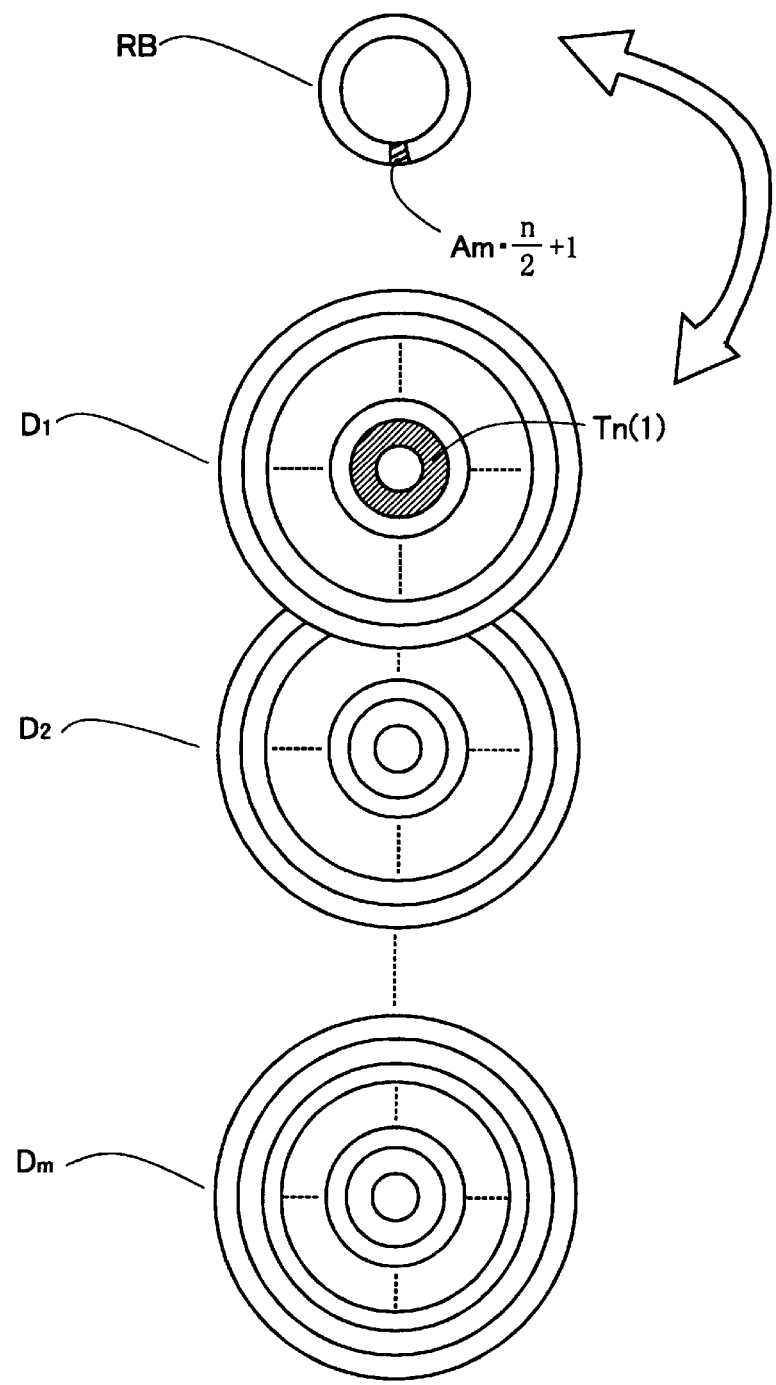
Figure 44:
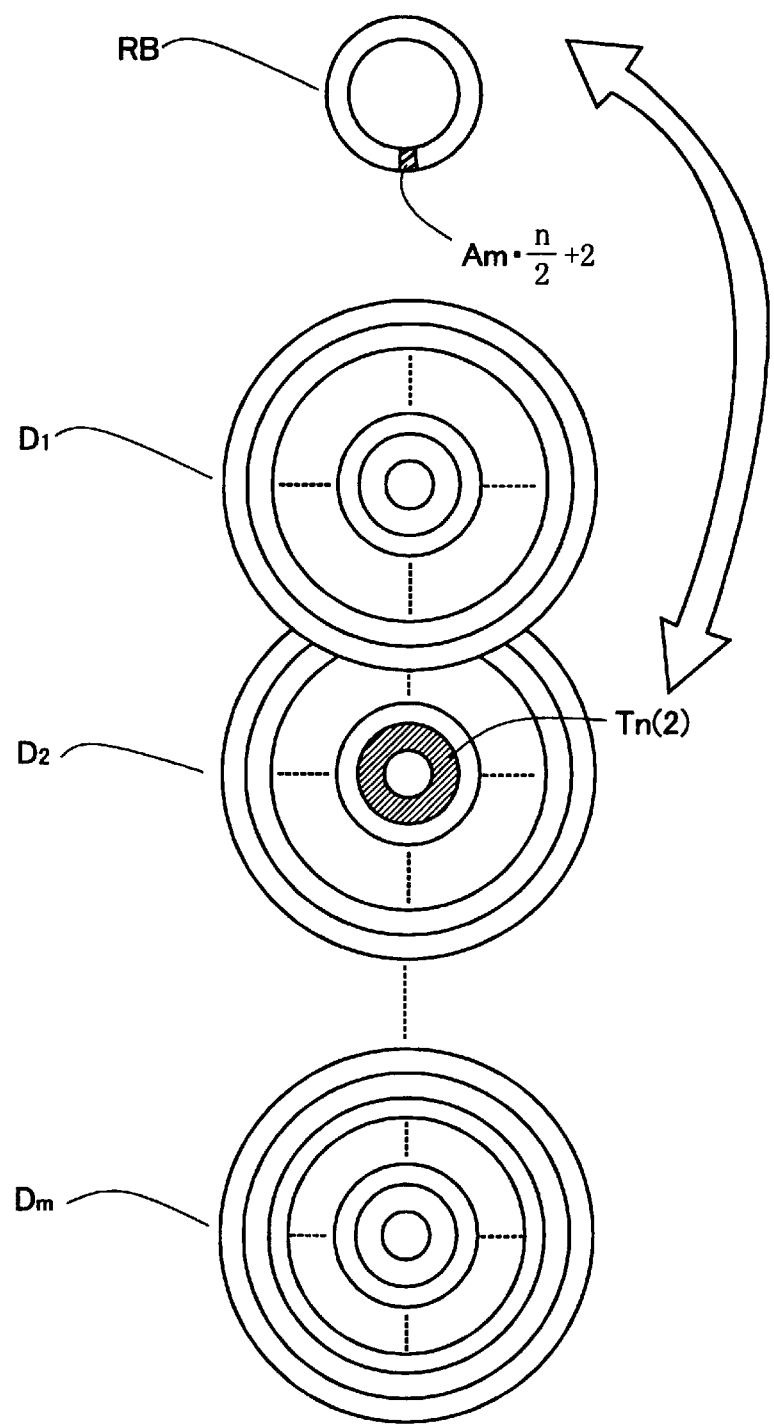
Figure 45:
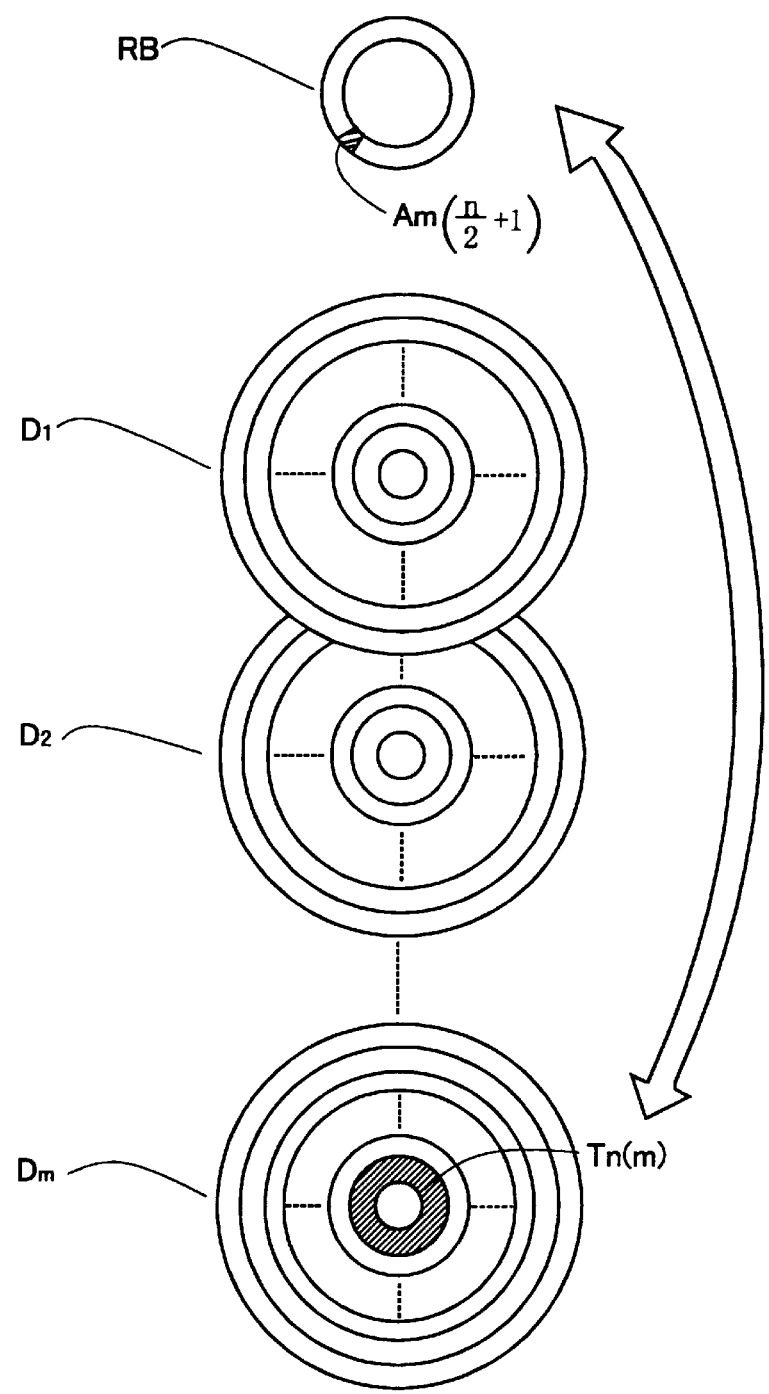

That is, as shown in FIGS. 43 to 45, when the address of the ring buffer reaches Am(n/2+1) by one-by-one advance from Am(n/2)+1, recording is performed for the innermost tracks Tn on the magnetic disks 141, ..., 14m, in the order as follows: track Tn on the first disk 141, track Tn on the second disk 142, ..., track Tn on the m-th disk 14m.

Figure 46:
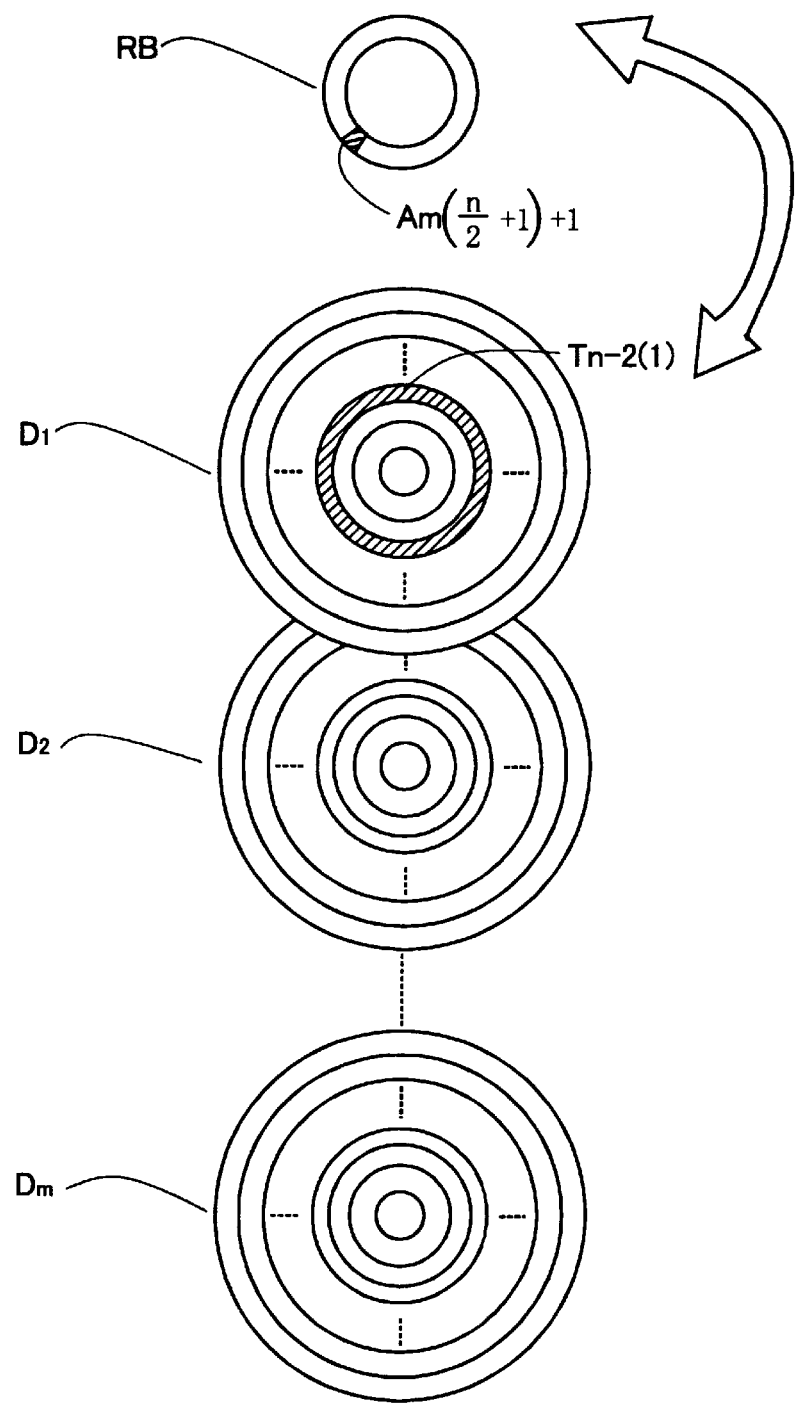
Figure 47:
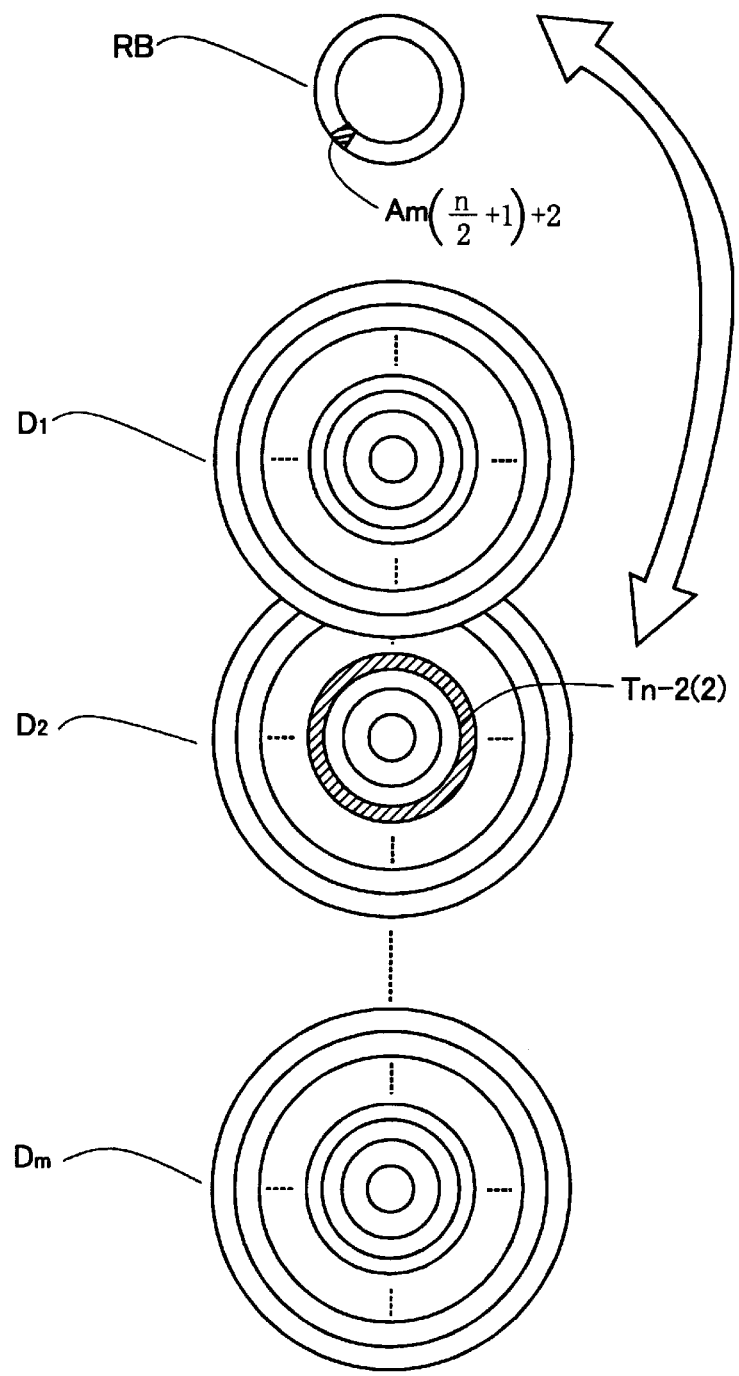
Figure 48:
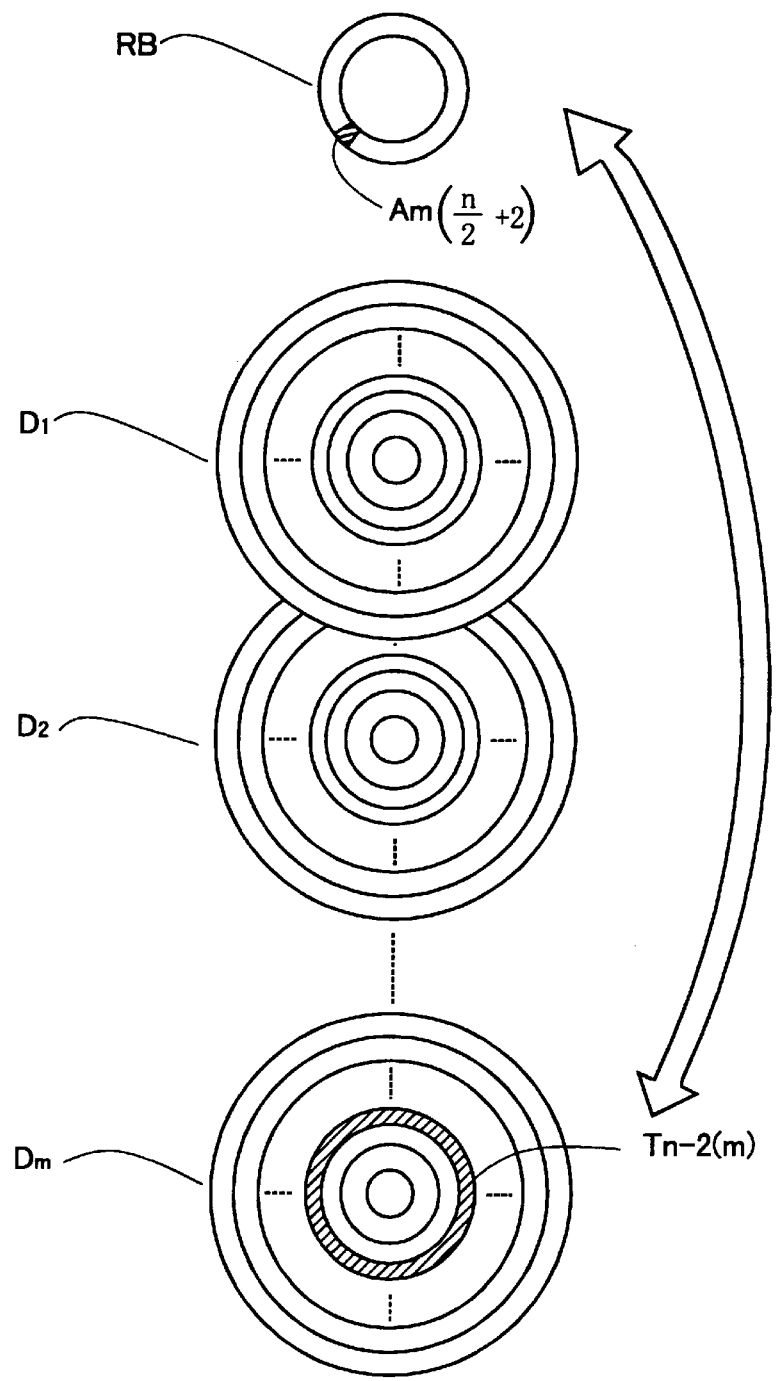
Figure 49:
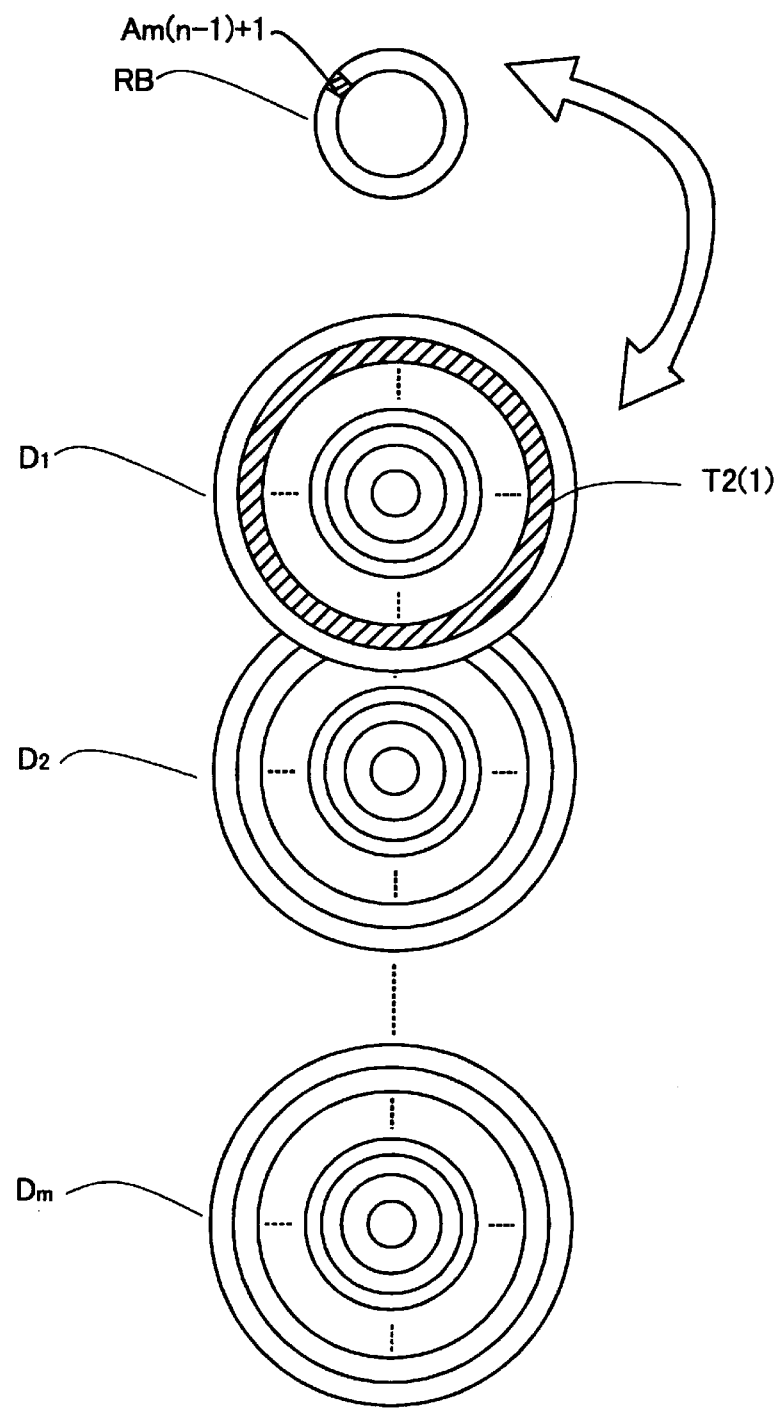
Figure 50:
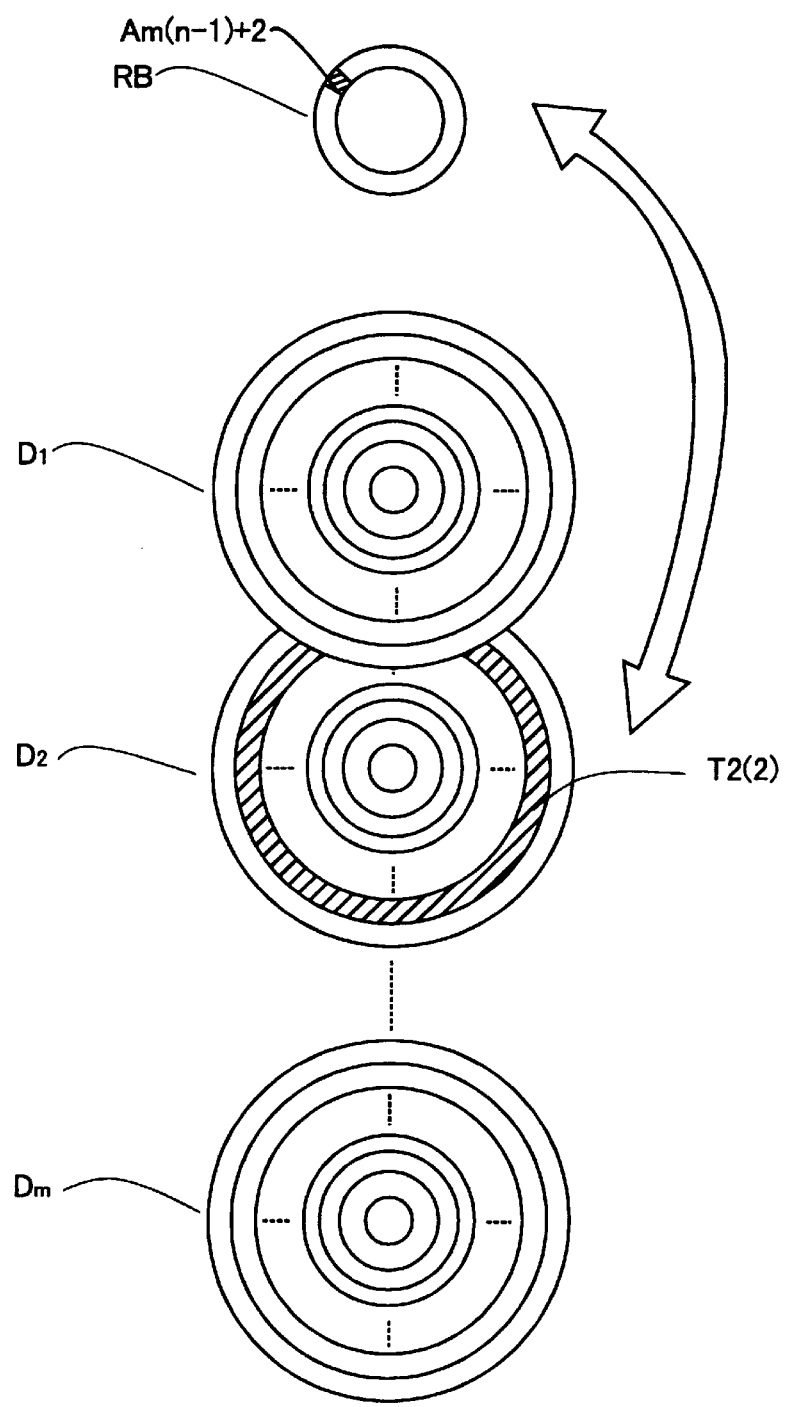
Figure 51:
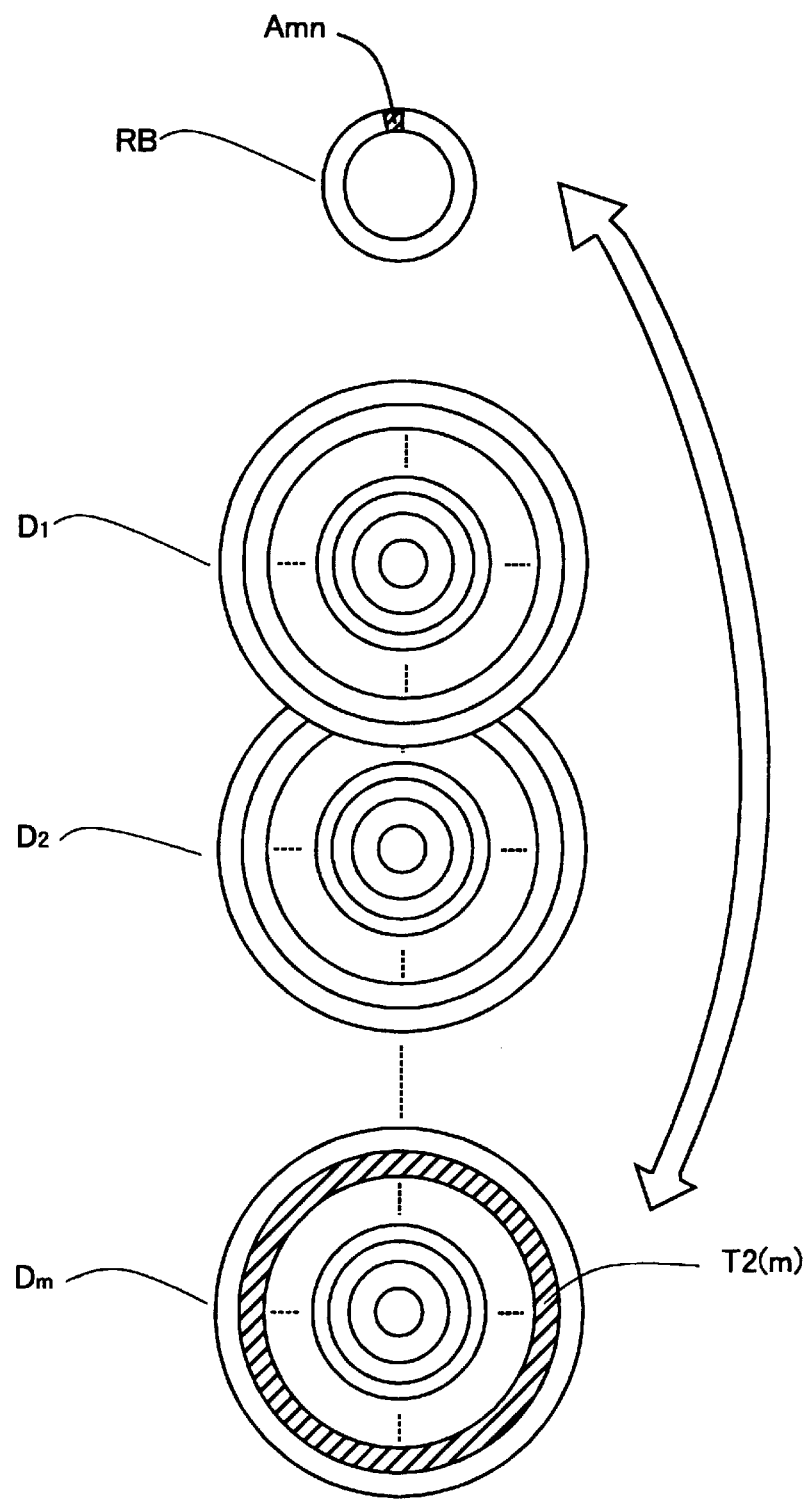

As shown in FIGS. 46 to 48, when the address of the buffer ring reaches Am(n/2+2) by one-ty-one advance from Am(n/2+1)+1, recording is performed for tracks T(n−2)(1), ..., T(n−2)(m). Thereafter, recording is performed to the respective magnetic disks while moving the recording heads toward the outer circumferences of the disks in the same order as mentioned above. As shown in FIGS. 49 to 51, when the address of the ring buffer reaches Amn by one-by-one advance from Am(n−1)+1, recording on the outerost track T2(m) on the m-th magnetic disk 14m is performed, by which the recording operation for the m magnetic disks makes a round.

When the above-mentioned recording operation is summarized, the recording head position control is performed as follows. (1),(2),(m) indicate the recording heads used for the recording on m magnetic disks.

```
        track T1(1)   → track T1(2)   → ... → track T1(m)
     →  track T3(1)   → track T3(2)   → ... → track T3(m)
  ... → track Tn-1(1) → track Tn-1(2) → ... → track Tn-1(m)
     →  track Tn(1)   → track Tn(2)   → ... → track Tn(m)
     →  track Tn-2(1) → track Tn-2(2) → ... → track Tn-2(m)
  ... → track T2(1)   → track T2(2)   → ... → track T2(m)
```

When the address of the ring buffer becomes A1 from Amn, the recording head moves back to track T1 and repeats the above-mentioned operation.

As a result of the repetition of the above-mentioned recording operation by the respective recording heads, on the m single-side recording magnetic disks, video signals which have been transmitted during a period from the present time back to a certain point of time in the past are recorded. With an increase in the number of the magnetic disks, the capacity of data can be increased.

As described above, even when the number of the magnetic disks increases, since each disk is provided with a pair of recording head and reproduction head, unnecessary movements of the recording and reproduction heads as in the conventional device are avoided. Therefore, unwanted noise and frame skip are avoided.

Furthermore, when 2m single-side recording disks are employed, the recording head position control is performed as follows.

track T1(1) → track T1(2) → ... → track T1(m)
→ track T2(1) → track T2(2) → ... → track T2(m)
→ track Tn(1) → track Tn(2) → ... → track Tn(m)
→ track Tn(m+1) → track Tn(m+2) → ... → track Tn(2m)
→ track Tn−1(m+1) → track Tn−1(m+2) → ... → track Tn−1(2m)

When the address of the ring buffer becomes A1 from A2mn, the recording heads move to tracks 1 of the disks 1 to m and, thereafter, the above-mentioned operation is repeated. Thereby, the moving time of each head is reduced, and unwanted frame skip of recorded data is surely prevented.

Hereinafter, a description is given of the reproducing operation.

The reproduction modes, i.e., playback reproduction, high-speed reproduction, pause reproduction, reverse reproduction, or frame-to-frame reproduction, are fundamentally identical to those mentioned above except that a plurality of magnetic disks are used.

In the playback reproduction, data is successively reproduced from the plural magnetic disks in the following order:

track T1(1) → track T1(2) → ... → track T1(m)
→ track T3(1) → track T3(2) → ... → track T3(m)
... → track Tn−1(1) → track Tn−1(2) → ... → track Tn−1(m)
→ track Tn(1) → track Tn(2) → ... → track Tn(m)
→ track Tn−2(1) → track Tn−2(2) → ... → track Tn−2(m)
... → track T2(1) → track T2(2) → ... → track T2(m)

Alternatively, when 2m single-side recording disks are employed, data is successively reproduced from the magnetic disks in the following order:

track T1(1) → track T1(2) → ... → track T1(m)
→ track T2(1) → track T2(2) → ... → track T2(m)
→ track Tn(1) → track Tn(2) → ... → track Tn(m)
→ track Tn(m+1) → track Tn(m+2) → ... → track Tn(2m)
→ track Tn−1(m+1) → track Tn−1(m+2) → ... → track Tn−1(2m)

Thereby, data recorded on the tracks of the magnetic disks are reproduced and displayed on the display unit.

In the high-speed reproduction, data is reproduced for every second magnetic disk as shown in the following.

track T1(1) → track T1(3) → ... → track T1(m)
→ track T3(1) → track T3(3) → ... → track T3(m)
... → track Tn−1(1) → track Tn−1(3) → ... → track Tn−1(m)
→ track Tn(1) → track Tn(3) → ... → track Tn(m)
→ track Tn−1(1) → track Tn−2(3) → ... → track Tn−2(m)
... → track T2(1) → track T2(3) → ... → track T2(m)

Alternatively, when 2m single-side recording disks are employed, data is successively reproduced from every second magnetic disk in the following order:

track T1(1) → track T1(3) → ... → track T1(m)
→ track T2(1) → track T2(3) → ... → track T2(m)
→ track Tn(1) → track Tn(3) → ... → track Tn(m)
→ track Tn(m+1) → track Tn(m+3) → ... → track Tn(2m)
→ track Tn−1(m+1) → track Tn−1(m+3) → ... → track Tn−1(2m)

Further, although the high-speed reproduction is realized by skipping the tracks or the disks in the above-mentioned operation, since the reproduction head is separated from the recording head, it can be realized by reducing the waiting time during the reproducing operation.

This high-speed reproduction realizes the interruptible television according to the first operation mode described for the first embodiment of the invention.

Further, when plural interruption periods are recorded and reproduced using the above-mentioned recording and reproduction device, the multiple interruption according to the second operation mode described for the first embodiment is realized.

Further, the pause reproduction is performed as follows. The reproduction head is moved to and stopped at a desired track to reproduce the recorded video signal on the track repeatedly. Since the video signal is recorded by one frame or one field for each track, a still picture is displayed by this reproduction.

This pause reproduction realizes the still-picture reproduction during interruption according to the first operation mode described for the first embodiment of the invention.

The reverse reproduction is performed by reproducing every second track using the reproduction head, in the reverse order to the recording order by the recording head. In this case, the reproduced image moves reversely to the recorded image.

The frame-to-frame operation is performed as follows. The reproduction head is stopped on a track for a prescribed period of time to reproduce a video image on this track during the period. Then the reproduction head is moved to a track on which a frame next to the frame of the track that has just been reproduced is recorded, and a video image on the track is reproduced during a prescribed period.

Alternatively, after the standstill reproduction on the same track, the reproduction head may be moved to a track on which a frame, which is several frames away from the frame of the track that has just been reproduced, is recorded. If this case, the above-mentioned stroboscopic reproduction is realized.

During the reproduction, the above-mentioned recording operation by the first recording heads 171a to 17ma is performed.

As described above, even when a plurality of magnetic disks are used, unnecessary movements of the recording and reproduction heads are avoided, whereby unwanted noise and frame skip are avoided.

(II) Next, the recording and reproduction operation using m double-side recording magnetic disks each having n tracks will be described.

FIGS. 52 to 66 are schematic diagrams each illustrating the relationship (correspondence) between the track numbers on the magnetic disks 141, ..., 14m of the double-side recording HDD unit 20 and the loop addresses on the ring buffer implemented by the HDD unit.

A description is given of the recording and reproduction operation according to the fifth embodiment using FIGS. 33, 52 to 66.

Initially, the recording operation will be described.

Each recording head records data on the upper recording surface of each magnetic disk (141, . . . , 14*m*), for every second track, while moving from the outermost circumference toward the innermost circumference. Thereafter, each recording head records data on the upper recording surface of each magnetic disk, for every second track, while moving from the innermost circumference toward the outermost circumference.

To be specific, according to a control signal from the recording head position control unit 23*b*, the recording head drive mechanism 21 drives the first recording heads 171*a*, 172*a*, . . . , 17*ma* and the second recording heads 171*b*, 172*b*, . . . , 17*mb*, for the magnetic disks 141, . . . , 14*m*, as follows.

When the first recording heads 171*a*, . . . , 17*ma* are positioned on the outermost tracks T1 on the respective magnetic disks 141, . . . , 14*m*, the recording operation is performed in the following manner.

Figure 52:
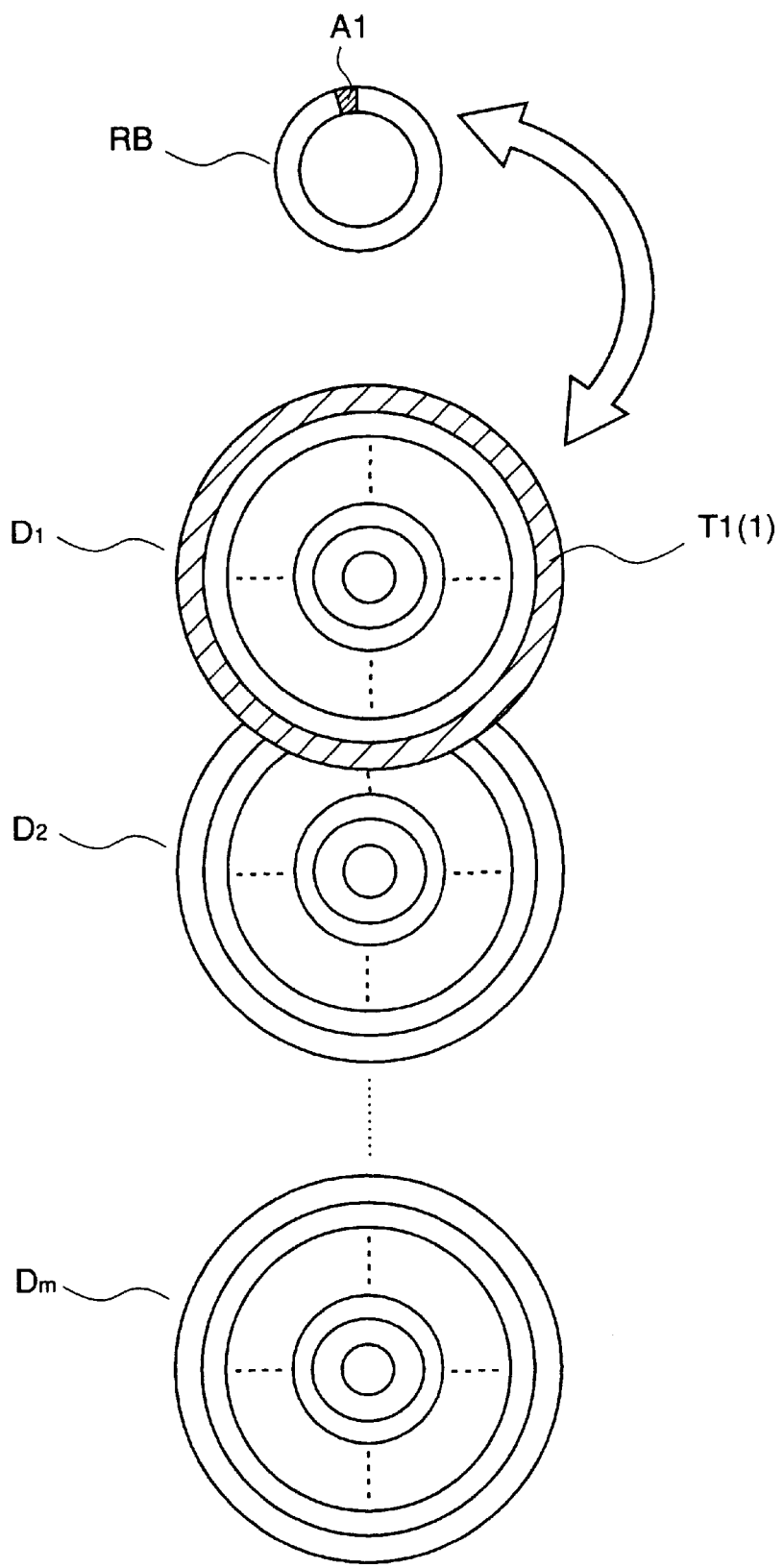
FIGS. 52 to 66 are diagrams illustrating the relationship between track numbers on double-side recording magnetic disks and loop addresses on a ring buffer, in the recording and reproduction device according to the fifth embodiment of the invention.
Figure 53:
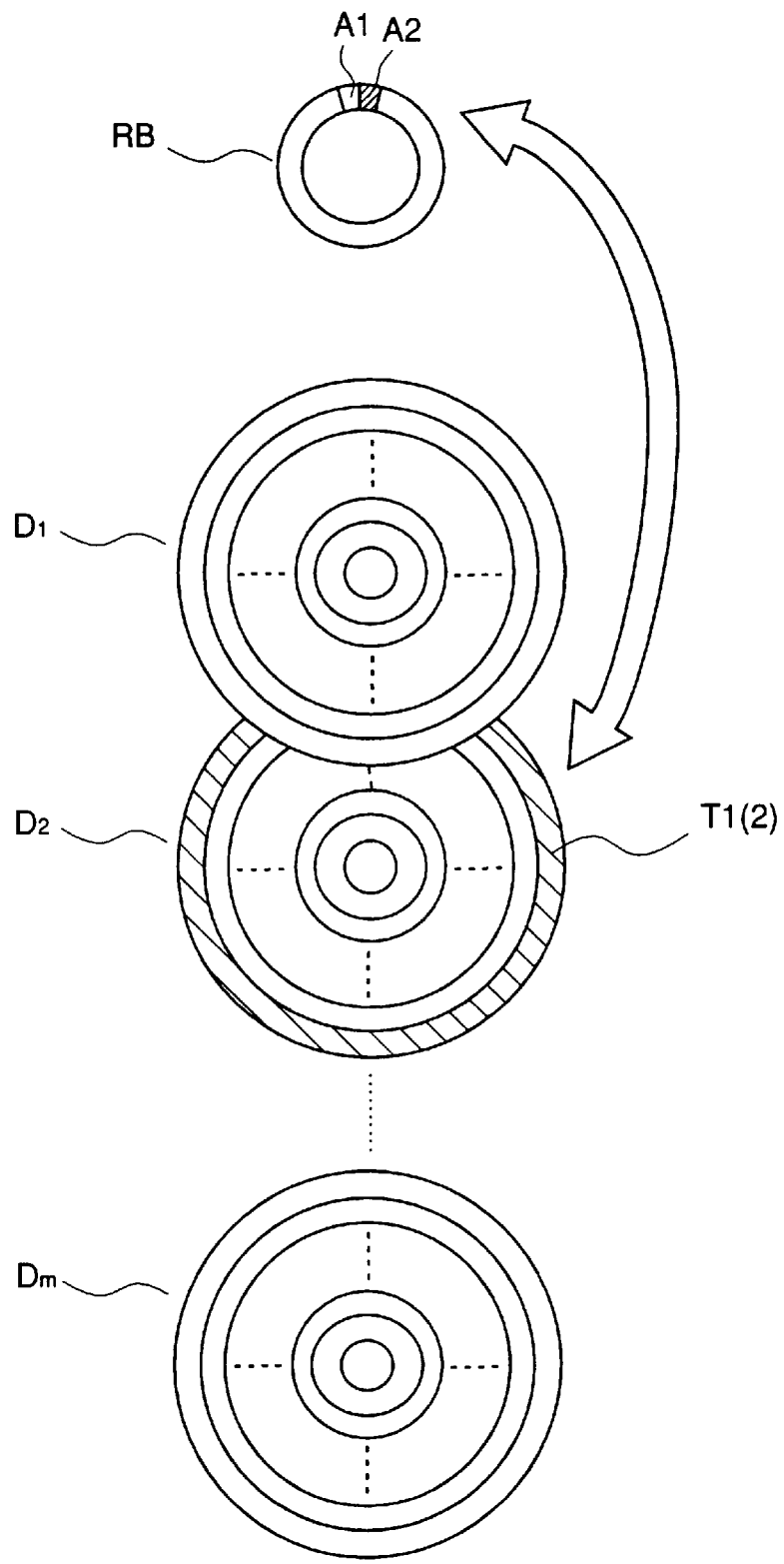
Figure 54:
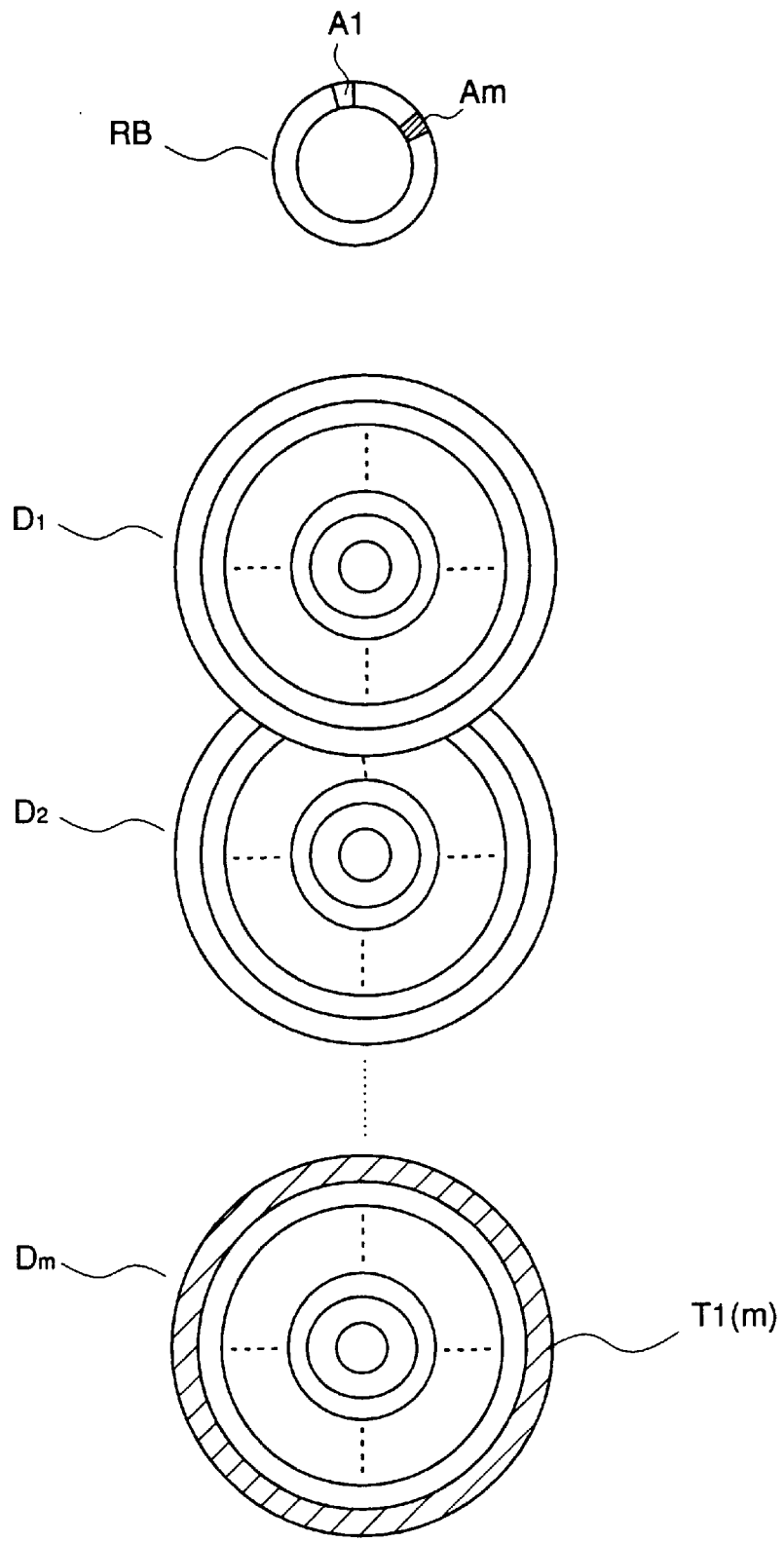

Initially, as shown in FIG. 52, when the address of the ring buffer is A1, the first recording head 171*a* records data on the outermost track T1(1) of the first magnetic disk 141. When the address of the ring buffer advances from A1 to A2, as shown in FIG. 53, the second recording head 172*a* records data on the outermost track T1(1) of the second magnetic disk 142. The recording operation is successively performed in this way until the address of the ring buffer reaches Am by one-by-one advance from A1 and data is recorded on the outermost track T1(1) of the m-th magnetic disk 14*m* by the m-th recording head 17*ma*.

Figure 55:
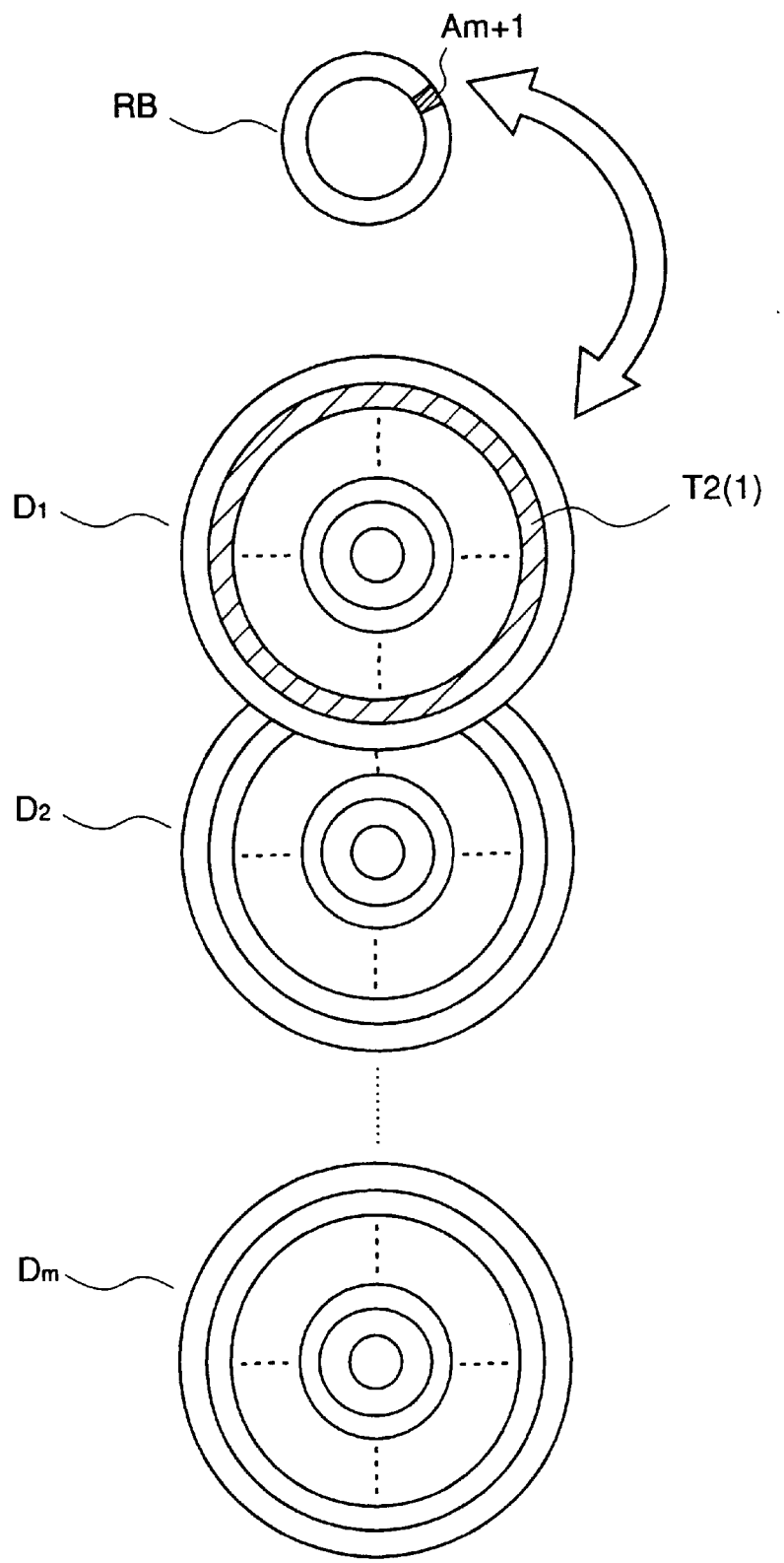
Figure 56:
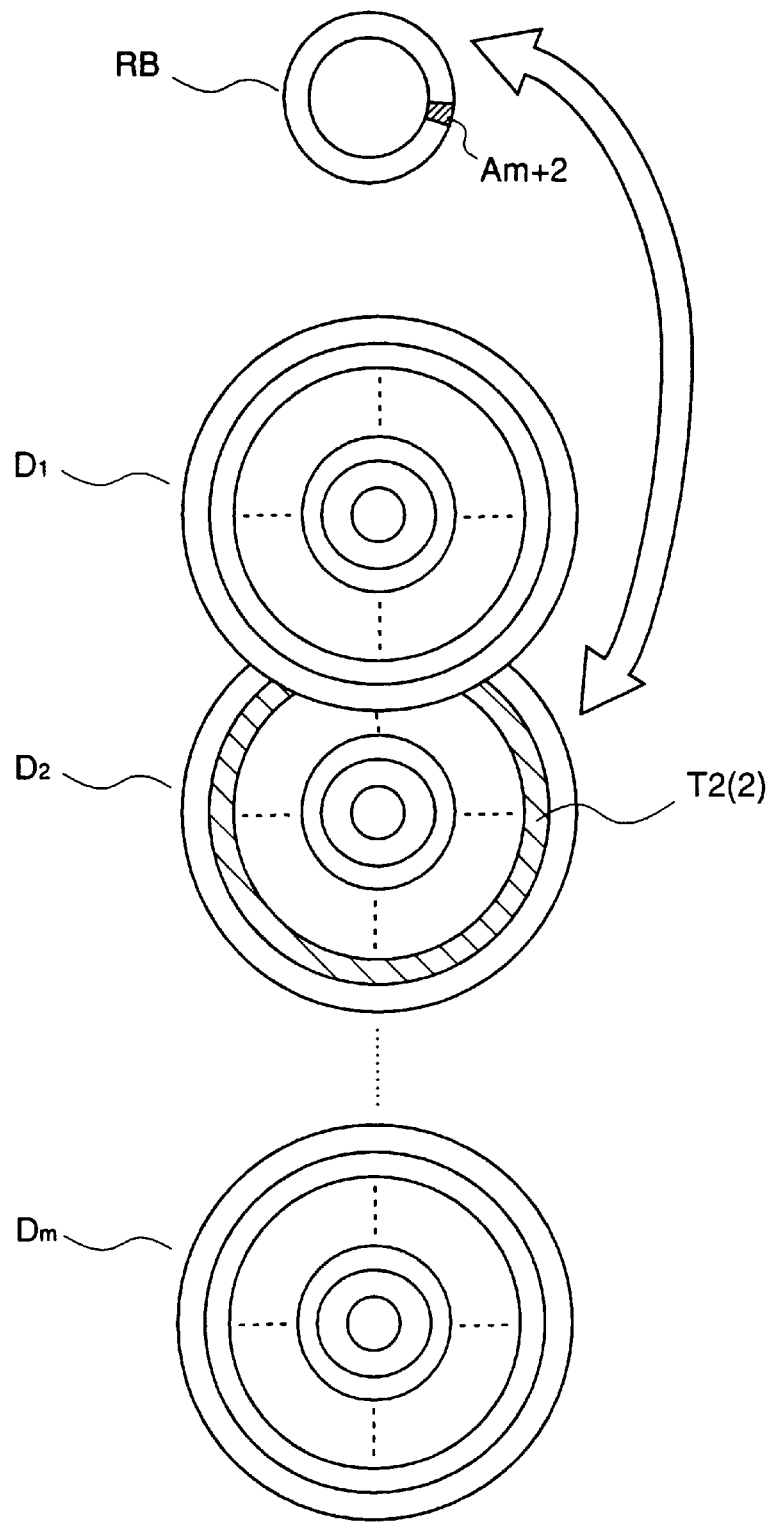
Figure 57:
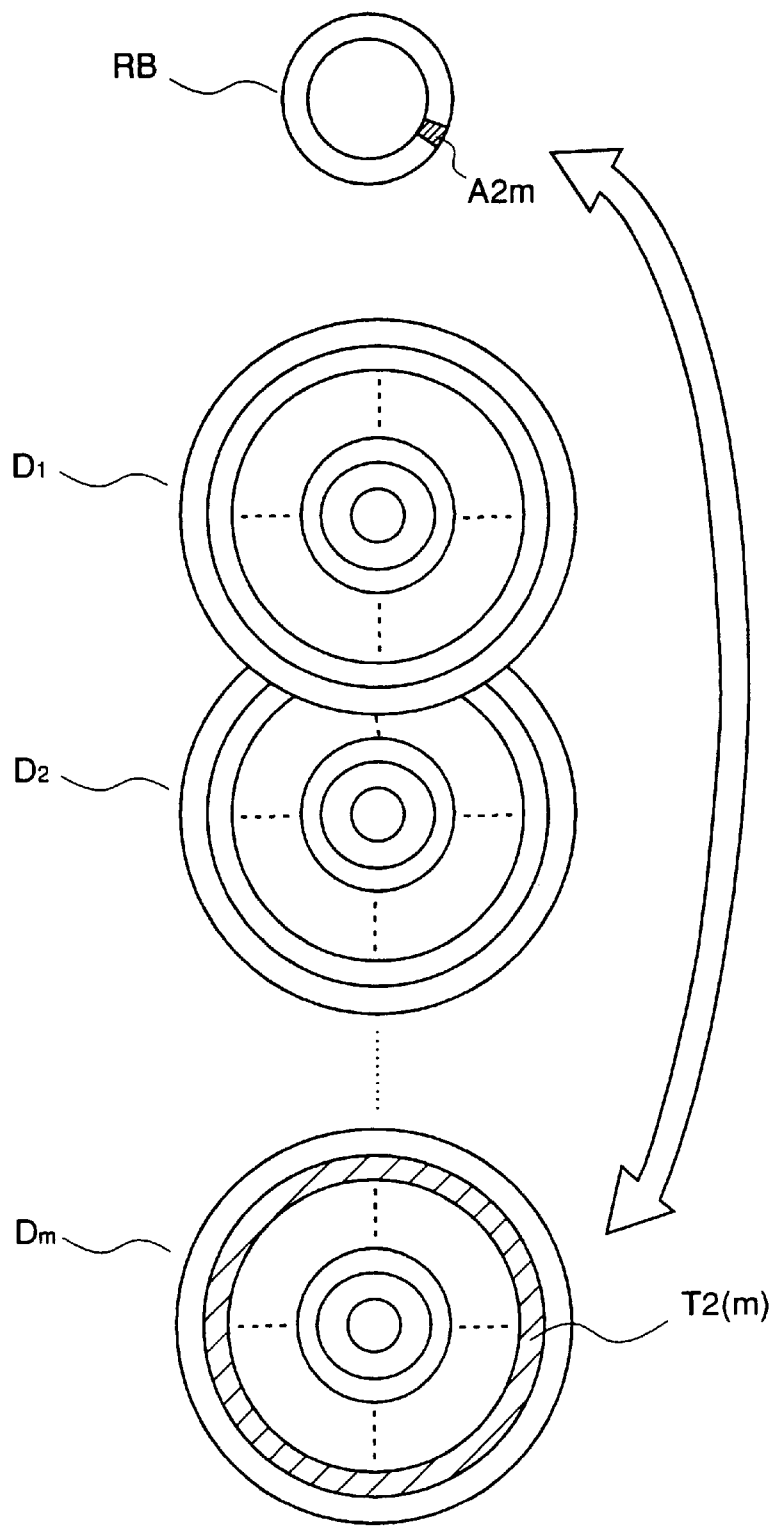

Next, when the address of the ring buffer advances from Am to Am+1, the first recording heads 171*a*, . . . , 17*ma* move from the outermost tracks T1 on the respective disks 141, . . . , 14*m*, by one track, toward the inner circumferences of the disks to reach tracks T2 on the respective disks. Thereafter, as shown in FIGS. 55 to 57, until the address of the ring buffer reaches A2m by one-by-one advance from Am+1, the above-mentioned recording operation is performed.

That is, the recording order by the first recording heads 171*a*, . . . , 17*ma* will be as follows: track T2 on the first disk 141, track T2 on the second disk 142, track T2 on the m-th disk 14*m*.

Figure 58:
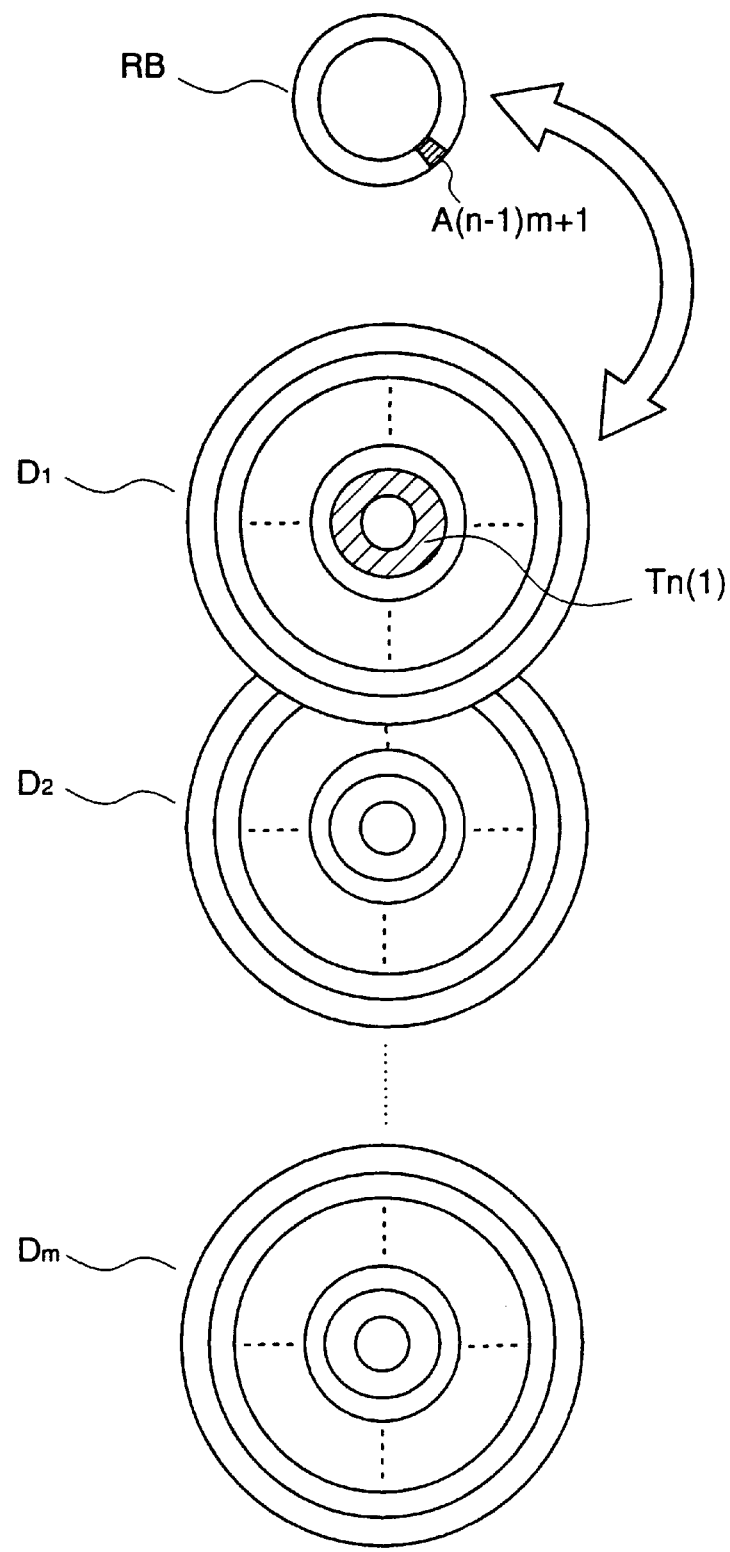
Figure 59:
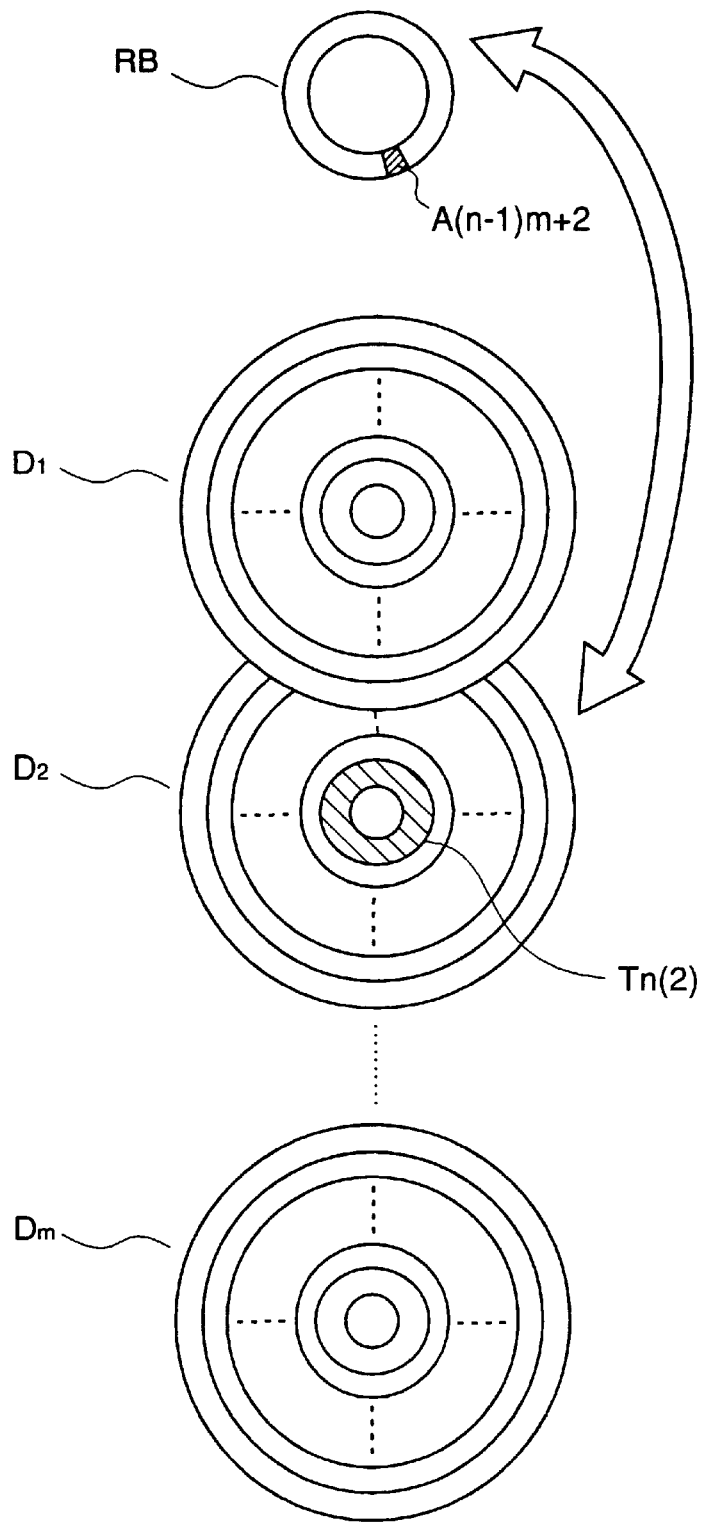
Figure 60:
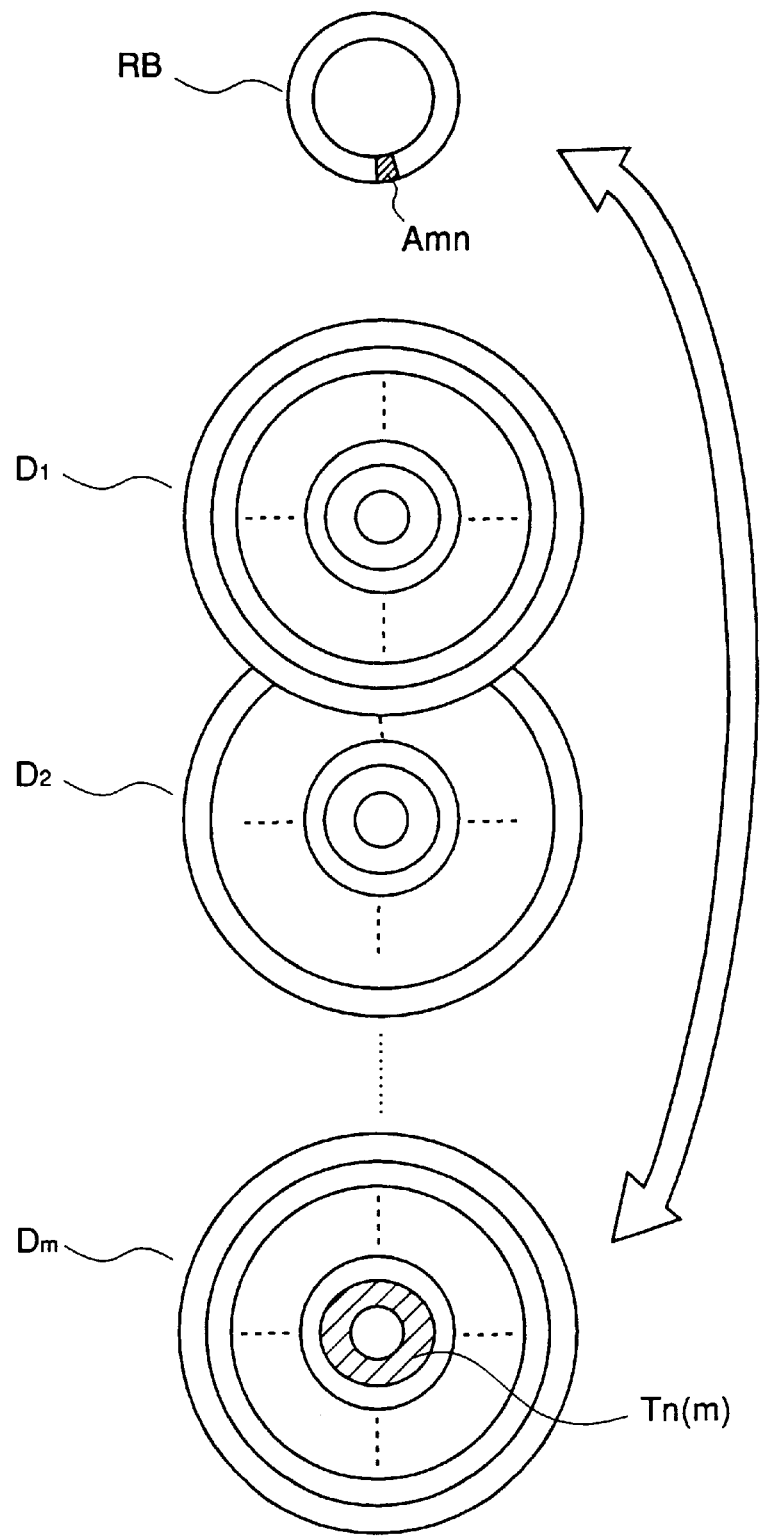

While repeating the above-mentioned movement of the recording heads and recording operation, the address of the ring buffer advances from A2m+1 one by one and, when the address reaches Am(n−1)+1—Amn as shown in FIGS. 58 to 60, recording of data on the innermost tracks Tn(1) to Tn(m) of the first to m-th magnetic disks is completed. Thereafter, recording is performed for the tracks on the rear surfaces of the respective magnetic disks 141, . . . , 14*m* while moving the respective reading heads from the inner circumferences to the outer circumferences of the respective disks.

Figure 61:
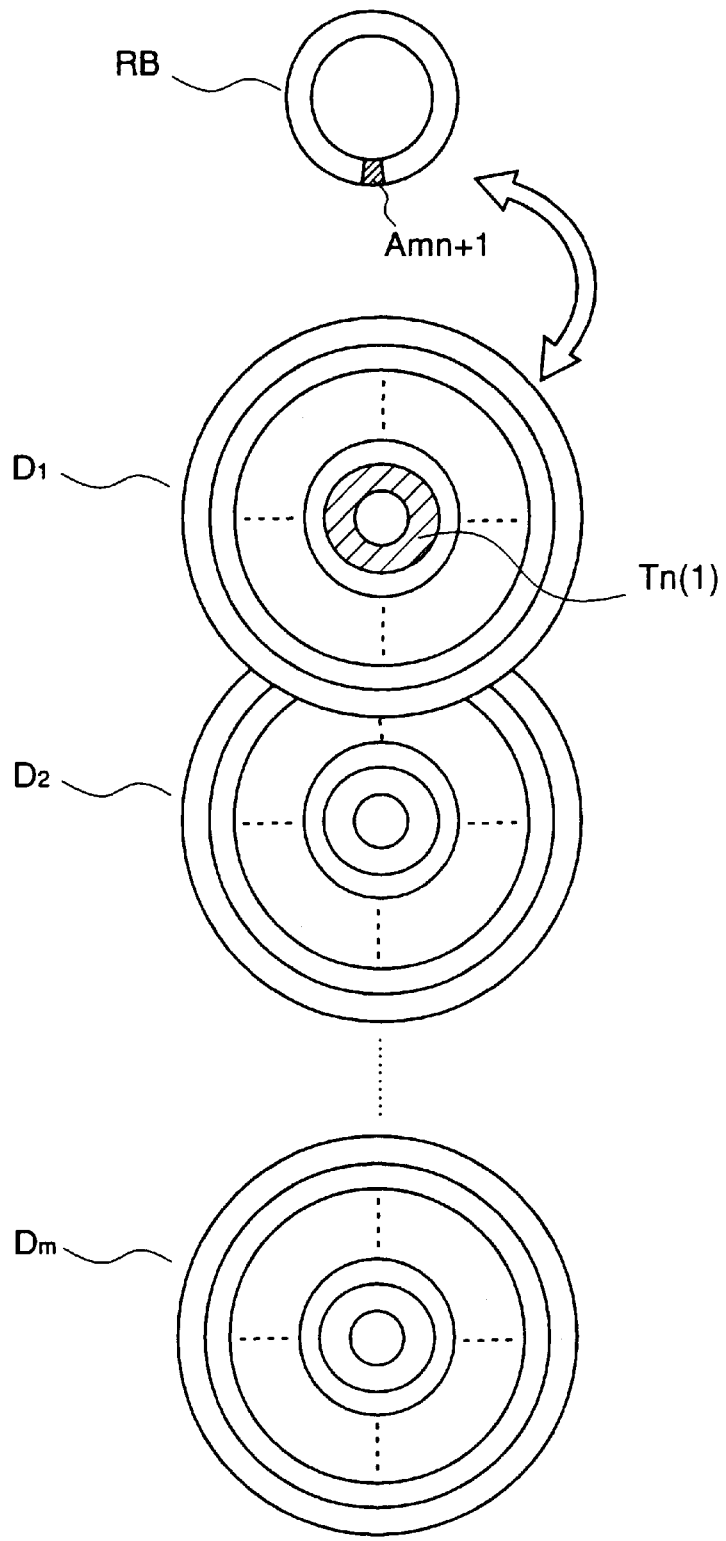
Figure 62:
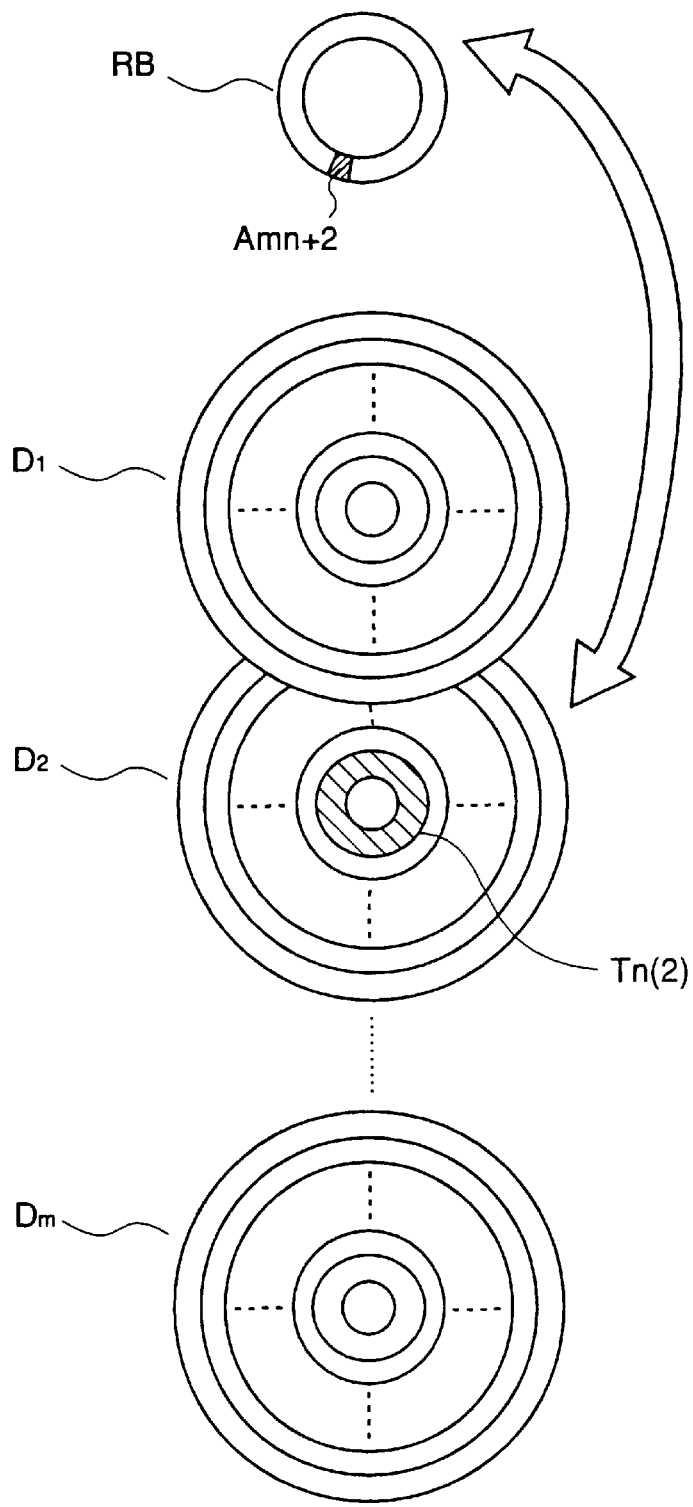
Figure 63:
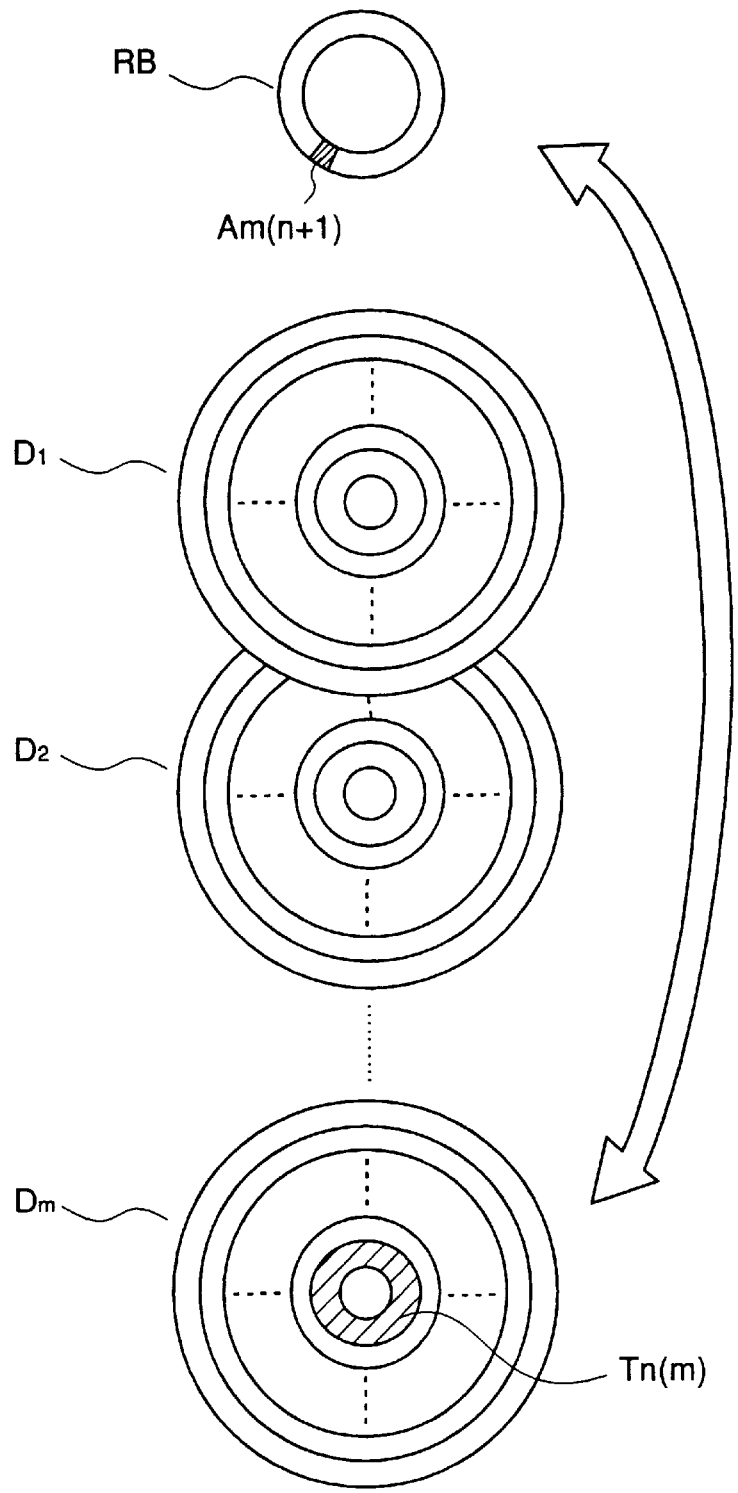

That is, as shown in FIGS. 61 to 63, when the address of the ring buffer reaches Am(n+1) by one-by-one advance from Amn+1, recording is performed for the innermost tracks Tn on the magnetic disks 141, . . . , 14*m*, in the order as follows: track Tn on the first disk 141, track Tn on the second disk 142, . . . , track Tn on the m-th disk 14*m*.

Figure 64:
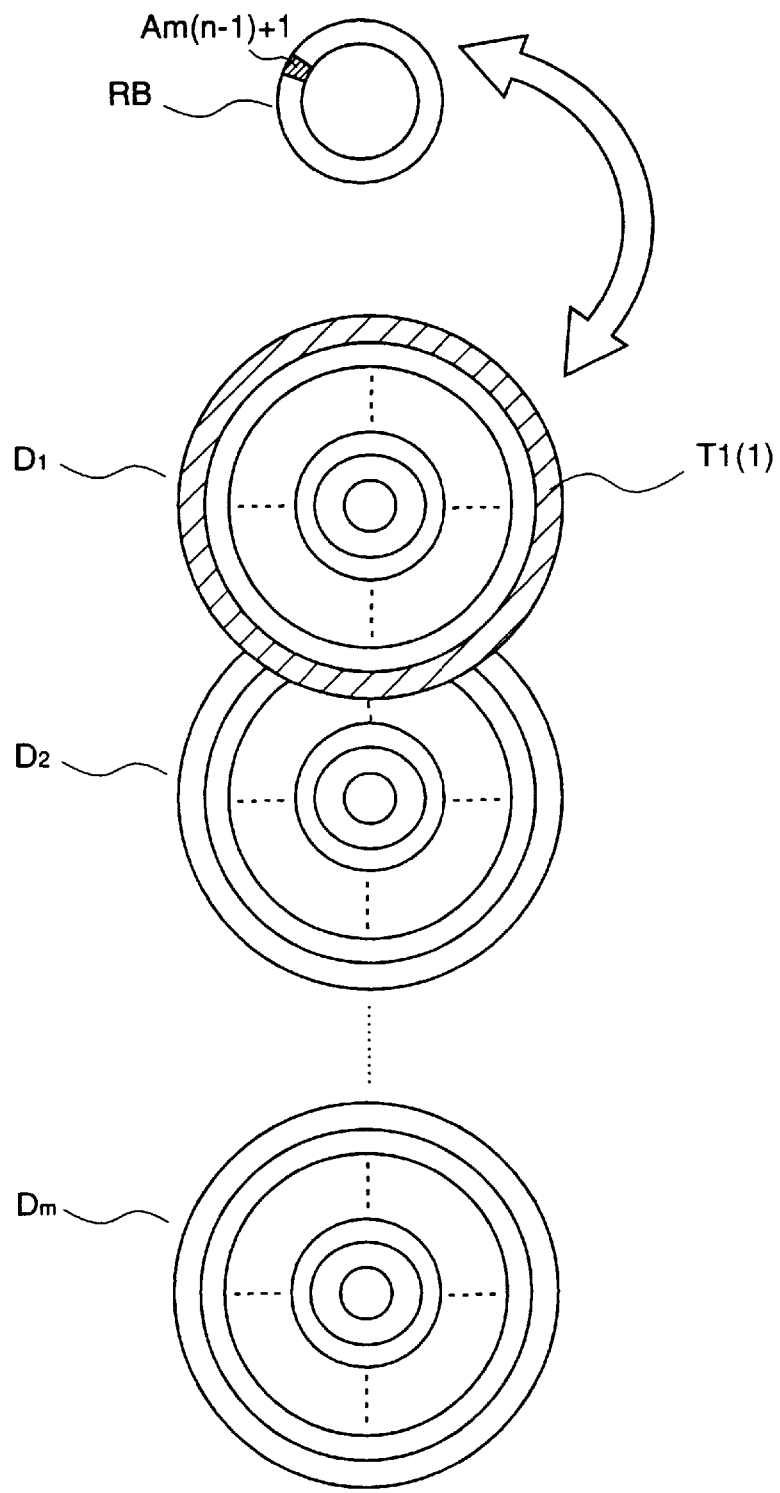
Figure 65:
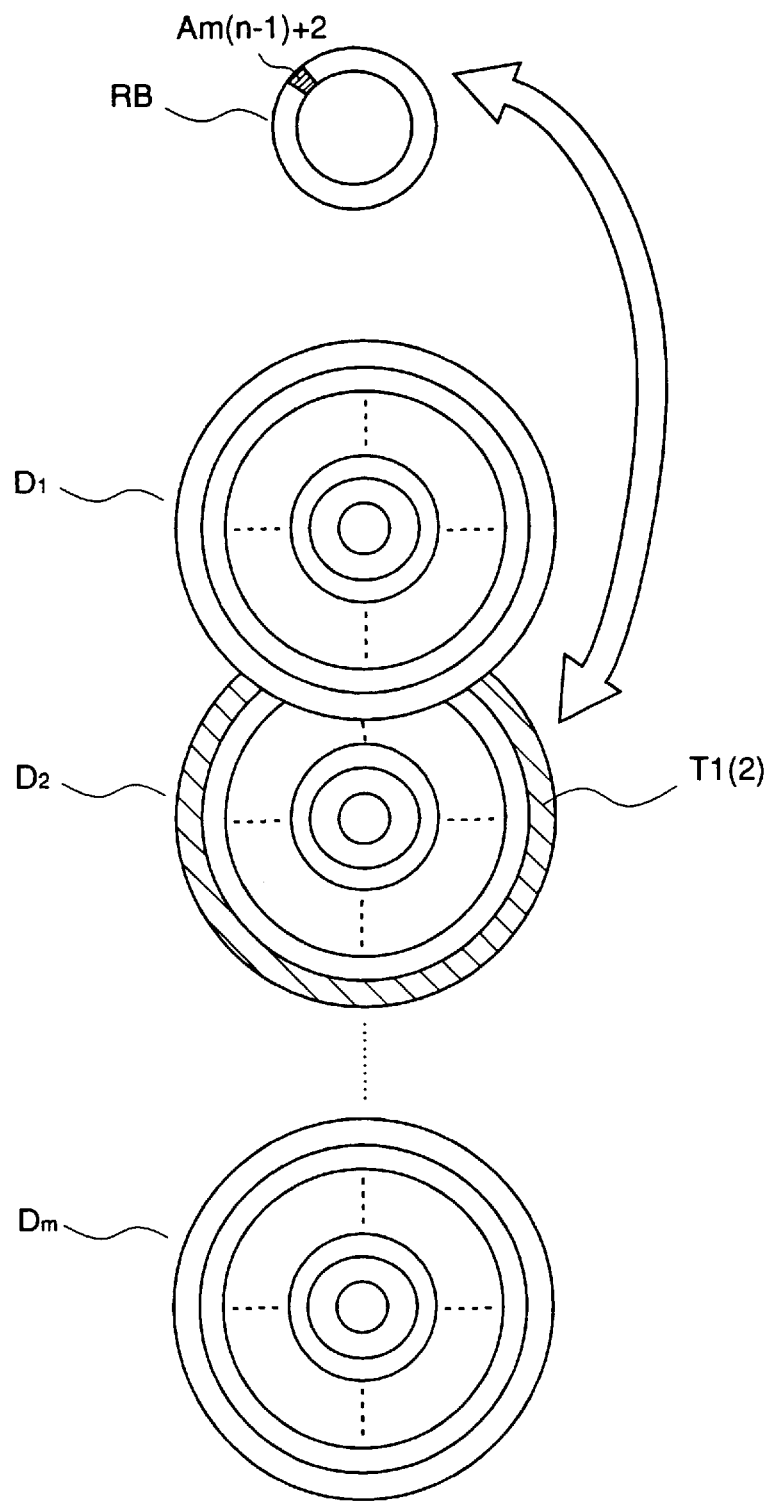
Figure 66:
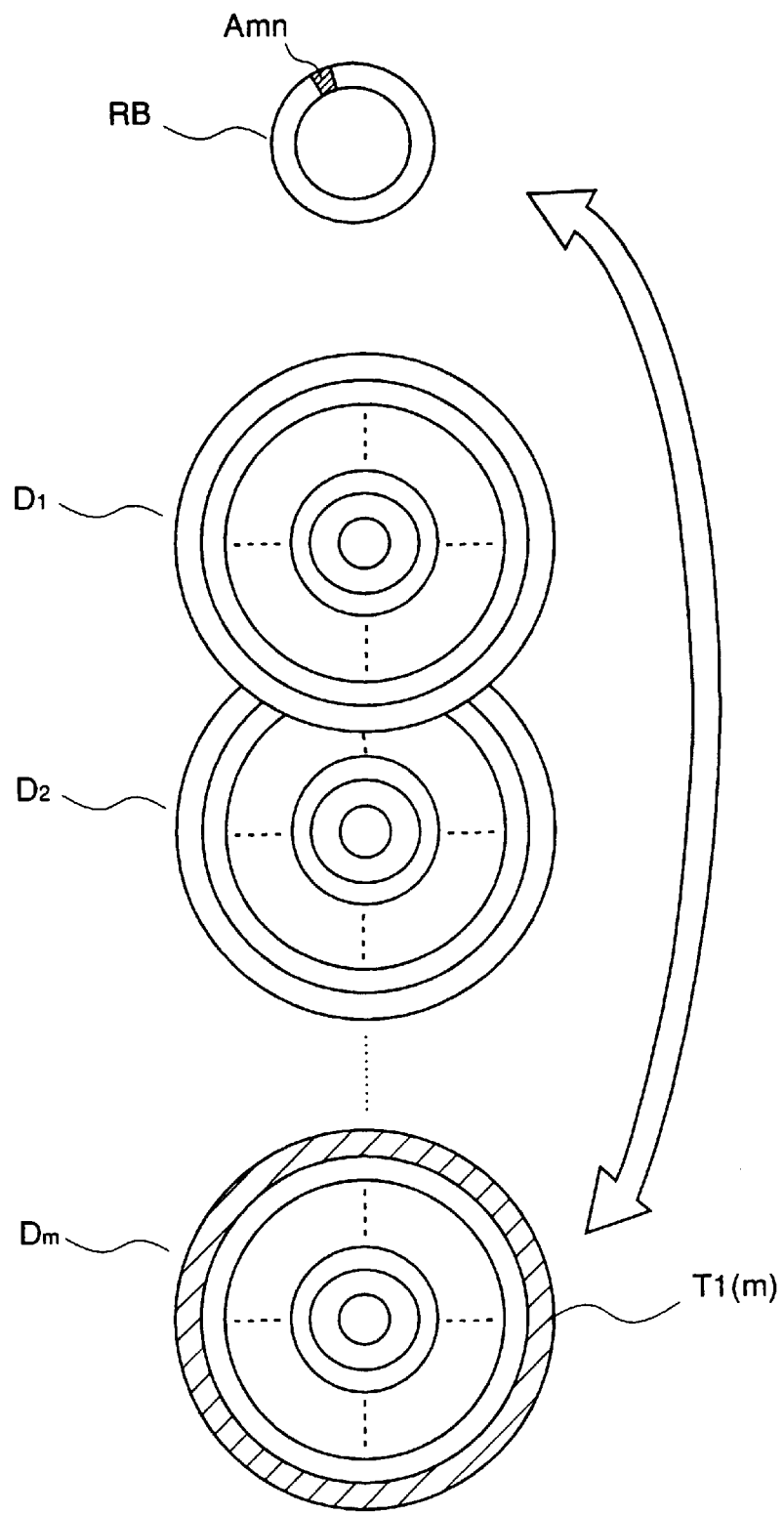

Thereafter, recording is performed for the respective magnetic disks while moving the recording heads toward the outer circumferences of the disks in the same order as mentioned above. As shown in FIGS. 64 to 66, when recording of the outermost tracks T1(1) to T1(m) on the first to m-th magnetic disks is completed, the recording operation for the m magnetic disks makes a round.

When the above-mentioned recording operation is summarized, the recording head position control is performed as follows. (1),(2),(m) indicate the recording heads used for the recording on m magnetic disks.

On the upper surfaces of the magnetic disks,

| | track T1(1) → track T1(2) → . . . → track T1(m) |
| → | track T2(1) → track T2(2) → . . . → track T2(m) |
| . . . → | track Tn(1) → track Tn(2) → . . . → track Tn(m) | and, subsequently, on the rear surfaces of the magnetic disks,

| → | track Tn(1) → track Tn(2) → . . . → track Tn(m) |
| → | track Tn−1(1) → track Tn−1(2) → . . . → track Tn−1(m) |
| . . . → | track T1(1) → track T1(2) → . . . → track T1(m) |

After the recording heads return to tracks T1 on the rear surfaces of the respective disks and the address of the ring buffer advances from A2mn to A1, the recording heads move to tracks T1 on the upper surfaces of the respective disks and, thereafter, the above-mentioned operation is repeated.

As a result of the repetition of the above-mentioned recording operation by the respective recording heads, on the m double-side recording magnetic disks, video signals which have been transmitted during a period from the present time back to a certain point of time in the past are recorded. With an increase in the number of the magnetic disks, the capacity of data can be increased.

As described above, even when the number of the magnetic disks increases, since each disk is provided with a pair of recording head and reproduction head, unnecessary movements of the recording and reproduction heads as in the conventional device are avoided. Therefore, unwanted noise and frame skip are avoided.

When 2m double-side recording magnetic disks are employed, the recording head position control is performed as follows:

| track T1(1) → track T1(2) → . . . → track T1(m) |
| → track T2(1) → track T2(2) → . . . → track T2(m) |
| → track Tn(m+1) → track Tn(m+2) → . . . → track Tn(2m) |
| → track Tn−1(m+1) → track Tn−1(m+2) → . . . → track Tn−1(2m) |

Subsequently, the same recording operation is performed for the rear surfaces of the respective disks.

In this way, since the reproduction is performed for the disks 1 to m from the outer circumferences toward the inner circumferences, and for the disks M+1 to 2m from the inner circumferences toward the outer circumferences, even though the number of the magnetic disks increases, unnecessary movements of the recording heads as in the conventional device are avoided. Therefore, unwanted frame skip of recorded data is avoided.

In this case, the number of the magnetic disks is not necessarily be even.

Hereinafter, the reproducing operation will be described.

The reproduction modes, i.e., playback reproduction, high-speed reproduction, pause reproduction, reverse reproduction, or frame-to-frame reproduction, are fundamentally identical to those mentioned above except that a plurality of magnetic disks are used.

In the playback reproduction, data is successively reproduced from the respective magnetic disks in the following order:

On the upper surfaces of the respective disks,

```
         track T1(1) → track T1(2) → ... → track T1(m)
      →  track T2(1) → track T2(2) → ... → track T2(m)
  ... →  track Tn(1) → track Tn(2) → ... → track Tn(m)
``` and, subsequently, form the lower surfaces of the respective disks

```
      →  track Tn(1)   → track Tn(2)   → ... → track Tn(m)
      →  track Tn-1(1) → track Tn-1(2) → ... → track Tn-1(m)
  ... →  track T1(1)   → track T1(2)   → ... → track T1(m)
```

Thereby, data recorded on the tracks of the magnetic disks are reproduced and displayed on the display unit.

When 2m double-side recording magnetic disks are employed, data is successively reproduced from the upper surfaces of the disks as follows:

```
  track T1(1)     → track T1(2)     → ... → track T1(m)
→ track T2(1)     → track T2(2)     → ... → track T2(m)
→ track Tn(m+1)   → track Tn(m+2)   → ... → track Tn(2m)
→ track Tn-1(m+1) → track Tn-1(m+2) → ... → track Tn-1(2m)
```

Subsequently, the same reproducing operation is performed for the rear surfaces of the respective disks.

As described above, since data on plural magnetic disks are successively reproduced from the outer circumferences toward the inner circumferences for the disks 1 to m and, thereafter, from the inner circumferences toward the outer circumferences for the disks m+1 to 2m, the above-mentioned playback reproduction is realized.

In this case, the number of the magnetic disks is not necessarily be even.

In the high-speed reproduction, data is reproduced for every second magnetic disk as shown in the following.

On the upper surfaces of the respective disks,

```
         track T1(1) → track T1(3) → ... → track T1(m)
      →  track T2(1) → track T2(3) → ... → track T2(m)
  ... →  track Tn(1) → track Tn(3) → ... → track Tn(m)
``` and, subsequently, on the lower surfaces of the respective disks,

```
      →  track Tn(1)   → track Tn(3)   → ... → track Tn(m)
      →  track Tn-1(1) → track Tn-1(3) → ... → track Tn-1(m)
  ... '   track T1(1)   → track T1(3)   → ... → track T1(m)
```

When 2m double-side recording magnetic disks are employed, data is successively reproduced as follows.

```
     track T1(1)     → track T1(3)     → ... → track T1(m)
  →  track T2(1)     → track T2(3)     → ... → track T2(m)
  →  track Tn(m+1)   → track Tn(m+3)   → ... → track Tn(2m)
  →  track Tn-1(m+1) → track Tn-1(m+3) → ... ' track Tn-1(2m)
```

Subsequently, the same reproducing operation is performed for the rear surfaces of the respective disks.

As described above, since data on plural magnetic disks are successively reproduced for every second disk, from the outer circumferences toward the inner circumferences for the disks 1 to m and, thereafter, from the inner circumferences toward the outer circumferences for the disks m+1 to 2m, the above-mentioned high-spaced reproduction is realized.

In this case, the number of the magnetic disks is not necessarily be even.

Although the high-speed reproduction is realized by skipping this tracks or the disks in the above-mentioned operation, if the waiting time of the reproduction head can be reduced, it is realized by reducing the waiting time.

This high-speed reproduction realizes the interruptible television according to the first operation mode described for the first embodiment of the invention.

Further, when plural interruption periods are recorded and reproduced using the above-mentioned recording and reproduction device, the multiple interruption according to the second operation mode described for the first embodiment is realized.

Further, the pause reproduction is performed as follows. The reproduction head is moved to and stopped at a desired track to reproduce the recorded video signal on the track repeatedly. Since the video signal is recorded by one frame or one field for each track, a still picture is displayed by this reproduction.

This pause reproduction realizes the still-picture reproduction during interruption according to the first operation mode described for the first embodiment of the invention.

The reverse reproduction is performed by reproducing every second track using the reproduction head, in the reverse order to the recording order by the recording head. In this case, the reproduced image moves reversely to the recorded image.

The frame-to-frame operation is performed as follows. The reproduction head is stopped on a track for a prescribed period of time to reproduce a video image on this track during the period. Then the reproduction head is moved to a track on which a frame next to the frame of the track that has just been reproduced is recorded, and a video image on the track is reproduced during a prescribed period.

Alternatively, after the standstill reproduction on the same track, the reproduction head may be moved to a track on which a frame, which is several frames away from the frame of the track that has just been reproduced, is recorded. In this case, the Above-mentioned stroboscopic reproduction is realized.

During the reproduction, the above-mentioned recording operation by the first recording heads 171a to 17ma and the second recording heads 191a to 19ma is performed.

As described above, even when a plurality of magnetic disks are used, unnecessary movements of the recording and reproduction heads are avoided, whereby unwanted noise and frame skip are avoided.

[Embodiment 6]

Figure 67:
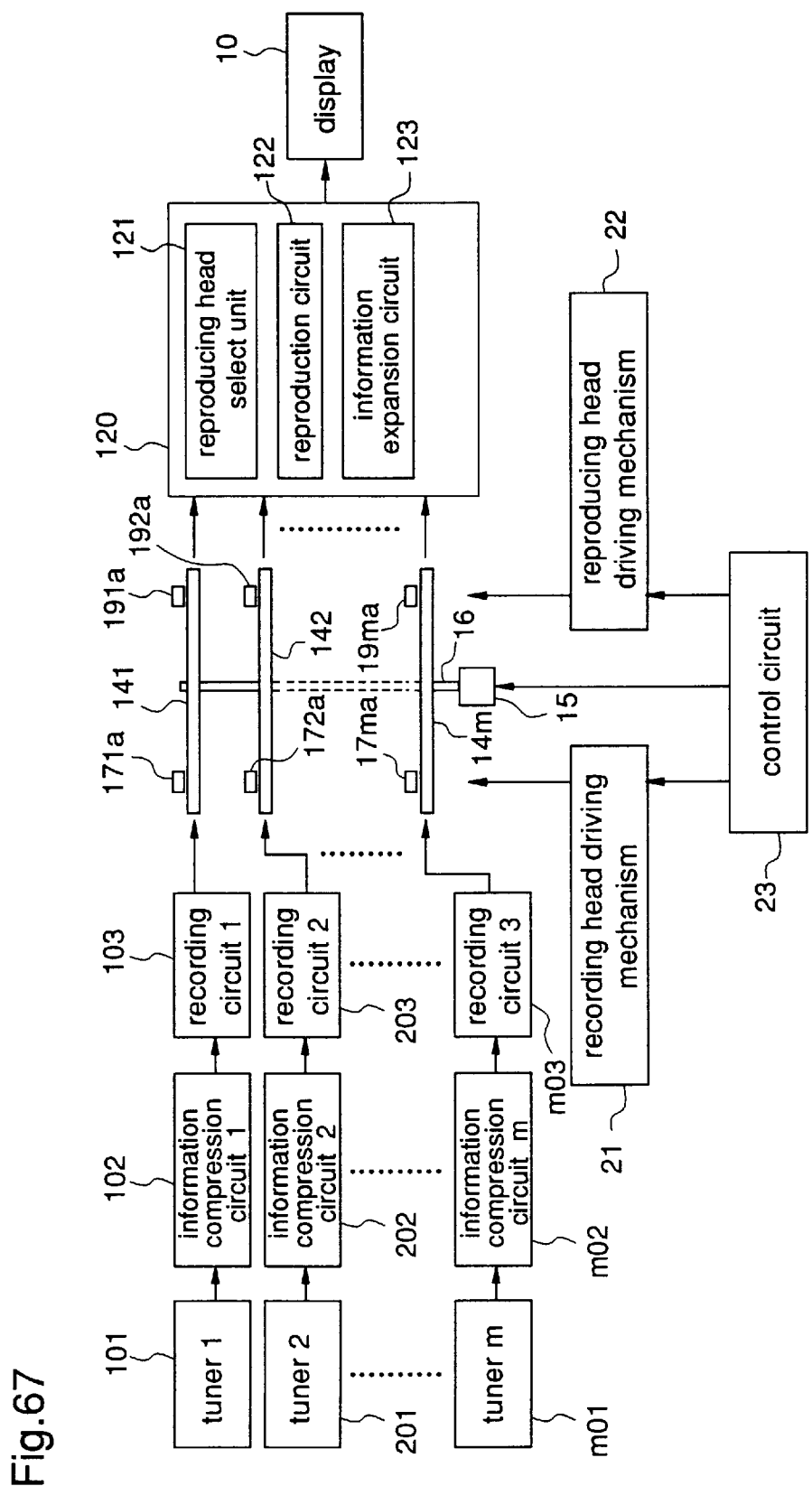
FIG. 67 is a block diagram illustrating a recording and reproduction device with playback function using a plurality of magnetic disks, according to a sixth embodiment of the present invention.
Figure 68:
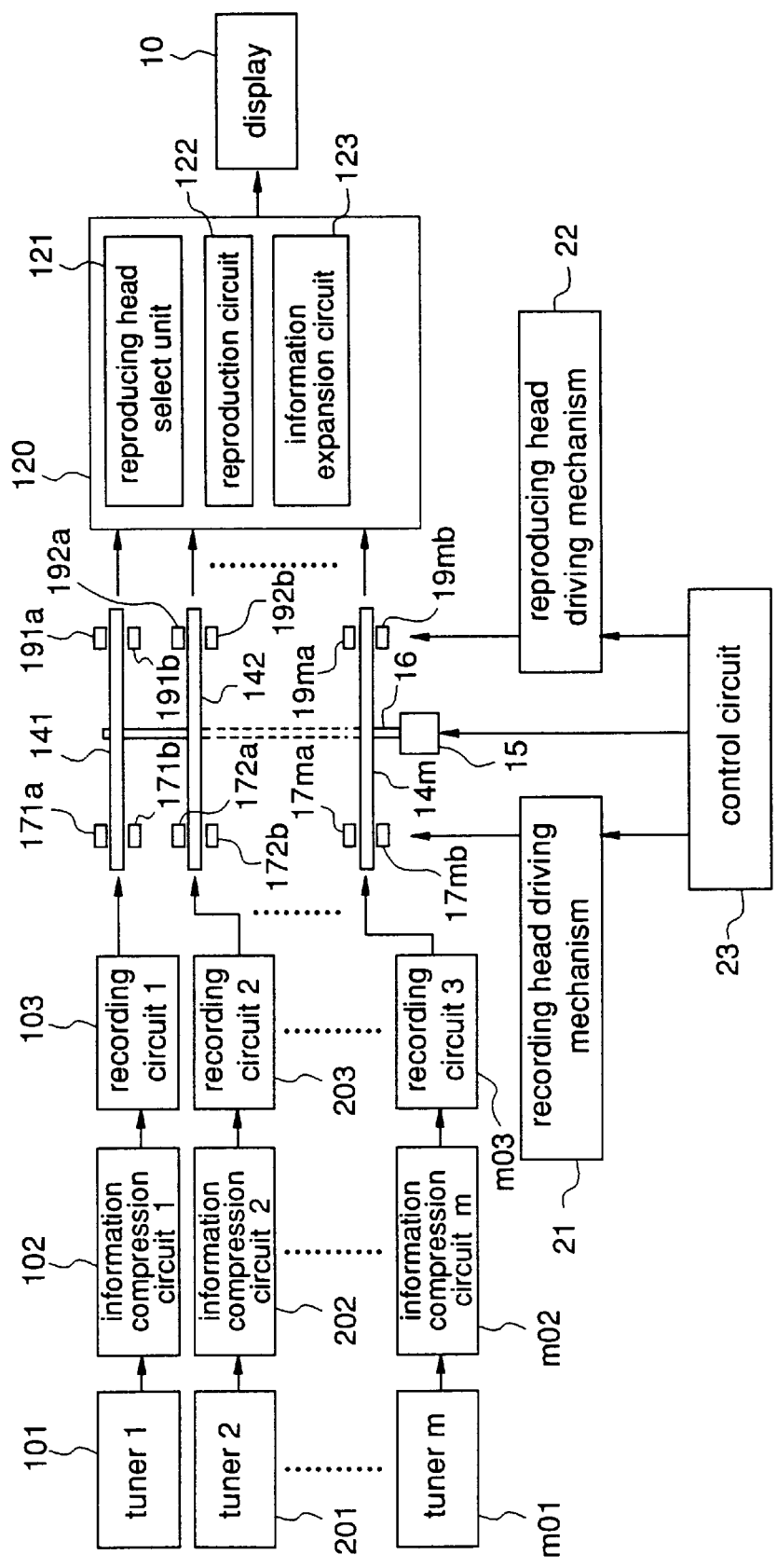
FIG. 68 is a block diagram illustrating a recording and reproduction device with playback function using a plurality of magnetic disks, according to the sixth embodiment of the present invention.

While in the fourth and fifth embodiments a single broadcasting signal is reproduced on the entire surface of the display, plural broadcasting signals of different channels can be reproduced. In this case, as shown in FIGS. 67 and 68, a tuner, an information compression circuit, and a recording circuit are prepared for each of m magnetic disks 141 to 14m. The structures of these elements are the same as those mentioned with respect to FIGS. 18 and 19.

In FIGS. 67 and 68, a tuner 101, an information compression circuit 102, and a recording circuit 103 are prepared for a first magnetic disk 141, a tuner 201, an information compression circuit 202, and a recording circuit 203 are prepared for a second magnetic disk 141, . . . , and a tuner m01, an information compression circuit m02, and a recording circuit m03 are prepared for a m-th magnetic disk 14m. A reproduction unit 120 is provided with a reproduction head selecting unit 121 for selecting a reproduction head according to a target magnetic disk, a reproduction circuit 122, and an information expansion circuit 123.

The recording operation on each magnetic disk is fundamentally identical to that in the case of using a single magnetic disk mentioned for the fourth embodiment, except the following points.

That is, in this sixth embodiment, in contrast with the fourth embodiment, broadcasting signals of different channels are simultaneously recorded on one surface or both surfaces of the respective magnetic disks 141 to 14m. Since the reproduction head is separated from the recording head, high-speed reproduction is realized.

More specifically, one of the plural tuners is used as a main tuner and, when a broadcast on the main tuner is extended, the content of this broadcast is recorded using one of the tuners other than the main tuner. When the extension of the broadcast has ended, the recorded content is reproduced at high speed. When this high-speed reproduction catches up with the on-air broadcast, the one-air broadcast is reproduced at normal speed. Thereby, the problem of overlapping in broadcast time can be solved.

Alternatively, one of signals from the plural tuners is reproduced on the display while signals from the remaining tuners are recorded on the magnetic disks, and one of the recorded signals is reproduced at high-speed. When this high-speed reproduction catches up with the on-air broadcast, the on-air broadcast is reproduced at normal speed. This recording and reproduction is performed at every cannel switching, whereby the user can see all the broadcasts throughout. That is, the above-mentioned zapping connection is realized.

During the reproduction, the above-mentioned recording operation by the first recording heads 171a to 17ma and the second recording heads 191a to 19ma is performed.

As described above, even when a plurality of magnetic disks are used, unnecessary movements of the recording and reproduction heads are avoided, whereby unwanted noise and frame skip are avoided.

Figure 69:
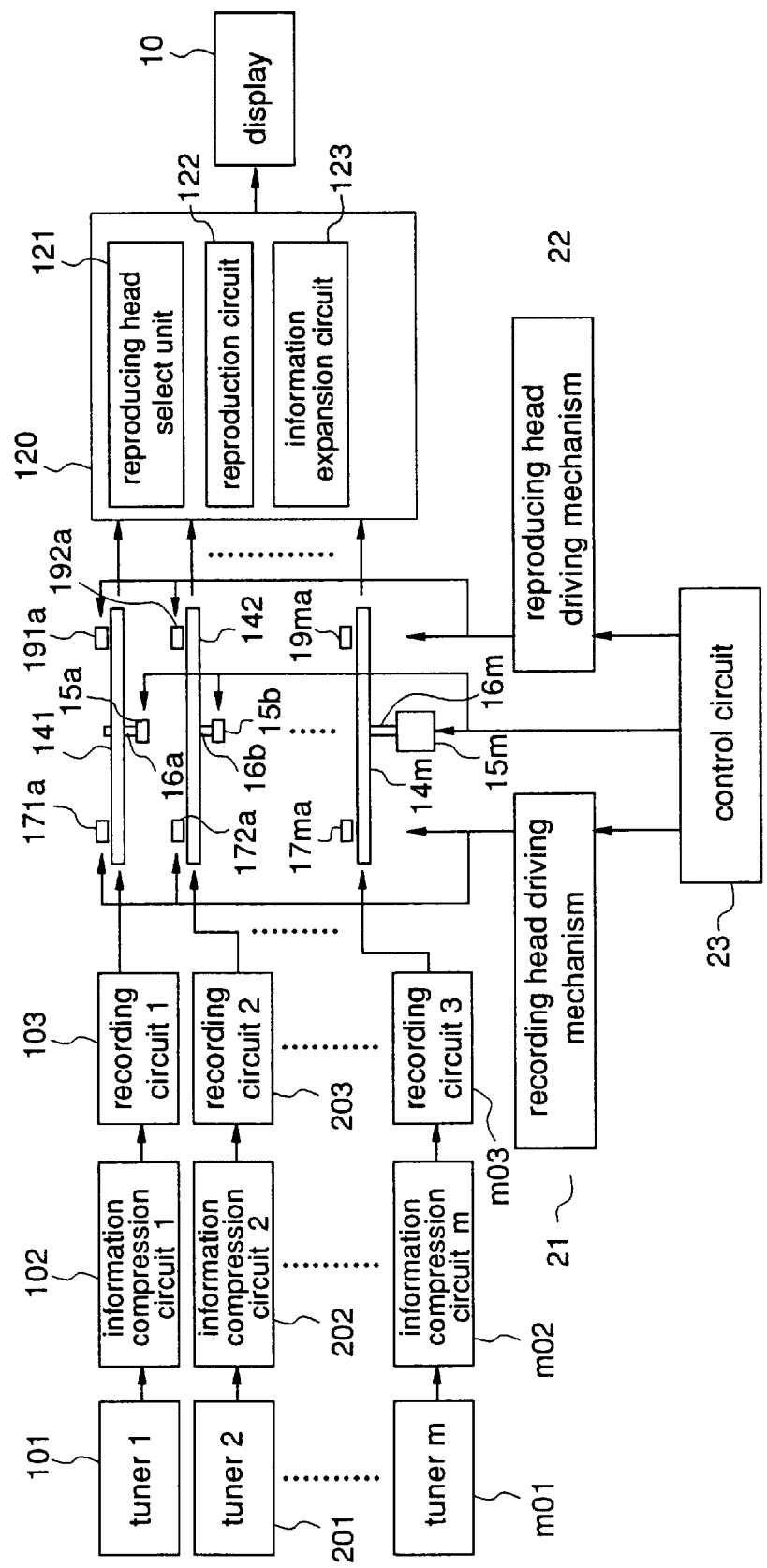
FIG. 69 is a block diagram illustrating a recording and reproduction device with playback function using a plurality of magnetic disks, according to the sixth embodiment of the present invention.
Figure 70:
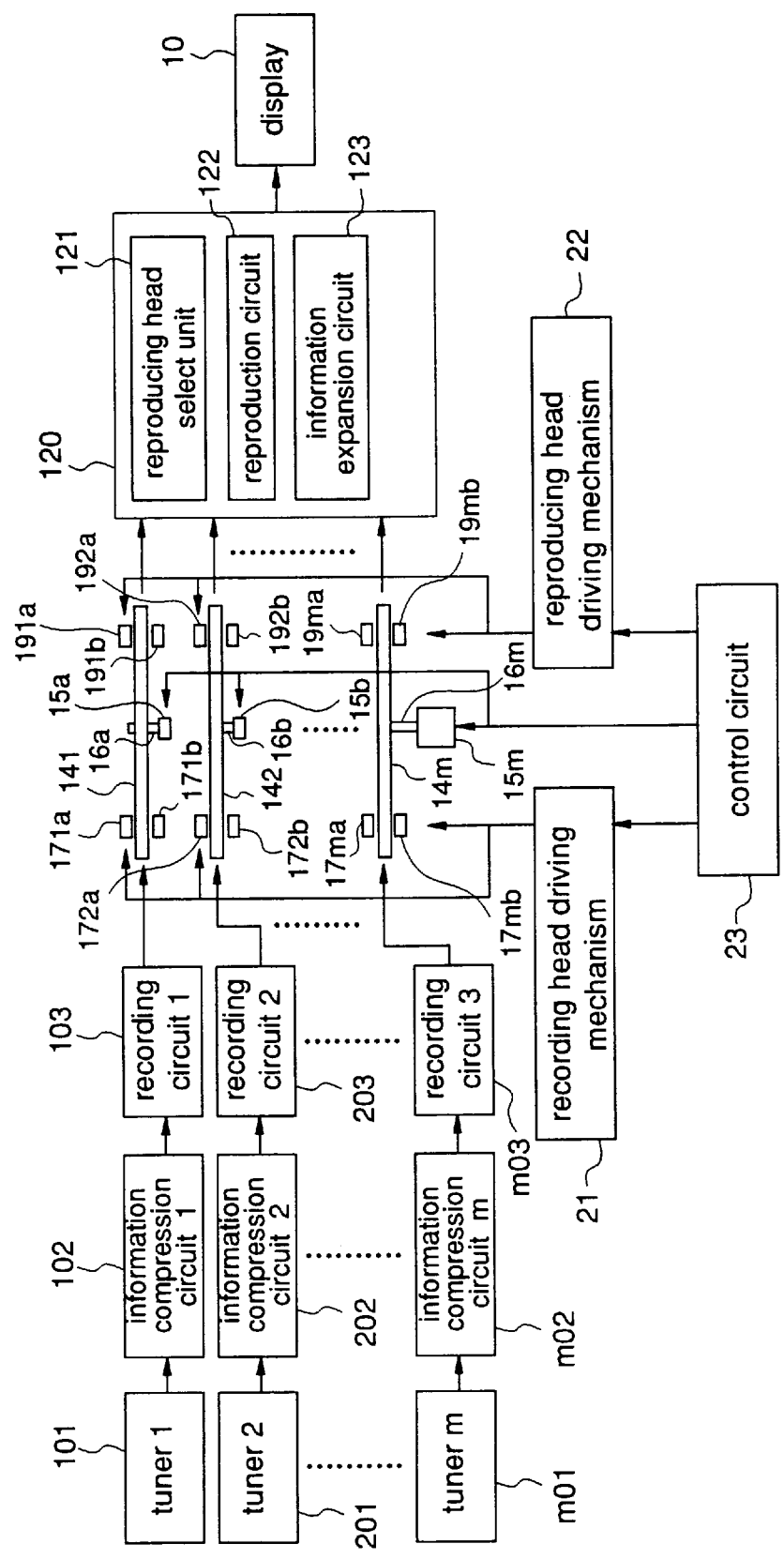
FIG. 70 is a block diagram illustrating a recording and reproduction device with playback function using a plurality of magnetic disks, according to the sixth embodiment of the present invention.

Further, as shown in FIGS. 69 and 70, each tuner may be provided with a single-side (or double-side) recording magnetic disk drive. In this case, since the position of the reproduction head can be controlled individually, it is possible to reproduce, simultaneously, plural signals on different channels recorded in different periods of time.

[Embodiment 7]

Figure 71:
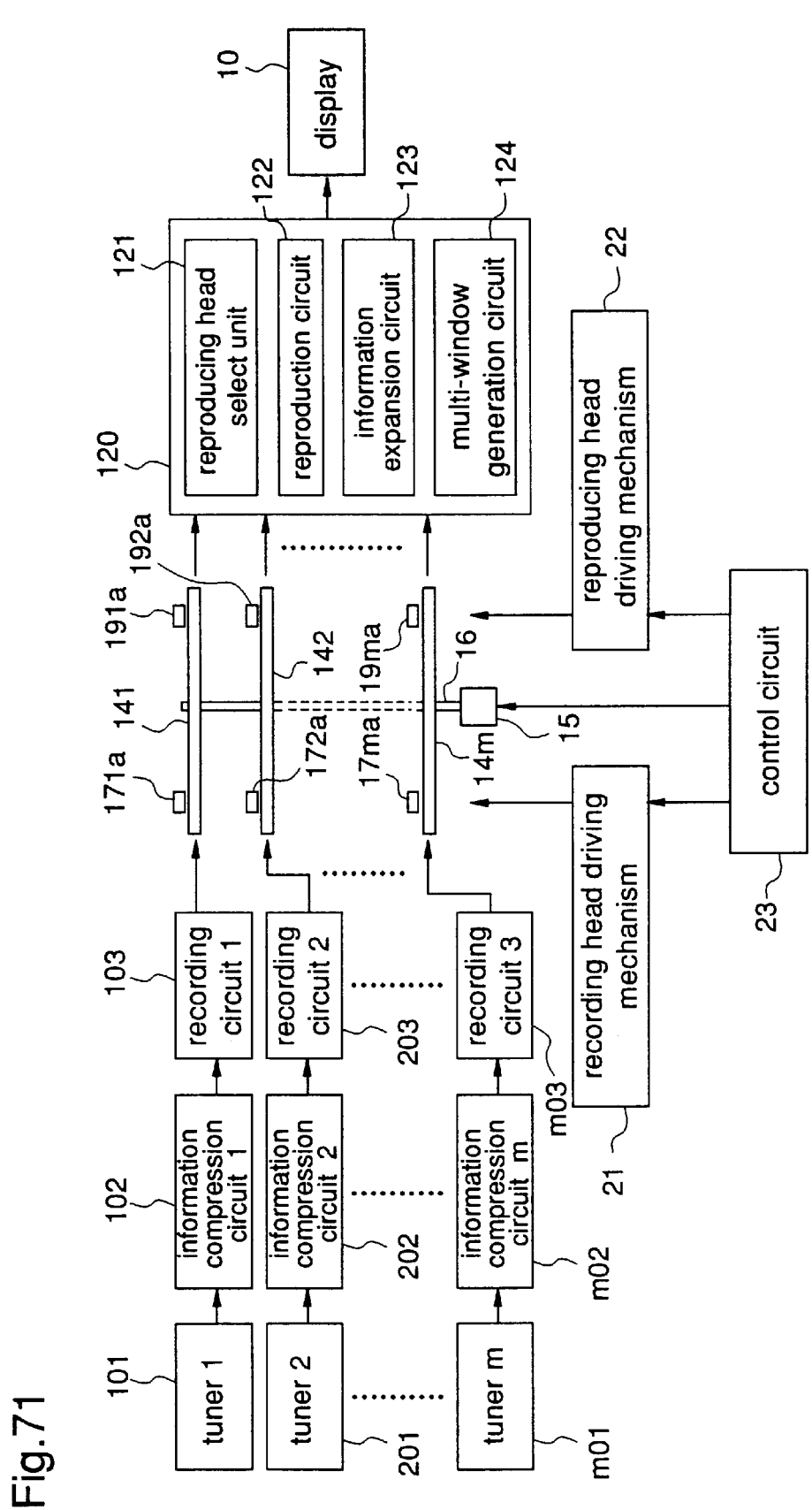
FIG. 71 is a block diagram illustrating a recording and reproduction device with playback function and capable of multi-window display, according to a seventh aspect of the present invention.
Figure 72:
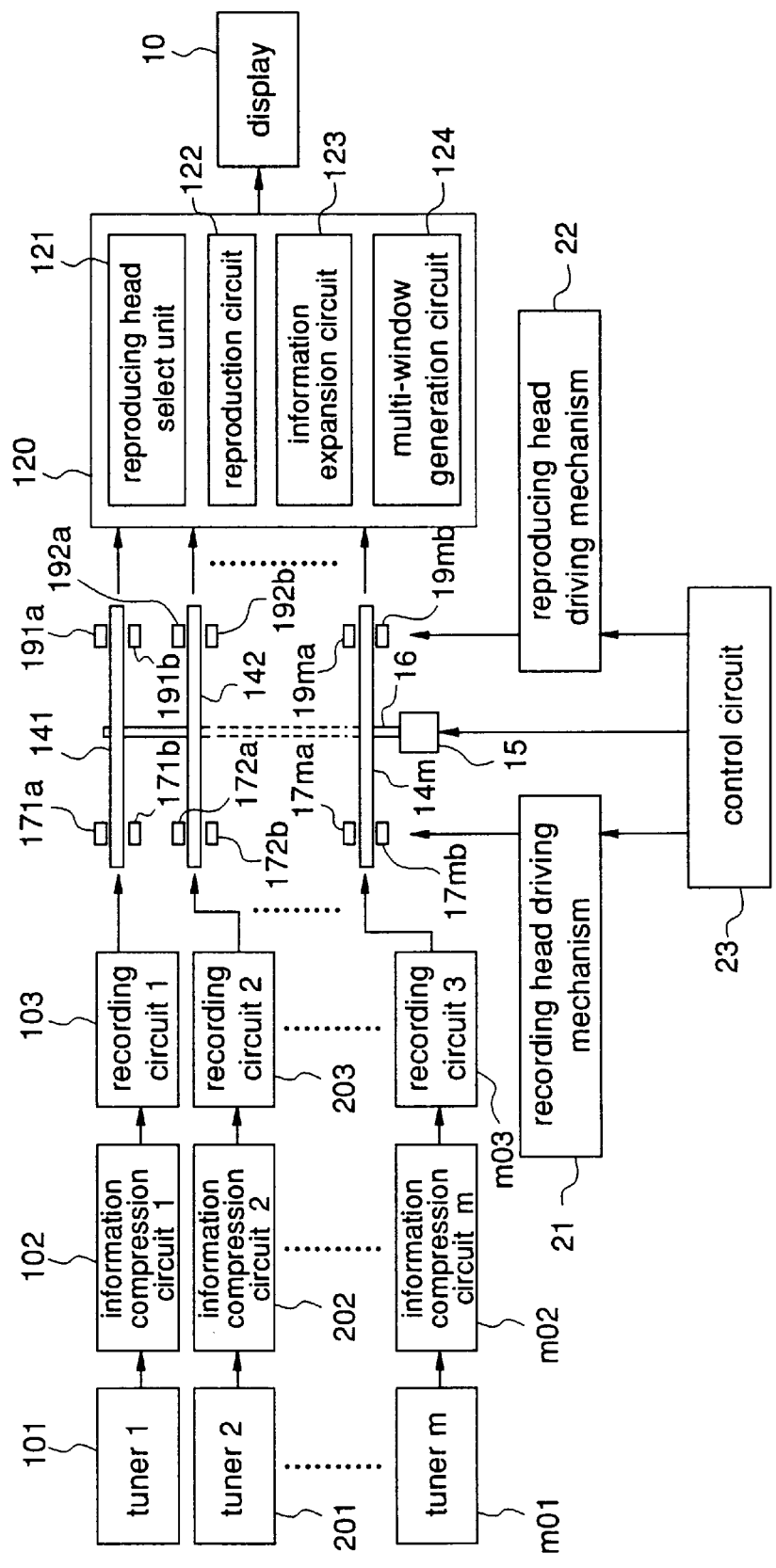
FIG. 72 is a block diagram illustrating a recording and reproduction device with playback function and capable of multi-window display, according to the seventh aspect of the present invention.

While in the embodiments 4 and 5 a single broadcasting signal is displayed on the entire surface of the display, plural broadcasting signals on different channels can be simultaneously reproduced and displayed by screen splitting (multi-window). In this case, as shown in FIGS. 71 and 72, a tuner, an information compression circuit, and a recording circuit are prepared for each of m magnetic disks 141 to 14m. The structures of these elements are the same as those mentioned with respect to FIGS. 18 and 19.

In FIGS. 71 and 72, a tuner 101, an information compression circuit 102, and a recording circuit 103 are prepared for a first magnetic disk 141, a tuner 201, an information compression circuit 202, and a recording circuit 203 are prepared for a second magnetic disk 141, . . . , and a tuner m01, an information compression circuit m02, and a recording circuit m03 are prepared for a m-this magnetic disk 14m. A reproduction unit 120 is provided with a reproduction head selecting unit 121 for selecting a reproduction head according to a target magnetic disk, a reproduction circuit 122, an information expansion circuit 123, and a multi-window generation circuit for reproducing recorded signals on plural channels at the same time and outputting these signals on a single display 10.

The recording operation on each magnetic disk is fundamentally identical to that in the case of using a single magnetic disk mentioned for the fourth embodiment, except the following points.

That is, in this seventh embodiment, in contrast with the fourth embodiment, broadcasting signals of different channels are simultaneously recorded on one surface or both surfaces of the respective magnetic disks 141 to 14m. When the reproducing operation of the reproduction head is performed at higher speed than the recording operation of the recording head, or when the waiting time of the reproduction head is reduced, high-speed reproduction is realized. Therefore, reproduced signals of different channels can be synthesized and displayed by multi-window using the multi-window generation circuit 124, i.e., "full-time multi-window playback" is realized.

When the user selects one of the channels on the multi-window display and reproduces this cannel at normal speed or high speed, the above-mentioned "rapid traverse index" is realized.

Figure 73:
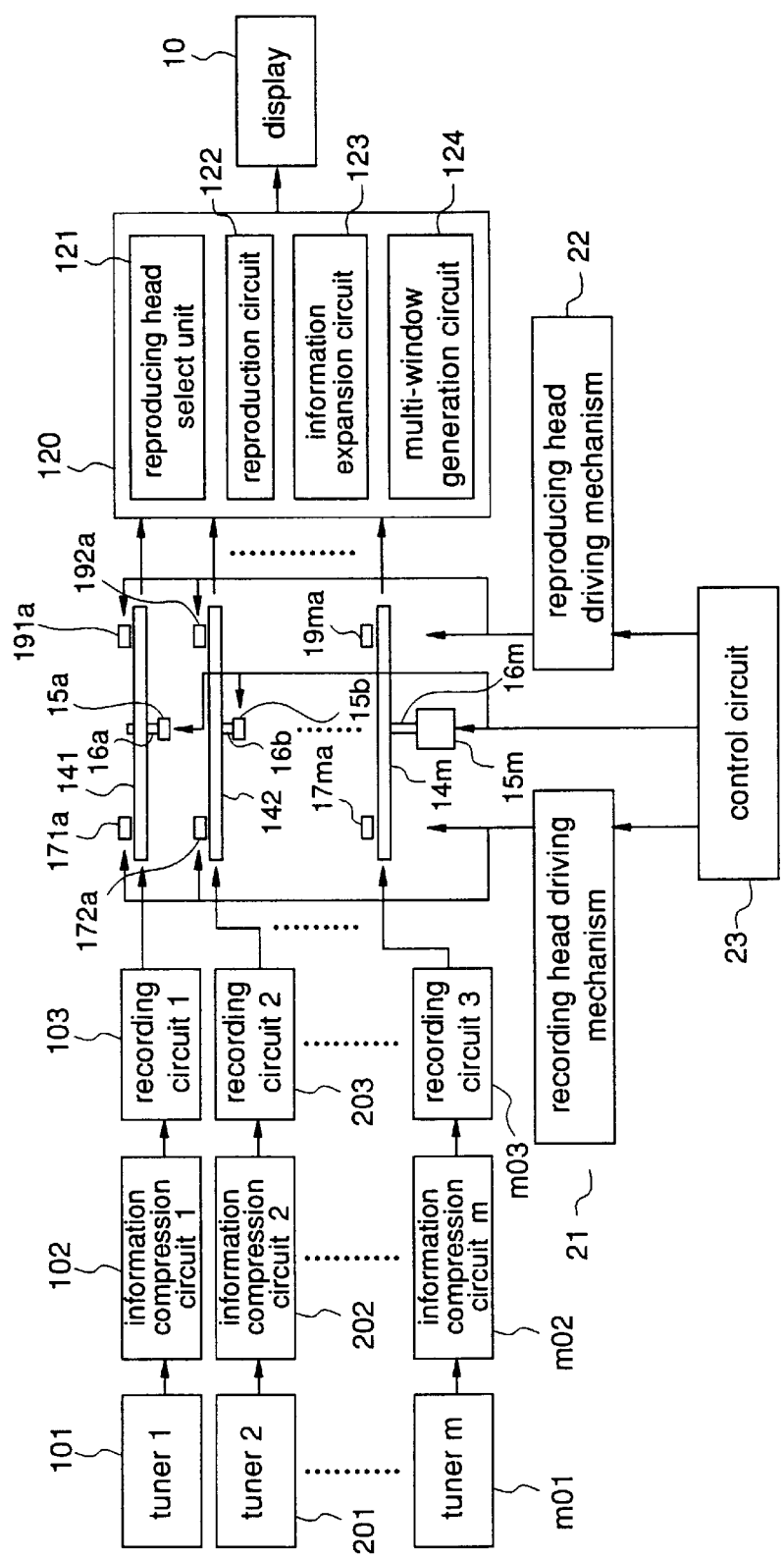
FIG. 73 is a block diagram illustrating a recording and reproduction device with playback function and capable of multi-window display, according to the seventh aspect of the present invention.
Figure 74:
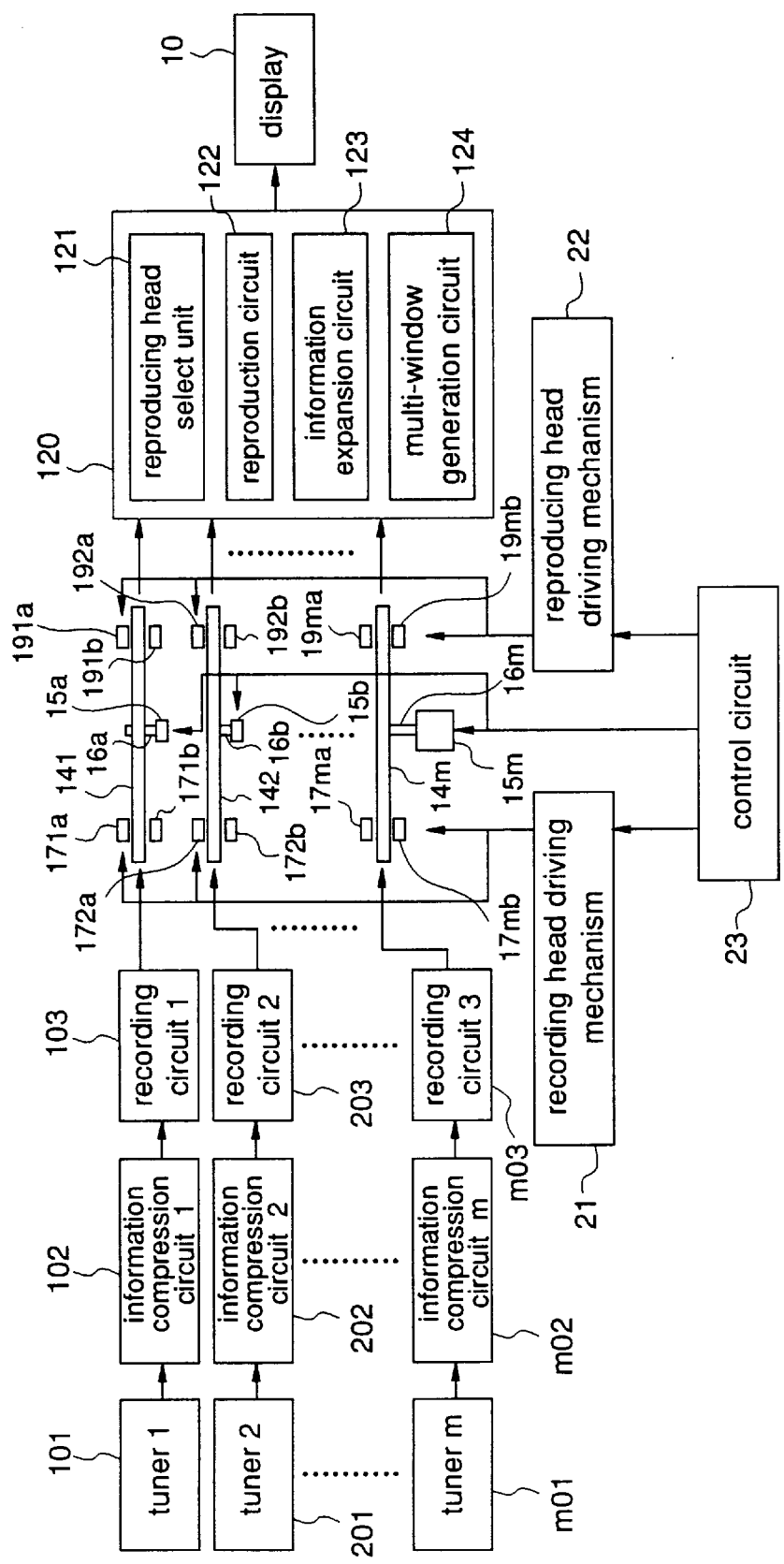
FIG. 74 is a block diagram illustrating a recording and reproduction device with playback function and capable of multi-window display, according to the seventh aspect of the present invention.

Further, as shown in FIGS. 73 and 74, the reproduction head may be driven individually for each magnetic disk. In this case, since the position of the reproduction head can be controlled individually, it is possible to reproduce, simultaneously, plural signals on different channels recorded in different periods of time.

While in the fourth to seventh embodiments magnetic disks are used as recording disks, re-writable disk media, such as optical disks, can be used with the same effects as mentioned above.

Although in the fourth to seventh embodiments the information compression method by the information compression circuit is not described, under the existing circumstances, a method of compressing a video signal for each frame is optimum. Alternatively, JPEG and MPEG may be employed. Further, if a compressive coding method with higher efficiency is realized in future, such a coding method may be employed.

What is claimed is:

1. A television receiver, comprising a tuner for receiving a television video signal;

data storage means including a data storage unit for storing the video signal received by the tuner, a writing pointer for time-sequentially writing the video signal into the data storage unit and a reading pointer for reading the stored video signal;

select means for selecting and outputting one of the reproduced video signal output from the data storage means and the video signal received by the tuner; and control means for controlling the data storage means and the select means in response to an external input signal, wherein, when a writing command signal is input as the external input signal, the writing pointer in the data storage means starts writing, and when a reproduction command signal is input as the external input signal, the reading pointer in the data storage means starts reading, and the select means selects and outputs the reproduced video signal from the data storage means, and wherein, when the reproduction command signal is input, the reading pointer reads the video signal at a speed higher than the writing speed of the writing pointer until the address of the reading pointer meets the address of the writing pointer, and when the address of the reading pointer meets the address of the writing pointer, the select means selects an output from the tuner.

2. A television receiver as defined in claim 1 wherein:

during a period from the input of the writing command signal to the input of the reproduction command signal, the reading pointer in the data storage means reproduces the video signal which has been output from the tuner at the input of the writing command signal, and outputs the video signal as a still picture.

3. A television receiver as defined in claim 1 including two tuners for receiving television video signals, wherein:

when a writing command signal is input as the external input signal, the select means selects and outputs a video signal received by a first tuner, and the writing pointer in the data storage means starts writing a video signal received by a second tuner; and when a reproduction command signal is input as the external input signal, the reading pointer in the data storage means starts reading and reproduces the video signal received by the first tuner, and a select means selects and outputs the reproduced video signal from the data storage means.

4. A television receiver as defined in claim 1 including a plurality of tuners for receiving television video signals, wherein:

when a writing command signal is input as the external input signal, the select means selects a video signal received by a first tuner, and the writing pointer in the data storage means starts writing a video signal received by a second tuner;

when a channel switching command signal is input as the external input signal, the reading pointer in the data storage means starts reading and reproduces the video signal, which has been received by the second tuner and recorded until the input of the channel switching command signal, at a speed higher than the writing speed of the writing pointer, and the select means selects and outputs the reproduced video signal from the data storage means.

5. A television receiver as defined in claim 1 including a plurality of tuners for receiving television video signals, wherein:

the data storage means records, simultaneously, video signals received by some of the plural tuners, designated by the external input signal;

when a reproduction command signal is input as the external input signal, the data storage means reads, simultaneously, the plural video signals recorded in the data storage means, and the select means selects and outputs the plural video signals read simultaneously; and when a channel decision signal is input as the external input signal, the select means selects, from the plural reproduced video signals, only the reproduced video signals which have been received and recorded by the tuners designated by the channel decision signal.

6. A television receiver as defined in claim 1 including a plurality of tuners for receiving television video signals, wherein:

the data storage means records, simultaneously, video signals received by some of the plural tuners, designated by the external input signal; and when a reproduction command signal is input as the external input signal, the data storage means reads, simultaneously, the plural video signals recorded in the data storage means, and the select means selects and outputs the plural video signals read simultaneously.

* * * * *